(12) United States Patent
Clemens et al.

(10) Patent No.: US 12,743,431 B2
(45) Date of Patent: Sep. 22, 2026

(54) TECHNIQUES FOR PRE-ASSIGNMENT VALIDATION OF DATA MANAGED BY A DATA PROCESSING SYSTEM

(71) Applicant: Ab Initio Technology LLC, Lexington, MA (US)

(72) Inventors: David Clemens, Cambridge, MA (US); Roy Procops, Winchester, MA (US)

(73) Assignee: Ab Initio Technology LLC, Lexington, MA (US)

( * ) Notice: Subject to any disclaimer, the term of this patent is extended or adjusted under 35 U.S.C. 154(b) by 145 days.

(21) Appl. No.: 18/356,153

(22) Filed: Jul. 20, 2023

(65) Prior Publication Data

US 2024/0086409 A1 Mar. 14, 2024

Related U.S. Application Data

(60) Provisional application No. 63/404,758, filed on Sep. 8, 2022.

(51) Int. Cl.

*G06F 16/245* (2019.01)
*G06F 16/215* (2019.01)
*G06F 16/2453* (2019.01)
*G06F 16/2457* (2019.01)
*G06F 16/28* (2019.01)

(52) U.S. Cl.

CPC ...... *G06F 16/24573* (2019.01); *G06F 16/215* (2019.01); *G06F 16/24534* (2019.01); *G06F 16/287* (2019.01)

(58) Field of Classification Search

CPC ............. G06F 16/24573; G06F 16/287; G06F 16/24534

See application file for complete search history.

(56) References Cited

U.S. PATENT DOCUMENTS 7,472,103 B1 * 12/2008 Yang ....................... G06F 9/451 706/52
2005/0075831 A1 * 4/2005 Ilic ....................... G06F 11/0709 702/179
2006/0271913 A1 * 11/2006 Erf ......................... G06Q 10/10 717/120

(Continued)

OTHER PUBLICATIONS

International Search Report and Written Opinion for International Application No. PCT/US2023/070643 mailed Oct. 2, 2023.

(Continued)

*Primary Examiner* — Alicia M Willoughby
(74) *Attorney, Agent, or Firm* — Wolf, Greenfield & Sacks, P.C.

(57) ABSTRACT

Some embodiments provide techniques of enforcing valid data assignments in a data processing system in which data can be dynamically updated by user devices and/or computerized processes. The techniques identify, using a validation rule associated with a data entity, one or more valid values for assignment to an attribute of an instance of the data entity. The techniques identify the valid value(s) by generating a query for the one or more valid values using one or more condition(s) on the attribute in the validation rule, and executing the generated query to obtain the one or more valid values for the first attribute. The attribute may then be assigned one or more of the identified valid value(s).

22 Claims, 42 Drawing Sheets

(56) References Cited

U.S. PATENT DOCUMENTS

| | | | | |
|---|---|---|---|---|
| 2007/0112745 | A1* | 5/2007 | Dettinger | G06F 16/289 |
| 2009/0187973 | A1* | 7/2009 | Dattathreya | G06F 21/10 726/4 |
| 2009/0259683 | A1* | 10/2009 | Murty | G06F 16/289 |
| 2009/0276486 | A1* | 11/2009 | Tandon | G05B 19/4185 710/8 |
| 2016/0378817 | A1* | 12/2016 | Fuller | G06F 16/2365 707/690 |
| 2017/0223003 | A1 | 8/2017 | Miles et al. | |
| 2018/0121026 | A1 | 5/2018 | Nadig et al. | |

OTHER PUBLICATIONS

[No Author Listed], erwin Data Intelligence Suite Reference Data Management Guide. Release v10.0. Jan. 2020. 98 pages.

[No Author Listed], Validate data in datasets in .NET Framework applications. Microsoft Build. Visual Studio IDE. Jan. 12, 2024. 10 pages. https://learn.microsoft.com/en-us/visualstudio/data-tools/validate-data-in-datasets?view=vs-2022&tabs=csharp (Last accessed May 7, 2024).

* cited by examiner

TECHNIQUES FOR PRE-ASSIGNMENT VALIDATION OF DATA MANAGED BY A DATA PROCESSING SYSTEM

RELATED APPLICATIONS

This present application claims the benefit of priority under 35 U.S.C. 119(e) to U.S. Provisional Patent Application No. 63/404,758 filed on Sep. 8, 2022, and titled "TECHNIQUES FOR PRE-ASSIGNMENT VALIDATION OF DATA MANAGED BY A DATA PROCESSING SYSTEM", which is hereby incorporated by reference herein in its entirety.

FIELD

Aspects of the present disclosure relate to techniques for enforcing valid data assignments in a data processing system in which data can be updated (e.g., by users and/or processes). The techniques mitigate the risk of invalid value assignments to variables in the data processing system.

BACKGROUND

Modern data processing systems manage vast amounts of data (e.g., millions, billions, or trillions of data records). An institution (e.g., a multinational bank, a global technology company, an e-commerce company, etc.) may have vast amounts (e.g., hundreds or thousands of terabytes) of data that is used for its operations. For example, the data may include transaction records, documents, tables, files, and/or other types of data.

A data processing system may execute software applications to support various functions. Software applications may be used to provide functions that support operations of an institution. For example, a bank may develop software applications that support various aspects of its business such as programs that generate credit reports, bank account history, transaction reports, and/or other data. Software applications may also be used to extract insights from data.

SUMMARY

Some embodiments provide a method of enforcing valid data assignments in a data processing system configured to process data that is updated by user devices and/or computerized processes, the data processing system storing the data using data entities and instances thereof. The method comprises: using at least one computer hardware processor to perform: receiving, by the data processing system, a request to assign a value to a first attribute in a first data entity instance of a first data entity, wherein: the first data entity comprises a plurality of attributes including the first attribute and a second attribute; and the first data entity is associated with at least one validation rule, the at least one validation rule including a first validation rule associated with the first attribute, the first validation rule specifying a first condition on the first attribute that depends on the second attribute; identifying, using the first validation rule, one or more valid values for the first attribute, the identifying comprising: generating a query for the one or more valid values using the first condition on the first attribute; and executing the generated query to obtain the one or more valid values for the first attribute; and assigning a value to the first attribute in the first data entity instance in accordance with input indicating a selection of at least one of the one or more valid values for the first attribute, the assigning comprising assigning the selected at least one valid value to the first attribute.

In some embodiments, generating the query for the one or more valid values for the first attribute using the first condition on the first attribute that depends on the second attribute comprises: identifying a current value assigned to the second attribute in the first data entity instance; and generating the query using the current value of the second attribute in the first data entity instance. In some embodiments, the current value assigned to the second attribute in the first data entity instance is an instance of a second data entity, and generating the query based on the current value assigned to the second attribute in the first data entity instance comprises: accessing at least one attribute value from the instance of the second data entity; and generating the query based on the at least one attribute value from the instance of the second data entity.

In some embodiments, the at least one validation rule comprises a plurality of validation rules associated with respective attributes of the first data entity, and the method further comprises: identifying the first validation rule from among the plurality of validation rules in based on an association of the first validation rule with the first attribute. In some embodiments, the first validation rule comprises a second condition on the first attribute, and generating the query for the one or more valid values comprises: generating a first portion of the query based on the first condition on the first attribute; and generating a second portion of the query based on the second condition on the first attribute.

In some embodiments, generating the query for the one or more valid values using the first condition comprises: transforming the first condition on the first attribute into a query criterion; and integrating the query criterion into the query. In some embodiments, assigning the value to the first attribute in the first data entity instance comprises assigning an instance of a second data entity to the first attribute in the first data entity instance. In some embodiments, generating the query for the one or more valid values using the first condition on the first attribute comprises generating a query on instances of the second data entity. In some embodiments, executing the generated query to obtain the one or more valid values for the first attribute comprises executing the generated query on a subset of data consisting of instances of the second data entity.

In some embodiments, the first attribute indicates an owner, an access security level, a data source, or a data format associated with the first data entity instance. In some embodiments, the first data entity instance stores information about a software application or a dataset as attribute values in the first data entity instance. In some embodiments, the first attribute indicates a data source or a data format to be used by the software application when attempting to invoke a function of the software application. In some embodiments, the one or more valid values are suitable for invoking the function of the software application. In some embodiments, the first attribute indicates an access security level associated with the dataset to be used when attempting to provide access to the dataset. In some embodiments, the one or more valid values are one or more access security levels providing access to the dataset.

In some embodiments, the method further comprises: transmitting, to a client device, an indication of the one or more valid values for the first attribute for display in a graphical user interface (GUI); receiving, from the client device, the input indicating the selection of the at least one of the one or more valid values for the first attribute through the GUI. In some embodiments, identifying the one or more valid values for the first attribute comprises identifying one or more instances of a second data entity as the one or more valid values for the first attribute.

In some embodiments, the first validation rule comprises a second condition on the first attribute; and identifying, using the first validation rule, the one or more valid values further comprises generating the query by: generating a first query criterion using the first condition on the first attribute; and generating a second query criterion using the second condition on the first attribute. In some embodiments, the method further comprises: identifying, using the first validation rule, one or more invalid values for the first attribute; and preventing transmission of the one or more invalid values.

In some embodiments, the first data entity instance does not have a value assigned to the second attribute, and identifying the one or more valid values for the first attribute comprises: identifying an unassigned value entered for the second attribute; and generating the query for the one or more valid values using the unassigned value for the second attribute.

Some embodiments provides a system for enforcing valid data assignments in a data processing system configured to process data that is updated by user devices and/or computerized processes, the data processing system storing the data using data entities and instances thereof. The system comprises: at least one computer hardware processor; and at least one non-transitory computer-readable storage medium storing an assignment validation module, the assignment validation module comprising a rule selection component, a query generation component, and a query execution component; wherein the at least one computer hardware processor is programmed to execute the assignment validation module to perform: receiving, by the assignment validation module, a request to assign a value to a first attribute in a first data entity instance of a first data entity, wherein: the first data entity comprises a plurality of attributes including the first attribute and a second attribute; and the first data entity is associated with at least one validation rule that attribute values in instances of the first data entity must comply with to be valid, the at least one validation rule including a first validation rule associated with the first attribute, the first validation rule specifying a first condition on the first attribute that depends on the second attribute; identifying, using the rule selection component and the first validation rule, one or more valid values for the first attribute, the identifying comprising: generating, using the query generation component, a query for the one or more valid values using the first condition on the first attribute; and executing, using the query execution component, the generated query to obtain the one or more valid values for the first attribute; and assigning a value to the first attribute in the first data entity instance in accordance with input indicating a selection of at least one of the one or more valid values for the first attribute, the assigning comprising assigning the selected at least one valid value to the first attribute.

Some embodiments provides at least one non-transitory computer-readable storage medium storing instructions that, when executed by at least one computer hardware processor, cause the at least one computer hardware processor to perform a method of enforcing valid data assignments in a data processing configured to process data that is updated by user devices and/or computerized processes, the data processing system storing the data using data entities and instances thereof. The method comprises: receiving, by the data processing system, a request to assign a value to a first attribute in a first data entity instance of a first data entity, wherein: the first data entity comprises a plurality of attributes including the first attribute and a second attribute; and the first data entity is associated with at least one validation rule that attribute values in instances of the first data entity must comply with to be valid, the at least one validation rule including a first validation rule associated with the first attribute, the first validation rule specifying a first condition on the first attribute that depends on the second attribute; identifying, using the first validation rule, one or more valid values for the first attribute, the identifying comprising: generating a query for the one or more valid values using the first condition on the first attribute; and executing the generated query to obtain the one or more valid values for the first attribute; and assigning a value to the first attribute in the first data entity instance in accordance with input indicating a selection of at least one of the one or more valid values for the first attribute, the assigning comprising assigning the selected at least one valid value to the first attribute.

Some embodiments provide a method of enforcing valid data assignments in a data processing system configured to process data that is updated by user devices and/or computerized processes, the data processing system storing the data using data entities and instances thereof. The method comprises using at least one computer hardware processor to perform: receiving, through a graphical user interface (GUI) by the data processing system, input indicating a request to assign a value to a first attribute in a first data entity instance of a first data entity, wherein: the first data entity comprises a plurality of attributes including the first attribute and a second attribute; and the first data entity is associated with at least one validation rule that attribute values in instances of the first data entity must comply with to be valid, the at least one validation rule including a first validation rule associated with the first attribute, the first validation rule specifying a first condition on the first attribute that depends on the second attribute; and transmitting, to the data processing system, the request, wherein the request causes the data processing system to identify, using the first validation rule, one or more valid values for the first attribute; receiving, from the data processing system, the one or more valid values for the first attribute; displaying, in the GUI, an indication of the one or more valid values for the first attribute; receiving, through the GUI, input indicating a selected value of the one or more valid values to assign to the first attribute; and transmitting, to the data processing system, an indication of the selected value for assignment to the first attribute.

In some embodiments, the request causes the data processing system to identify the one or more valid values for the first attribute by: generating a query for the one or more valid values using the first condition on the first attribute; and executing the generated query to obtain the one or more valid values for the first attribute. In some embodiments, executing the generated query to obtain the one or more valid values for the first attribute comprises executing the generated query on a subset of data consisting of instances of the second data entity.

In some embodiments, the first attribute indicates an owner, an access security level, a data source, or a data format associated with the first data entity instance. In some embodiments, the first data entity instance stores information about a software application or a dataset as attribute values in the first data entity instance. In some embodiments, the first attribute indicates a data source or a data format to be used by the software application when attempting to invoke a function of the software application. In some embodiments, the one or more valid values are suitable for invoking the function of the software application. In some embodiments, the first attribute indicates an access security level associated with the dataset to be used when attempting to provide access to the dataset. In some embodiments, the one or more valid values are one or more access security levels providing access to the dataset.

In some embodiments, receiving the one or more valid values for the first attribute comprises receiving one or more results of executing a query for the one or more valid values generated using the first condition on the first attribute. In some embodiments, the second attribute in the first data entity instance is assigned an instance of a second data entity, and receiving the one or more valid values for the first attribute comprises receiving one or more values determined based on the instance of the second data entity. In some embodiments, receiving the one or more valid values for the first attribute comprises receiving one or more instances of a second data entity, wherein at least one of the one or more instances of the second data entity can be assigned to the first attribute.

Some embodiments provide a system of enforcing valid data assignments in a data processing system configured to process data that is updated by user devices and/or computerized processes, the data processing system storing the data using data entities and instances thereof. The system comprises: at least one computer hardware processor; and at least one non-transitory computer-readable storage medium storing instructions that, when executed by the at least one computer hardware processor, cause the at least one computer hardware processor to perform: receiving, through a graphical user interface (GUI) by the data processing system, input indicating a request to assign a value to a first attribute in a first data entity instance of a first data entity, wherein: the first data entity comprises a plurality of attributes including the first attribute and a second attribute; and the first data entity is associated with at least one validation rule that attribute values in instances of the first data entity must comply with to be valid, the at least one validation rule including a first validation rule associated with the first attribute, the first validation rule specifying a first condition on the first attribute that depends on the second attribute; and transmitting, to the data processing system, the request, wherein the request causes the data processing system to identify, using the first validation rule, one or more valid values for the first attribute; receiving, from the data processing system, the one or more valid values for the first attribute; displaying, in the GUI, an indication of the one or more valid values for the first attribute; receiving, through the GUI, input indicating a selected value of the one or more valid values to assign to the first attribute; and transmitting, to the data processing system, an indication of the selected value for assignment to the first attribute.

In some embodiments, the request causes the data processing system to identify the one or more valid values for the first attribute by: generating a query for the one or more valid values using the first condition on the first attribute; and executing the generated query to obtain the one or more valid values for the first attribute.

In some embodiments, receiving the one or more valid values for the first attribute comprises receiving one or more results of executing a query for the one or more valid values generated using the first condition on the first attribute. In some embodiments, the second attribute in the first data entity instance is assigned an instance of a second data entity, and receiving the one or more valid values for the first attribute comprises receiving one or more values determined based on the instance of the second data entity. In some embodiments, receiving the one or more valid values for the first attribute comprises receiving one or more instances of a second data entity, wherein at least one of the one or more instances of the second data entity can be assigned to the first attribute.

Some embodiments provide least one non-transitory computer-readable storage medium storing instructions that, when executed by at least one computer hardware processor, cause the at least one computer hardware processor to perform a method of enforcing valid data assignments in a data processing system configured to process data updated by user devices and/or computerized processes, the data processing system storing the data using data entities and instances thereof. The method comprises: receiving, through a graphical user interface (GUI) by the data processing system, input indicating a request to assign a value to a first attribute in a first data entity instance of a first data entity, wherein: the first data entity comprises a plurality of attributes including the first attribute and a second attribute; and the first data entity is associated with at least one validation rule that instances of the first data entity must comply with to be valid, the at least one validation rule including a first validation rule associated with the first attribute, the first validation rule specifying a first condition on the first attribute that depends on the second attribute; and transmitting, to the data processing system, the request, wherein the request causes the data processing system to identify, using the first validation rule, one or more valid values for the first attribute; receiving, from the data processing system, the one or more valid values for the first attribute; displaying, in the GUI, an indication of the one or more valid values for the first attribute; receiving, through the GUI, input indicating a selected value of the one or more valid values to assign to the first attribute; and transmitting, to the data processing system, an indication of the selected value for assignment to the first attribute.

The foregoing is a non-limiting summary.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
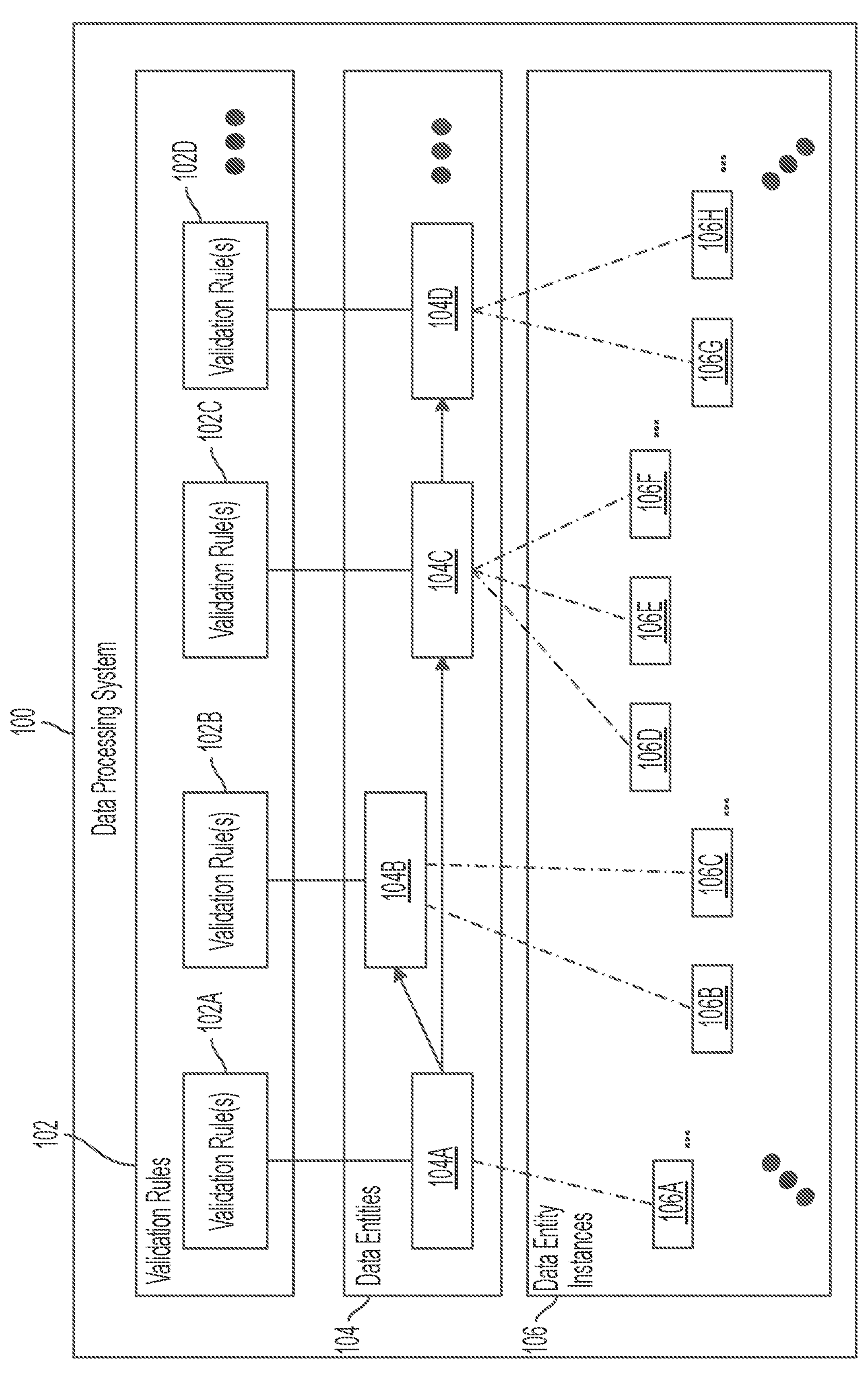
FIG. 1A is a block diagram of a data processing system configured to manage data using data entities and instances thereof, according to some embodiments of the technology described herein.

The inventors have developed techniques of enforcing valid data assignments in a data processing system in which data can be dynamically updated by users and/or computer-implemented processes (e.g., processes implemented by one or more software application(s)).

A data processing system may manage data for an organization such as a multinational corporation (e.g., a logistics company, a financial institution, a utility company, an automotive company, an e-commerce company, etc.) or other organization. The organization may have vast amounts of data (e.g., hundreds or thousands of terabytes of data) managed by the data processing system. The data may be updated in the data processing system by users and/or processes. The updates to data may occur as a result of a user and/or a computerized process (e.g., via one or more application programming interface (API) calls) changing one or more data values. Updating data may involve creating new values, modifying existing values, and/or deleting values. As one example, updating data may involve changing values of variables and/or attributes.

The updates to the data may be extensive and frequent in that numerous data values may be updated and the updates may occur often. As an illustrative example, the data processing system may manage data for a multinational bank. The data may be updated many times every day as part of its operations (e.g., account management, lending, borrowing, investments, and/other operations) requiring frequent data updates. As another example, the data processing system may manage data for an e-commerce company. The data may be updated frequently as part of the e-commerce company's operations (e.g., online transactions, order fulfillment, and/or other operations).

For some types of data managed by a data processing system, it is important to restrict the values that the data can take on. For example, some variables in the data may be allowed to take on a value only in a particular set of values (e.g., one of a finite set of options, a value only in a permitted range of continuous values, etc.). Restricting values that certain variables take on is important in various applications, for example, when such values have an impact on operational aspects of the data processing system. To illustrate, variables may include a security permission for accessing data, an identification of a source from which to access data, an indication of hierarchy among data structures, or an indication of a user permitted to operate on data. The values of such variables impact how the data processing system operates. For example, these variables affect who is allowed to view certain information in the data processing system, how the data is stored in the memory of the data processing system, and who is permitted to modify data in the data processing system.

One problem that arises in this context is that, given the large number of updates that are made by users and/or processes, the data processing system is susceptible to assignments of invalid (e.g., not permitted, improperly formatted, and/or otherwise improper) data values. For example, as a result of improperly assigning a variable value a user may assign an invalid owner of an asset (e.g., a software application, a data set, or other asset) resulting in improper access to the asset being granted to someone. The improper assignment may lead to unauthorized access to data. As another example, as a result of improperly assigning a variable value, a user may assign an invalid security level to an asset resulting in a possible security failure in the data processing system. The improper assignment may result in incorrect (e.g., not sufficiently restrictive, overly restrictive or otherwise wrong) security protocols being applied to the asset.

Furthermore, an organization may have data governance policies or other technical requirements with which data managed by a data processing system must comply. Invalid values in the data processing system may result in failure to comply with the data governance policies. For example, a data governance policy may specify that a particular software application is only permitted to use data from a particular set of data sources. A user or process may assign an invalid value in the data processing system granting the software application access to data from a data source that is not one of the permitted set of data sources, which would violate the data governance policy. Invoking the software application and/or one of its functions may lead to further errors as a result of the improper data access. As another example, a data governance policy may require that values of a particular variable adhere to a specific format. Assigning values to the variable that do not adhere to the specific format would result in a failure to comply with this data governance policy. Moreover, a software application and/or its function that uses the variable value may experience errors as a result of an assigned variable value that does not adhere to the specific format.

The conventional approach to addressing the above-described problems is to allow data value updates and to subsequently check the updated data values to identify any improper values that have been assigned. Any improper values that have been identified can be rejected, corrected, and/or flagged for correction. For example, there may be logic that specifies what is and is not allowed as a value of a particular variable. After a value is assigned to the variable (e.g., by a user and/or a computerized process, for example, via an API call), the logic may be used to determine whether the assigned value is valid. However, this approach is inefficient because a user or process may need to repeatedly submit multiple data assignments, each validated by the data processing system, before finally landing upon a value that is determined to be valid in accordance with the logic. In some cases, there may be tens, hundreds, or thousands of invalid values included in a set of possible values that a user or process would need to select from. Moreover, for each data assignment, the data processing system transmits all possible values to a client device (e.g., for presentation in a GUI) and/or a computerized process from which a selection is made. Given that many of the values may be invalid, the data processing system transmits more information than needed resulting in increased data latency in its communications. Thus, this conventional approach is not a practical way to address the above-described problems, especially in a data processing system in which data assignments are made frequently.

One type of data processing system in which the above-described problem arises is in a data processing system that manages data using data entities and instances thereof. The data processing system may use the data entities to organize data in an object-oriented paradigm. Similar to how object-oriented programming involves classes and instances thereof, a data processing system may be configured with definitions of data entities and manage data using instances of the data entities. A data entity may indicate one or more attributes for which value(s) may be assigned in an instance of the data entity. The data processing system may store data in one or multiple instances of a data entity. In some embodiments, a data entity instance may store information about data ("metadata"). The information about the data may be stored as attribute values in data entity instances. A data entity instance may be stored by the data processing system in any suitable format and/or using any suitable data structure(s), as aspects of the technology described herein are not limited in this respect.

As an illustrative example, a data processing system may define a "business term" data entity that includes the attributes: "Name," "Definition," "Region," and "Steward". One instance of the business term data entity may be used to store data about a set of credit scores of an organization's customers who reside in North America. The instance may store the value of "Credit Score" for the "Name" attribute, a textual description of a credit score as a value of the "Definition" attribute, "North America" as a value of the "Region" attribute, and a name of a person in charge of managing the credit scores as a value of the "Steward" attribute.

The data processing system that manages data using data entities and instances thereof may use validation rules associated with data entities to regulate the assignment of data values to data entity attributes. A validation rule may specify one or more conditions on a particular attribute of a given data entity. A value assigned to the particular attribute in an instance of the given data entity may be valid when it meets the condition(s) specified by the validation rule. A condition on an attribute of a data entity may further depend on one or more other attributes of other data entities. Thus, validity of a value assigned to the attribute of an instance of the data entity may depend on value(s) of other attribute(s) in other data entity instance(s).

FIG. 1A is a block diagram of an example data processing system 100 for managing data, according to some embodiments of the technology described herein. The data processing system 100 manages data, at least in part, by using data entities and instances thereof. The data processing system 100 includes validation rules 102, data entities 104, and data entity instances 106. The data entities 104 may each define a set of one or more attributes for which instances of the data entity store values. In the example of FIG. 1A, the data entity instances 106 include: (1) instance 106A of data entity 104A; (2) instances 106B, 106C of data entity 104B; (3) instances 106D, 106E, 106F of data entity 104C; and (4) instances 106G, 106H of data entity 104D. Each of the data entity instances 106A, 106B, 106C, 106D, 106E, 106F, 106G, 106H may store values of one or attributes specified by the respective data entity from which the data entity instance is instantiated from.

An attribute of a data entity may reference another data entity. As indicated by the arrows among the data entities 104 in FIG. 1A, data entity 104A includes an attribute that references data entity 104B and an attribute that references data entity 104C. Further, data entity 104C includes an attribute that references data entity 104D. When an attribute of a first data entity refers to a second data entity, an instance of the second data entity may be assigned as an attribute value in an instance of the first data entity. When an instance of the second data entity is assigned as an attribute value in an instance of the first data entity, the instance of the first data entity may store a reference to the instance of the second data entity as the attribute value. For example, the instance of the first data entity may store as the attribute value, a pointer, identifier, URL, memory address, file location, and/or any other suitable type of reference to the instance of the second data entity.

The validation rules 102 define the validity of instances of data entities. The validation rules 102 comprise sets of validation rule(s) 102A, 102B, 102C, 102D. Each of the set of validation rule(s) 102A, 102B, 102C, 102D is associated with a respective data entity. In the example of FIG. 1A, validation rule(s) 102A are associated with data entity 104A, validation rule(s) 102B are associated with data entity 104B, validation rule(s) 102C are associated with data entity 104C, and validation rule(s) 102D are associated with data entity 104D. Instances of a given data entity may be required to comply with validation rule(s) associated with the data entity in order to be valid. Each of validation rule(s) 102A, 102B, 102C, and 102D may have one or multiple validation rules. For example, data entity 104A may include multiple attributes and each attribute may be associated with a respective one of multiple validation rules part of validation rule(s) 102A. Thus, it should be appreciated that each data entity may be associated with multiple validation rules.

Figure 1B:
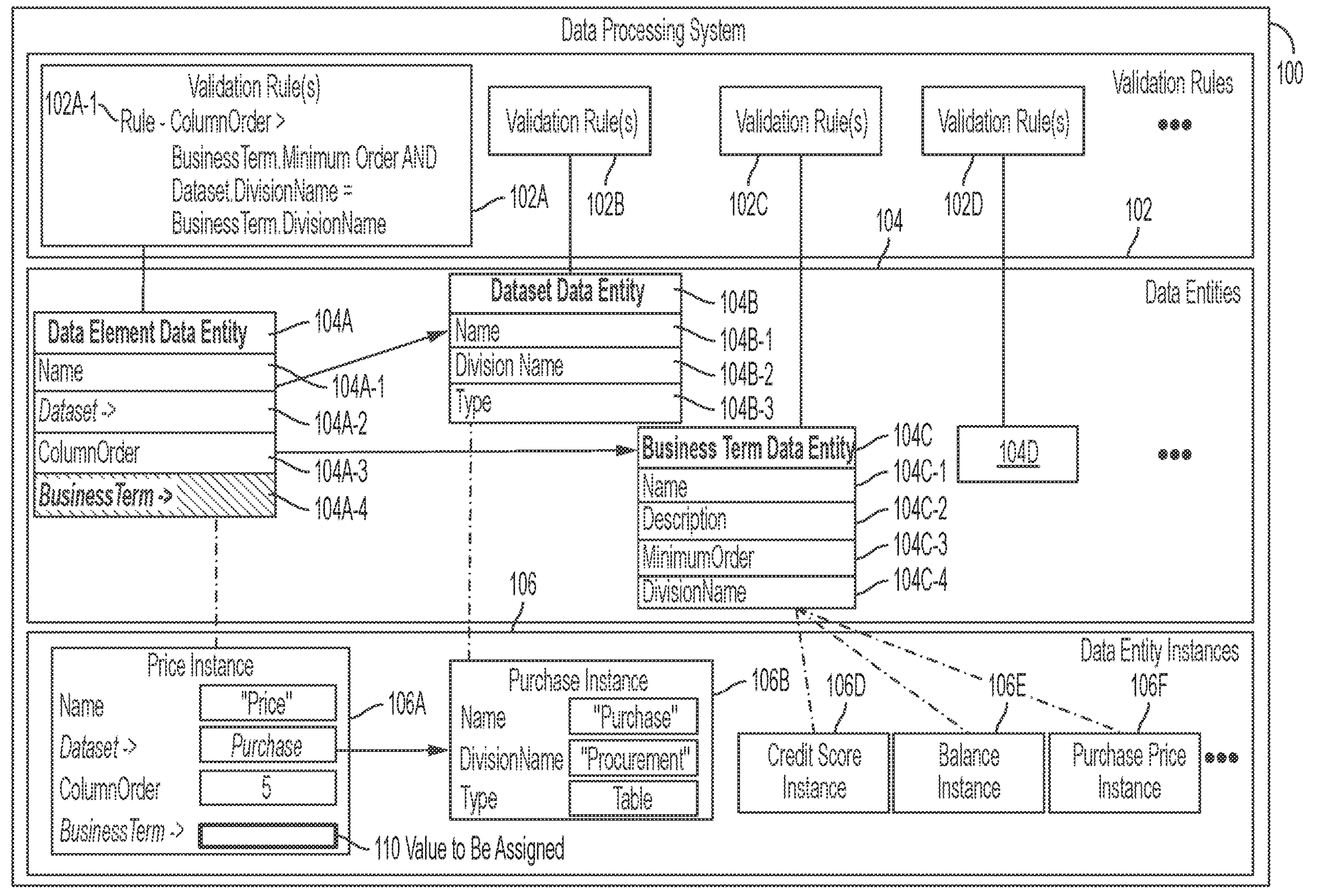
FIG. 1B shows the relationship among validation rules, data entities, and data entity instances of the data processing system of FIG. 1A, according to some embodiments of the technology described herein.

To illustrate how a set of validation rule(s) defines the validity of instances of a data entity, FIG. 1B shows the relationship among the set of validation rules(s) 102A, data entities 104A, 104B, 104C, and data entity instances 106A, 106B, according to some embodiments of the technology described herein. In this example, a "Price" instance 106A of the "Data Element" data entity 104A refers to a "Purchase" instance 106B of the "Dataset" data entity 104B. The "Price" instance 106A stores information about purchase price data stored in a purchase dataset (a dataset containing information about purchases made by customers). Among the information stored in the "Price" instance 106A is a value of a "BusinessTerm" attribute 104A-4 that is a reference to a particular instance of the Business Term data entity 104C describing a purchase price.

As shown in FIG. 1B, the Data Element data entity 104A includes the following attributes: Name 104A-1, Dataset 104A-2, ColumnOrder 104A-3, and BusinessTerm 104A-4. The Dataset attribute 104A-2 refers to the Dataset data entity 104B and the BusinessTerm attribute 104A-4 refers to the Business Term data entity 104C. The Dataset data entity 104B includes the following attributes: Name 104B-1, Division Name 104B-2, and Type 104B-3. The Business Term data entity 104C includes the following attributes: Name 104C-1, Description 104C-2, MinimumOrder 104C-3, and DivisionName 104C-4. The validation rule(s) 102A associated with the Data Element data entity 104A include a rule 102A-1 that requires the following conditions to be met for an instance of the Data Element data entity 104A to be valid: (1) the value of the ColumnOrder attribute 104A-3 must be greater than a value of the MinimumOrder attribute 104C-3 in a referenced instance of the Business Term data entity 104C; and (2) the value of the DivisionName attribute 104B-2 of the referenced instance of the Dataset data entity 104B must match the value of the DivisionName attribute 104C-4 in a referenced instance of the Business Term data entity 104C.

A data entity instance may store values assigned to its attributes (e.g., as attribute value pairs). In the example of FIG. 1B, the Price instance 106A of the Data Element data entity 104A stores: (1) a value of "Price" assigned to its Name attribute 104A-1; (2) a reference to an instance 106B of the Dataset data entity 104B called "Purchase" assigned to its Dataset attribute 104A-2; and (3) a value of "5" assigned to its ColumnOrder attribute 104A-3. In the example of FIG. 1B, the Price instance 106A needs a value 110 to be assigned to its BusinessTerm attribute 104A-4. The attribute value may be assigned via user input and/or a computerized process (e.g., a function call).

Figure 1C:
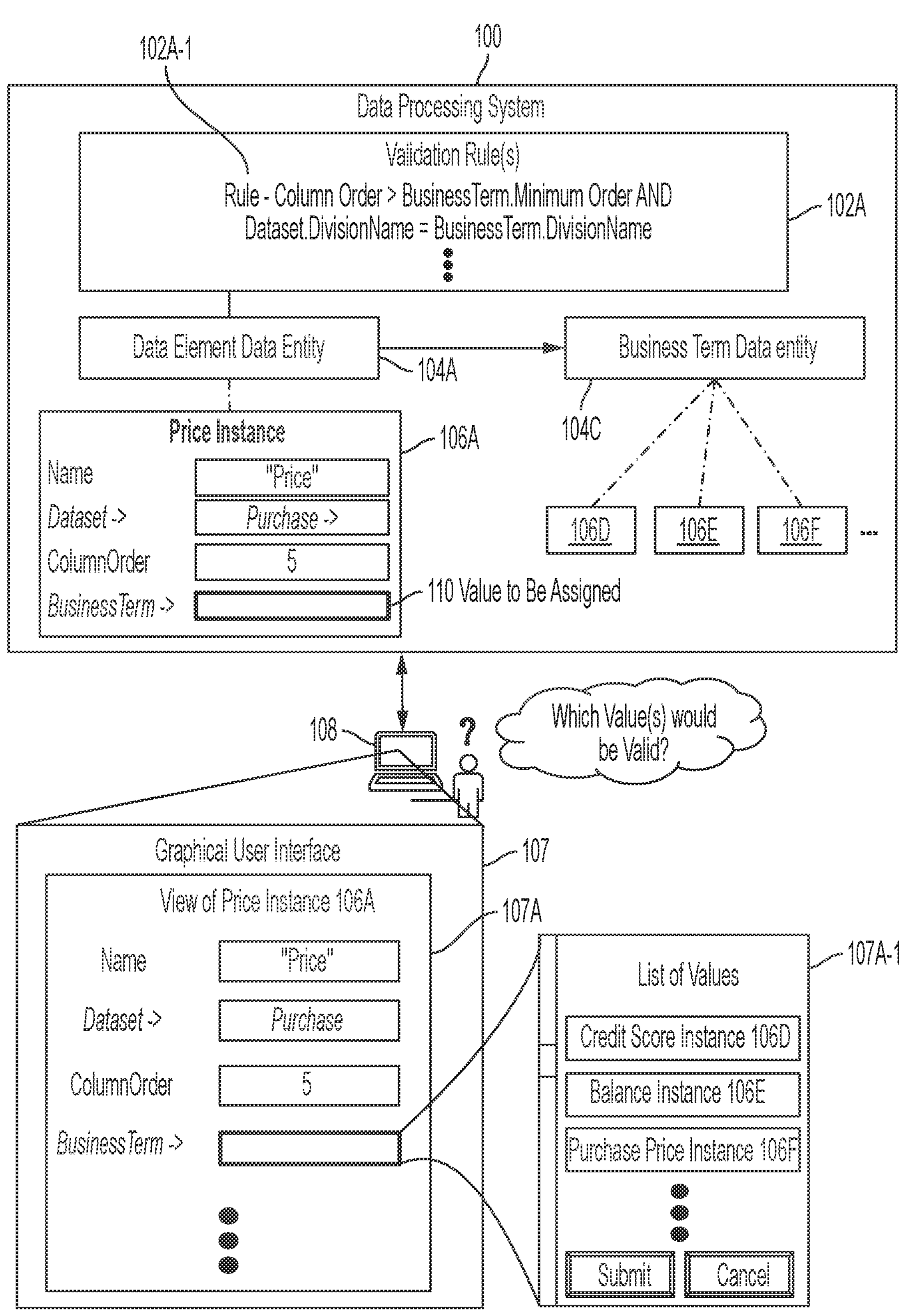
FIG. 1C shows a graphical user interface (GUI) for assignment of an attribute value in a data entity instance in the data processing system of FIG. 1A, according to some embodiments of the technology described herein.

FIG. 1C shows an example graphical user interface 107 for assignment of the value 110 in the Price instance 106A of the Data Element data entity 104A, according to some embodiments of the technology described herein. The graphical user interface 107 shows a view 107A of the Price instance 106A displaying attribute value pairs of the Price instance 106A. The graphical user interface 107 provides a list 107A-1 of values that can be assigned to the BusinessTerm attribute 104A-4 of data entity instance 106A. In the example of FIG. 1C, the values include references to the following instances of the BusinessTerm data entity 104C: Credit Score instance 106D, Balance instance 106E, and Purchase Price instance 106F. However, the list 107A-1 of values includes both valid values (i.e., that would meet rule 102A-1) and invalid values (i.e., that would not meet rule 102A-1) of the BusinessTerm attribute 104A-4. The user 108 does not know which of the values from the list 107A-1 would meet the rule 102A-1 in the validation rule(s) 102A associated with the Data Element data entity 104A because the user does not know the attribute values of all the listed instances or of attribute values of the Purchase instance 106B referenced by the Price instance 106A. Knowledge of these attribute values is needed to determine whether each of the values in the list 107A-1 would be valid. Further, there may be hundreds or thousands of values in the list 107A-1 from which the user 108 would need to identify a valid selection. Thus, it is impractical for the user 108 to go through each of the instances in the list 107A-1 to determine which of the instances would be valid.

Additionally, for a given instance, a user may need to access a hierarchy of multiple instances that affect validity of the given instance based on the rule 102A-1. Going through each of the instances would further require the user's device to execute multiple computations to access attribute values of each instance, access attribute values of instances that affect validity of each instance, and display the attribute values. Even if the user 108 were to access each instance in the list 107A-1, determining the validity of the instances would be difficult, if not impossible, for the user 108 given the complexity of validation rule(s) that govern the validity of the instances.

To address the impracticality of the above-described conventional approach for enforcing valid data assignments, the inventors have developed a new technique that restricts data assignment to only valid values by: (1) identifying the set of valid values that may be assigned to an attribute; and (2) providing that set of valid values to users and/or software so that the users and/or software may use this list to identify the values to which to set the attribute. Thus, when a data assignment is requested (e.g., by a user or process), the techniques developed by the inventors and described herein determine the conditions that must be met by a variable value in order to be valid (e.g., as defined by appropriate validation rules) and identify values that would be valid for assignment based on the conditions. In some embodiments, the techniques identify values that would be valid for assignment to an attribute of a data entity instance. The new techniques therefore make enforcement of valid data assignments more efficient. This mitigates (e.g., reduces or eliminates) the risk of invalid values being assigned to variables in the data processing system.

The inventors have recognized that it is not straightforward to identify valid values that may be assigned to an attribute because, often, complex requirements must be met by a variable value for that value to be considered as valid. For example, requirements (e.g., as implemented by validation rules or any other suitable type of logic used to define validity) may depend on other variables stored by the data processing system. As one example, a variable value may need to be within a range defined by one or more other variables stored in the data processing system to be valid. As another example, a variable value may need to match another variable value in order to be valid. As yet another example, a variable value may be a reference to one or more other objects and the conditions may depend on data values in those objects.

As described herein, in the context of a data processing system that manages data using data entities and instances thereof, a variable may be a data entity instance attribute whose value is to be assigned. One or more validation rules associated with the attribute define the set of valid values—any of which could be assigned to the attribute. However, the rules do not simply provide a list of valid values. Rather, may do so via a set of conditions that may involve other information, for example, values of one or more other variables being managed by the system. As such, the validation rule(s) may depend on one or more attribute values of one or more other data entity instances. Thus, the validation rules are not only complex (because they are dependent on values of multiple other variables), but also depend on values that themselves could be changing. As a result, in order to accurately identify one or more valid values for a particular data entity instance attribute, current values of numerous other variables may need to be considered (e.g., values of attributes referenced by the validation rule(s) associated with the particular data entity instance attribute). As such values can also change, so too can the set of valid values for the particular data entity instance attribute.

The techniques developed by the inventors to identify valid values for assigning to an attribute account for dependencies on other variables by accessing the current values of the other variables and using them to determine which values would be valid for assignment to the variable. For example, the techniques may access attribute values from other data entity instances that dictate the validity of an attribute in a given data entity instance and use the attribute values to determine valid values that can be assigned to the attribute.

Accordingly, in some embodiments, valid values are identified by: (1) programmatically generating a query using validation rule(s) that govern validity of a variable (e.g., an attribute); and (2) executing the query to obtain valid values that can be assigned to the variable. For example, the techniques may involve using a rule that governs the validity of an attribute value to programmatically generate a query, and executing the query (e.g., against data managed by the data processing system) to obtain values that would be valid for assignment as the attribute value.

Accordingly, in some embodiments, the techniques developed by the inventors and described herein identify valid value(s) for an attribute in an instance of a data entity using validation rule(s) associated with the data entity. The techniques may use the validation rule(s) to identify the valid value(s) for the attribute by: (1) generating a query for the valid value(s) using condition(s) part of the validation rule(s); and (2) executing the generated query to obtain the valid value(s). The techniques may limit assignment of the attribute's value to the identified valid value(s). For example, the techniques may only present the valid value(s) to a user (e.g., in a graphical user interface (GUI)), or to a software application for selection of a value to assign to the attribute. In another example, the techniques may reject a value submitted for assignment to the attribute that is not one of the valid value(s). The techniques may assign a value of the attribute in the instance of the data entity based on input (e.g., from a user or process) indicating a selection of one or more of the identified valid value(s). The techniques thus mitigate invalid attribute value assignments in the data processing system.

Some embodiments provide for a system that enforces valid data assignments in a data processing system configured to process data that is updated by users (e.g., through a GUI) and/or processes (e.g., software applications). The data processing system stores the data using data entities and instances thereof. The data processing system receives a request to assign a value to an attribute (e.g., Owner attribute 400A-3 in FIG. 4B) in a first data entity instance (e.g., North America Credit Scores instance 420 in FIG. 4B) of a first data entity (e.g., Biz Term data entity 400A in FIG. 4A). The first data entity (e.g., Biz Term data entity 400A) comprises a plurality of attributes (e.g., attributes 400A-1, 400A-2, 400A-3, 400A-4 in FIG. 4A) including the first attribute (e.g., the Owner attribute 400A-3) and a second attribute (e.g., the Institution attribute 400A-4 in FIG. 4A). The first data entity is associated with one or more validation rules (e.g., validation rules 404 in FIG. 4C) that attribute values in instances of the first data entity must comply with to be valid. The validation rule(s) include a first validation rule (e.g., rule 404A in FIG. 4C) associated with the first attribute (e.g., the Owner attribute 400A-3) that comprises a first condition on the first attribute that depends on the second attribute (e.g., the Institution attribute 400A-4). The system may be configured to identify, using the first validation rule (e.g., rule 404A), one or more valid values for the first attribute by: (1) generating a query (e.g., query 408 in FIG. 4D) for the one or more valid values using the first condition on the first attribute; and (2) executing the generated query (e.g., against a database storing data entity instances) to obtain the valid value(s) (e.g., query results 410 in FIG. 4D) for the first attribute. The system may be configured to assign a value to the first attribute in the first data entity instance in accordance with input (e.g., received through a GUI) indicating a selection of at least one of the valid value(s) for the first attribute. The system may be configured to assign the selected at least one valid value to the first attribute.

In some embodiments, the system may be configured to generate the query (e.g., query 408 in FIG. 4D) for the valid value(s) for the first attribute (e.g., Owner attribute 400A-3 in FIG. 4B) using the first condition on the first attribute by: (1) identifying a current value of the second attribute (e.g., Institution attribute 400A-4) in the first data entity instance (e.g., North America Credit Scores instance 420); and (2) generating the query (e.g., query 408 in FIG. 4D) using the current value of the second attribute in the first data entity instance.

Figure 4A:
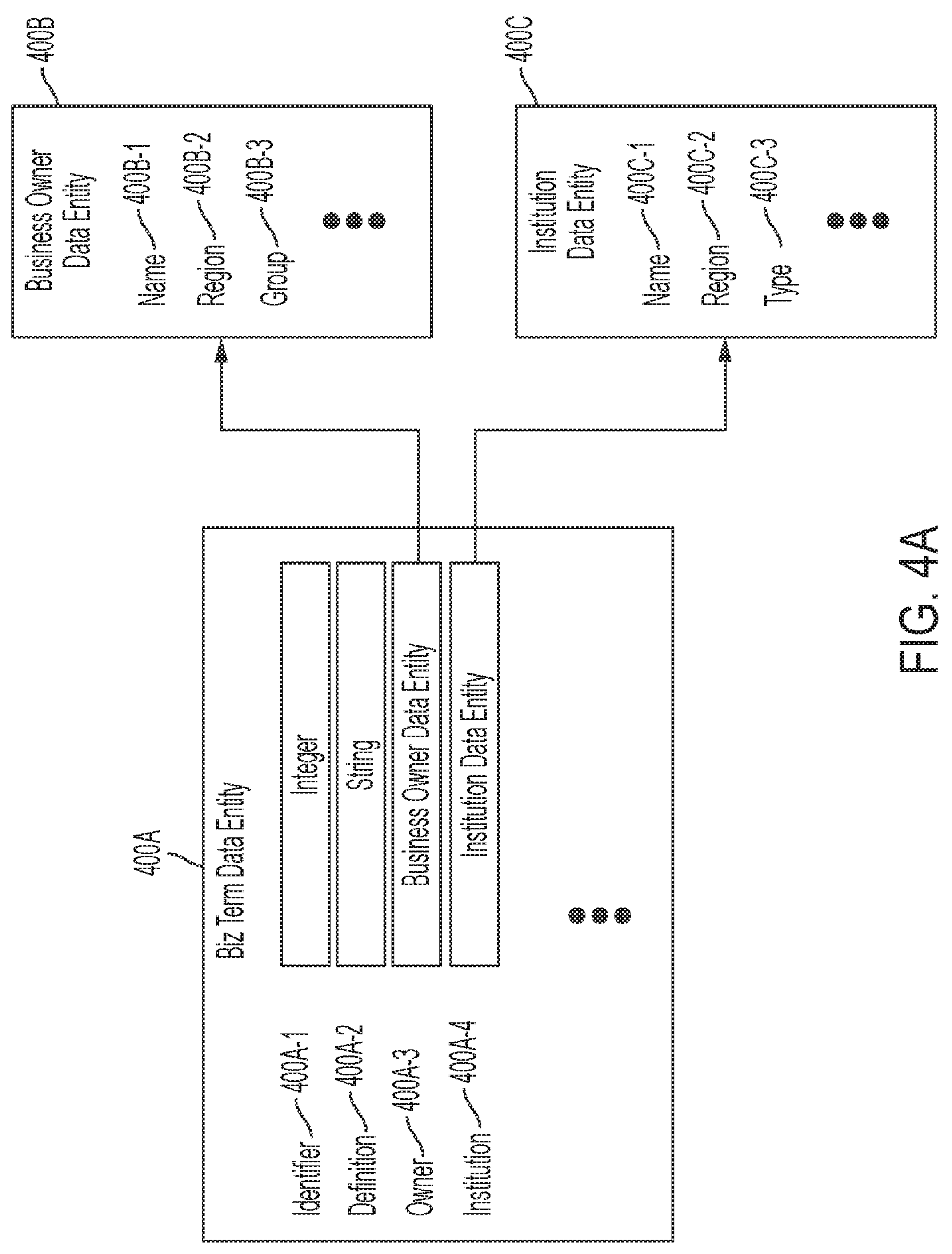
FIG. 4A is a block diagram of an example data entity, according to some embodiments of the technology described herein.

In some embodiments, the current value of the second attribute in the first data entity instance is assigned an instance (e.g., MegaBank instance 422 in FIG. 4B) of a second data entity (e.g., Institution data entity 400C in FIG. 4A). The system may be configured to generate the query based on the current value of the second attribute in the first data entity instance by: (1) accessing a first attribute value (value of the Region attribute 400C-2) from the instance of the second data entity (e.g., MegaBank instance 422); and (2) generating the query (e.g., query 408 in FIG. 4D) based on the first attribute value from the instance of the second data entity.

In some embodiments, the at least one validation rule comprises a plurality of validation rules (e.g., rules 404A, 404B in FIG. 4C) associated with respective attributes (e.g. Owner attribute 400A-3 and Institution attribute 400A-4) of the first data entity (e.g. Biz Term data entity 400A). The system may be configured to identify the first validation rule from among the plurality of validation rules based on an association of the first validation rule (e.g., Rule 404A) with the first attribute (e.g. Owner attribute 400A-3).

In some embodiments, the first validation rule comprises a second condition on the first attribute. The system may be configured to generate the query (e.g., query 408 in FIG. 4D) for the one or more valid values by: (1) generating a first portion (e.g., a first set of SQL statements) of the query based on the first condition on the first attribute; and (2) generating a second portion (e.g. a second set of SQL statements) of the query based on the second condition on the first attribute. In some embodiments, the system may be configured to generate the query for the valid value(s) using the first condition by: (1) transforming the first condition on the first attribute into a query criterion; and (2) integrating the query criterion into the query.

In some embodiments, the system may be configured to assign an instance of a second data entity (e.g., Business Owner data entity 400B in FIG. 4A) as the value to the first attribute (e.g., Owner attribute 400A-3) in the first data entity instance. In some embodiments, the system may be configured to generate the query (e.g., query 408 in FIG. 4D) for the valid value(s) by generating a query on instances of the second data entity. In some embodiments, the system may be configured to execute the generated query on a subset of data consisting of instances of the second data entity.

In some embodiments, the first attribute indicates an owner, an access security level, a data source, or a data format associated with the first data entity instance.

In some embodiments, the first data entity instance stores information about a software application or a dataset as attribute values in the first data entity instance. For example, the first attribute may indicate a data source or a data format to be used by the software application when attempting to invoke a function of the software application. The valid value(s) are suitable for invoking the function of the software application. As another example, the first attribute indicates an access security level associated with the dataset to be used when attempting to provide access to the dataset. The valid value(s) may be one or more access security levels providing access to the dataset.

In some embodiments, the system may be configured to transmit, to a client device, an indication of the valid value(s) for the first attribute for display in a graphical user interface (GUI). The system may be configured to receive, from the client device, the input indicating the selection of the at least one of the one or more valid values for the first attribute through the GUI. In some embodiments, the system may be configured to identify the valid value(s) for the first attribute by identifying one or more instances of a second data entity as the one or more valid values for the first attribute.

In some embodiments, the first validation rule comprises a second condition on the first attribute. The system may be configured to identify, using the first validation rule, the valid value(s) by generating a query by: (1) generating a first query criterion using the first condition on the first attribute; and (2) generating a second query criterion using the second condition on the first attribute. In some embodiments, the system may be configured to identify, using the first validation rule, one or more invalid values for the first attribute and prevent transmission of the invalid value(s) (e.g., to a client device).

In some embodiments, when the first data entity instance does not have a value assigned to the second attribute, and system may be configured to identify the valid value(s) for the first attribute by: (1) identifying an unassigned value entered for the second attribute; and (2) generating the query for the one or more valid values using the unassigned value for the second attribute.

In some embodiments, a client device may be configured to receive, through a GUI, input indicating a request to assign a value to a first attribute in a first data entity instance of a first data entity. The client device may be configured to transmit, to the data processing system, the request, wherein the request causes the data processing system to identify, using the first validation rule, one or more valid values for the first attribute. The client device may be configured to receive, from the system, the valid value(s) for the first attribute. The client device may be configured to display, in the GUI, an indication of the one or more valid values for the first attribute. The client device may be configured to receive, through the GUI, input indicating a selected value of the valid value(s) to assign to the first attribute. The client device may be configured to transmit, to the data processing system, an indication of the selected value for assignment to the first attribute.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Figure 2A:
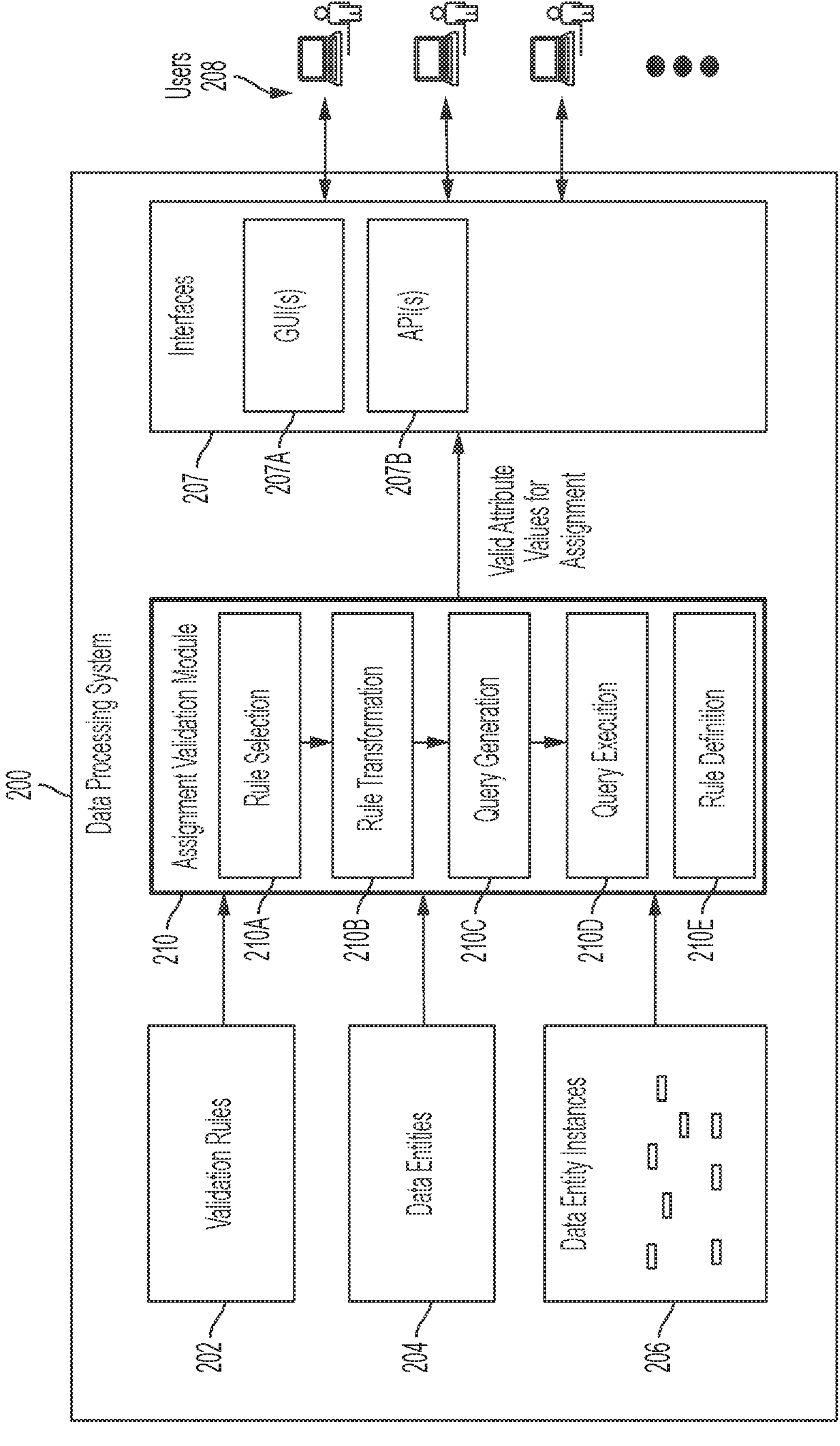
FIG. 2A is a block diagram of a data processing system, according to some embodiments of the technology described herein.

FIG. 2A is a block diagram of a data processing system 200, according to some embodiments of the technology described herein. The data processing system 200 includes validation rules 202, data entities, 204, and data entity instances 206. The data processing system 200 includes interfaces 207 that allow client devices of users 208 to interact with the data processing system 200. The data processing system 200 further includes an assignment validation module 210 that provides valid attribute values for assignment via the interfaces 207 (e.g., to present to the users 208 in a GUI).

The data processing system 200 may be configured to use data entities 204 to manage data. Each of the data entities 204 may specify a set of one or more attributes for which each instance of the data entity may be assigned a value. For example, the data entities 204 may include an institution data entity that specifies a set of attributes. In this example, instances of the institution data entity may store information about respective institutions (e.g., corporations, companies, businesses, etc.) as values assigned to the set of attributes. In another example, the data entities 204 may include a business term data entity that specifies a set of attributes. In this example, instances of the business term data entity may store information about a type of business data (e.g., customer credit scores, account balances, salaries, etc.). The data processing system 200 may be configured to instantiate any number of instances of a data entity.

The data processing system 200 may be configured to store data using data entity instances 206. The data entity instances 206 may each be instantiated from a respective data entity that defines the data entity instance. Attributes of data entity instances may each be assigned one or more values (e.g., by a user and/or a process). The data processing system 200 may be configured to receive a request (e.g., from a client device and/or a process) to assign a value to an attribute. The data processing system 200 may be configured to assign a value to the attribute (e.g., by performing process 1000 described herein with reference to FIG. 10).

The data processing system 200 may be configured to assign values to attributes of data entity instances. In some embodiments the data processing system 200 may be configured to assign a value to an attribute based on user input received through a GUI provided by the data processing system 200 on a client device. For example, a user may provide input indicating a selection of a value to assign to an attribute in a data entity instance. In some embodiments, the data processing system 200 may be configured to assign a value to an attribute based on input from a process. For example, the data processing system 200 may receive input from a software application indicating a value to assign to an attribute in a data entity instance. In some embodiments, the data processing system 200 may be configured to assign a value to an attribute as part of executing an internal process of the data processing system 200. For example, the data processing system 200 may automatically assign a default value to an attribute of a data entity instance.

The data processing system 200 may be configured to use the validation rules 202 to enforce valid data assignments in the data entity instances 206. Each of the validation rules 202 comprises a set of one or more conditions on an attribute of a data entity associated with the validation rule. In order for an instance of the data entity to be valid, a value assigned to the attribute in the instance must meet the condition(s) of the validation rule. The data processing system 200 may include any number of validation rules 202. The data processing system 200 may be configured to use the validation rules 202 to ensure that valid values are assigned to attributes of data entity instances.

The data processing system 200 may be configured to associate a validation rule with a data entity. The data processing system 200 may be configured to associate a validation rule with a data entity by storing, in the validation rule, a reference to an associated data entity. For example, the data processing system 200 may store an identifier (e.g., a name, id number, or other identifier) of an associated data entity in the validation rule. In another example, the data processing system 200 may store, in the validation rule, a pointer to an associated data entity. In some embodiments, the data processing system 200 may be configured to store, in the validation rule, an indication of an attribute of an associated data entity that the validation rule is associated with. A value of the attribute in a data entity instance may be required to meet validation rule(s) associated with the attribute in order for the value to be valid. In some embodiments, the data processing system 200 may be configured to associate a validation rule with a data entity by storing a reference to the validation rule in the data entity. For example, the data processing system 200 may store an identifier (e.g., name, id number, or other identifier) of the validation rule in the data entity. In another example, the data processing system 200 may store a pointer to the validation rule in the data entity.

The data processing system 200 may be configured to store the validation rules 202, data entities 204, and data entity instances 206 in one or more datastores. The datastore(s) may be stored in a data persistence layer of the data processing system 200 as described herein with reference to FIG. 7. The datastore(s) may consist of storage hardware (e.g., hard disk drives, solid state drives, disks, and/or other types of storage hardware). The datastore(s) may be co-located or distributed geographically (e.g., in a distributed database system). In some embodiments, the datastore(s) may be cloud based data storage. For example, the datastore(s) may be stored in one or more data centers that can be accessed through the Internet.

The interfaces 207 may allow users 208 to interact with the data processing system 200. The interfaces 207 may include one or more graphical user interfaces (GUIs) 207A.

In some embodiments, the GUI(s) 207A may include a GUI for creation and editing of a validation rule. The GUI may be configured to allow creation of a new validation rule and specification of information about the validation rule (e.g., a name, associated data entity, associated attribute of the data entity, condition(s), and/or other information). For example, the GUI may include one or more fields in which information about the validation rule can be entered.

In some embodiments, the GUI(s) 207A may include a GUI that allows assignment of an attribute value in a data entity instance. The GUI may be configured to display information about a data entity instance such as the name, current attribute values, a data entity defining the data entity instance, and/or other information about the data entity instance. The GUI may be configured to allow a user to assign a value to an attribute of the data entity instance. In some embodiments, the GUI may be configured to allow a user to assign a value to an attribute by: (1) presenting one or more valid values of the attribute; and (2) receiving a selection of a value of the valid value(s) for assignment to the attribute. In some embodiments, the GUI may be configured to allow a user to view invalid values of an attribute in response to selection of an option (e.g., a checkbox indicating that invalid values should be displayed). In some embodiments, the GUI may be configured to provide graphical indications about a value selected for assignment to an attribute. For example, the GUI may display a graphical element (e.g., an icon) indicating that the selected value is invalid when it is determined that the selected value is invalid. In another example, the GUI may display a graphical element indicating that a value was not assigned to an attribute because the value is invalid. In another example, the GUI may be configured to display a graphical element indicating that a selected value for assignment is valid and/or that the value was successfully assigned to the attribute. In some embodiments, the GUI may be configured to display an indication of one or more validation rules that are applicable to the data entity instance. For example, the GUI may provide a link to a validation rule that the user can select to view information about the validation rule.

In some embodiments, the GUI(s) 207A may include a GUI that allows a user to view information about a data entity. The GUI may be configured to display information about the data entity (e.g., name, description, attributes, associated validation rule(s), and/or other information). The GUI may be configured to allow a user to edit information about the data entity. For example, the GUI may allow a user to configure the attributes of the data entity. The GUI may be configured to allow a user to navigate to one or more validation rules associated with the data entity. For example, the GUI may allow the user to follow a link to a validation rule associated with the data entity.

In some embodiments, the interfaces 207 may include one or more interfaces through which processes (e.g., software applications) can interact with the data processing system 200. For example, the interfaces may include one or more application program interfaces (APIs) 207B through which software applications can interact with the data processing system 200. The API(s) 207B may allow software applications to create and/or edit validation rules, data entities, and/or data entity instances. The API(s) may further allow software applications to assign attribute values in data entity instances. In some embodiments, the interfaces 207 may allow processes external to the data processing system 200 to interact with the data processing system 200. In some embodiments, the interfaces 207 may allow internal processes to perform actions within the data processing system 200.

Each of the users 208 shown in FIG. 2A may communicate with the data processing system 200 using a client device. A client device may be any suitable computing device. For example, the client device may be a laptop, desktop, smartphone, tablet, or any other suitable computing device. In some embodiments, a client device may communicate with the data processing system 200 through a communication network. For example, the communication network may be the Internet.

In some embodiments, the assignment validation module 210 may be configured to identify one or more valid values for an attribute, and present the valid value(s) to a user or process to select from. The assignment validation module 210 may then assign a value to the attribute based on a received selection of a value from the valid value(s). In some embodiments, the assignment validation module 210 may be configured to remove invalid values from a provided selection of values and thus prevent selection of an invalid value for assignment to an attribute. In some embodiments, the assignment validation module 210 may be configured to provide an indication of whether value(s) are valid or invalid for an attribute. For example, a GUI may be configured to display, in a listing of values for an attribute, an indication of whether each value is valid or invalid.

Figure 2B:
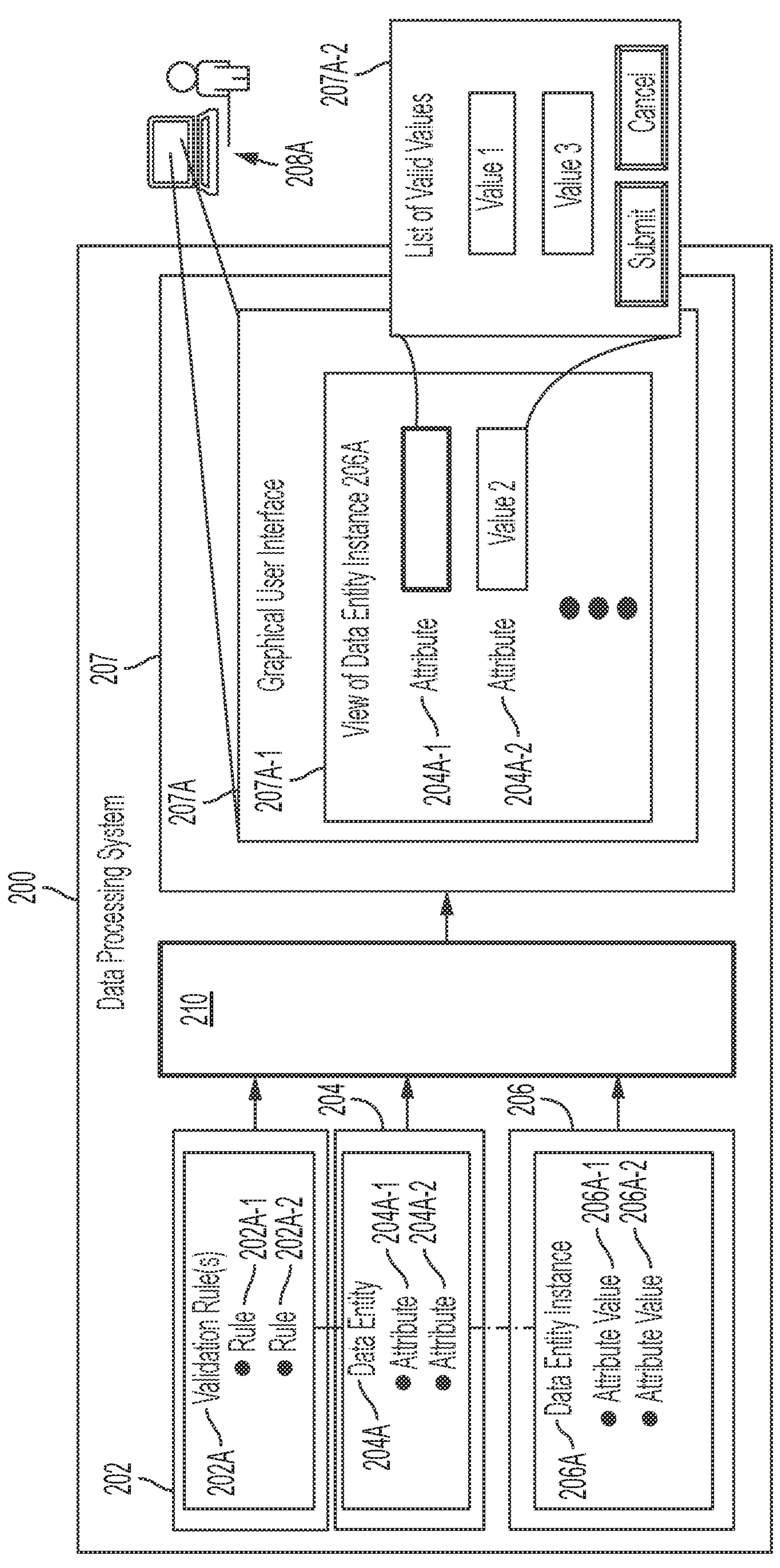
FIG. 2B shows a GUI for assignment of a value to an attribute in a data entity instance in the data processing system of FIG. 2A, according to some embodiments of the technology described herein.

FIG. 2B shows a GUI 207A for assignment of a value to an attribute in a data entity instance 206A in the data processing system of FIG. 2A, according to some embodiments of the technology described herein. The data entity instance 206A is an instance of data entity 204A with attributes 204A-1, 204A-2. The data entity instances 206 is configured to store an attribute value 206A-1 of attribute 204A-1 and attribute value 206A-2 of attribute 204A-2. The validity of the attribute values 206A-1, 206A-2 may be governed by validation rule(s) 202A. The validation rule(s) 202A include rules 202A-1, 202A-2.

As shown in the example embodiment of FIG. 2B, the GUI 207A includes a view 207A-1 of the data entity instance 206A showing various attribute values of the data entity instance 206A and which allows assignment of values to attributes. As illustrated in FIG. 2B, the assignment validation module 210 identifies a list 207A-2 of valid values which are presented to the user 208A in the GUI 207A.

In some embodiments, the user 208A may provide input through the GUI 207A indicating a selection of one of the valid values to assign to the attribute 204A-1 of data entity instance 206A. The assignment validation module 210 thus eliminates the possibility that the user 208A selects an invalid value to assign to the attribute 204A-1.

Although in the example embodiment of FIG. 2B the list 207A-2 of values presented to the user in the GUI 207A includes only valid values, in some embodiments, the list 207A-2 may include both valid and invalid values, with an indication of whether each of the values is valid or invalid. Thus, a user may have knowledge of which values are valid or invalid for the attribute 204A-1. This may facilitate the user in selecting a valid value for assignment to the attribute 204A-1 and mitigates the risk of assignment of an invalid value.

Figure 2C:
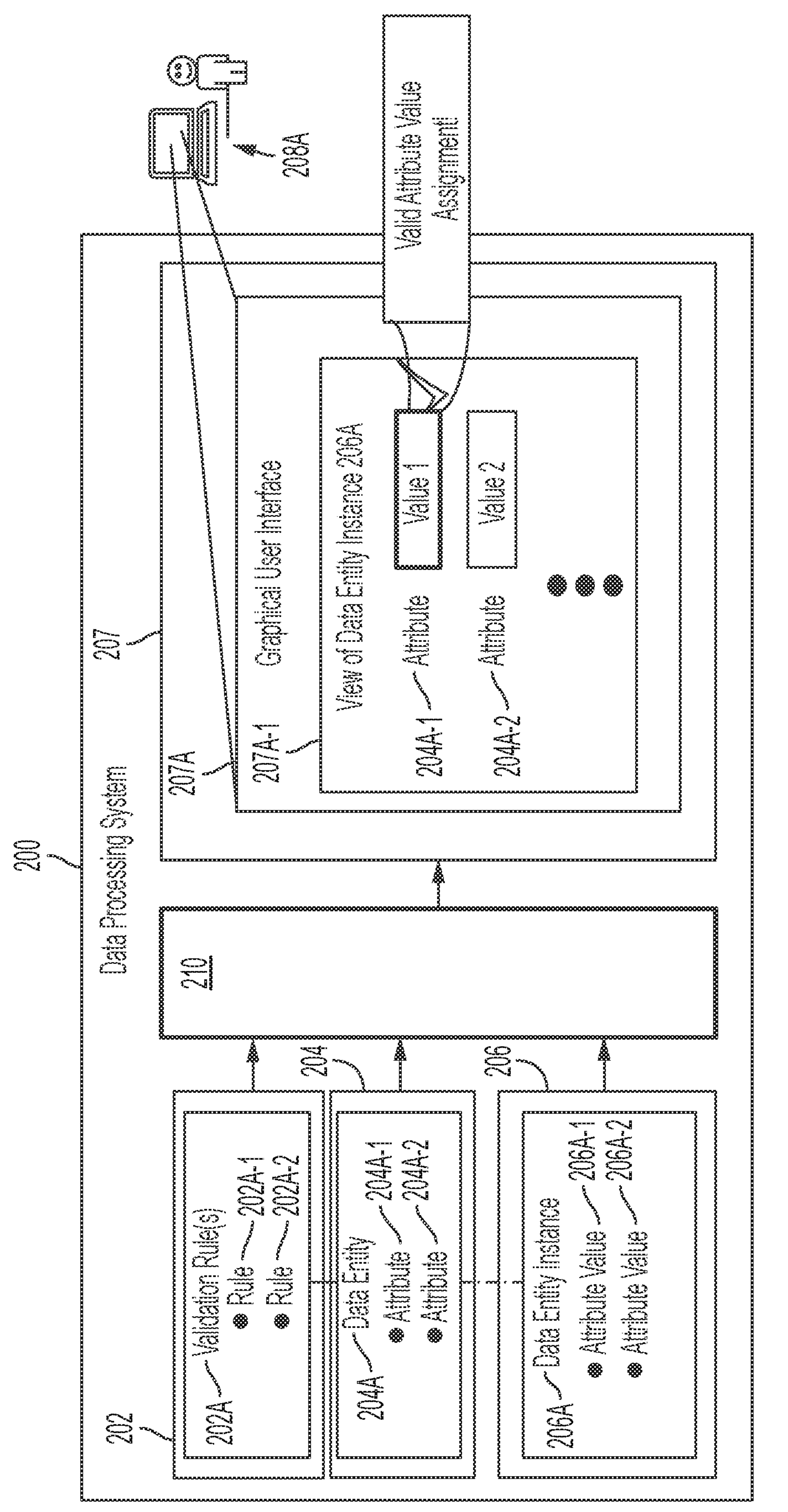
FIG. 2C shows the graphical user interface of FIG. 2B after selection of a valid value for the attribute, according to some embodiments of the technology described herein.

FIG. 2C shows the GUI 207A of FIG. 2B after selection of a valid value for the attribute 204A-1, according to some embodiments of the technology described herein. As shown in the example of FIG. 2C, the GUI 207A may provide a graphical indication that the assigned value is valid.

Figure 2D:
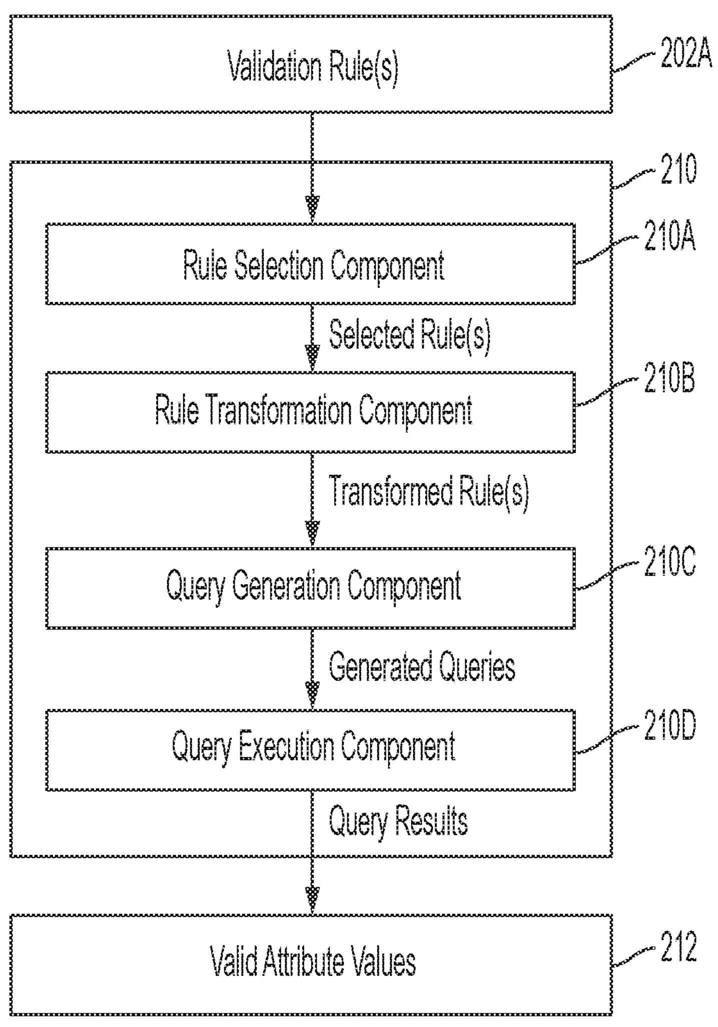
FIG. 2D is a diagram illustrating interaction among components of an assignment validation module of the data processing system of FIG. 2A, according to some embodiments of the technology described herein.

FIG. 2D is a diagram illustrating interaction among the components 210A, 210B, 210C, 210D of the assignment validation module 210 of FIG. 2A, according to some embodiments of the technology described herein. The assignment validation module 210 uses a set of validation rule(s) 202A associated with a data entity to identify valid attribute values 212 for an attribute of an instance of the data entity. In some embodiments, the flow of data among the components of the assignment validation module 210 shown in FIG. 2D may occur when the data processing system 200 obtains a request to assign a value to an attribute of an instance of a data entity. In the example of FIG. 2D, the flow of data among the components may occur as part of identifying valid values 212 of the attribute 204A-1.

In some embodiments, the rule selection component 210A may be configured to select one or more validation rules from the set of validation rule(s) 202A. The validation rule(s) 202A may be associated with a data entity 204A as described herein with reference to FIG. 2B. The rule selection component 210A may be configured to select one or more of the set of validation rule(s) 202A that are associated with the attribute of the data entity that is being assigned a value in the instance of the data entity. The rule selection component 210 may be configured to select the validation rule(s) associated with the attribute from the set of validation rule(s) 202A by: (1) accessing the set of validation rule(s) 202A associated with the data entity; (2) identifying the rule(s) that are associated with the attribute for which a value is to be assigned; and (3) selecting the identified rule(s). In some embodiments, the set of validation rule(s) 202A may each indicate an attribute that the validation rule is associated with. The rule selection component 210 may be configured to use the indicated attribute(s) by the set of validation rule(s) 202A to identify validation rule(s) that are associated with the attribute that is to be assigned a value in an instance of the data entity.

In some embodiments, the rule transformation component 210B may be configured to transform the selected validation rule(s) for use in generating one or more queries. In some embodiments, the rule transformation component 210B may be configured to transform the selected rule(s) by: (1) identifying, in the selected validation rule(s), each condition on the attribute; and (2) transforming each condition into a respective criterion. For example, the rule transformation component 210B may transform each rule into a logical expression that can be used as a criterion in a query.

In some embodiments, a condition on the attribute being assigned a value may depend on another attribute of the data entity. In such embodiments, the rule transformation component 210B may be configured to transform a rule by: (1) determining a value of the other attribute in the instance of the data entity; and (2) generating the transformed rule using the determined value. The rule transformation component 210B may be configured to determine a current attribute value of the instance that a condition depends on, and transform the condition into a criterion using the current value. For example, the rule transformation component 210B may replace an attribute identifier in a condition expression with a value of the attribute in the instance of the data entity. An example of such a transformation is described herein with reference to FIG. 4D, FIG. 5D, and FIG. 6D.

In some embodiments, an attribute may need to be assigned an instance of another data entity as a value. In such embodiments, the rule transformation component 210B may be configured to transform condition(s) in the selected rule(s) such that the transformed rule(s) can be used to generate a query that will be executed only on instances of the other data entity (e.g., to reduce the amount of data on which the query needs to be executed). The rule transformation component 210B may be configured to modify a data entity path specified in a rule by removing a specification of a data entity of which instances will be queried. For example, in a condition on instances of data entity "B" to be valid for assignment to an attribute, a rule may use a data entity path of "B.C.p" in specifying the condition. The rule transformation component 210B may remove the specification of the data entity "B" from the data entity path to obtain the data entity path to "C.p" in the transformed rule because a query generated from the transformed rule will be executed only on instances of data entity "B". As the query will only be executed on instances of data entity "B", the query would not require specification of the data entity "B" in a data entity path. An example such transformation is described herein with reference to FIG. 4B, FIG. 5D, and FIG. 6D.

In some embodiments, a rule may specify a condition on instances of a data entity to be valid for assignment to an attribute without indicating a particular attribute of the data entity. For example, a rule may indicate a simple path "B" in specifying a condition on instances of data entity "B" to be valid for assignment to an attribute. In such embodiments, the rule transformation component 210B may be configured to replace the indicated data entity with a particular attribute of the data entity. In some embodiments, the particular attribute may be a default attribute that is selected when no attribute is specified in a condition. For example, the rule transformation component 210B may replace the simple path "B" with an ID attribute (e.g., "B_ID") of the data entity.

The query generation component 210C may be configured to use the transformed rule(s) to generate a query. As described herein with reference to the rule transformation component 210B, the transformed rule(s) may comprise one or more criteria that can be assembled into one or more queries. In some embodiments, the query execution component 210D may be configured to assemble all the transformed rule(s) into a single query. For example, the query execution component 210D may combine multiple criteria by applying an AND operation to the criteria. In some embodiments, the query execution component 210D may generate multiple queries. For example, the query execution component 210D may generate a query for each of multiple transformed rules. Example queries generated by the query generation component 210C are described herein with reference to FIG. 4B, FIG. 5D, and FIG. 6D.

The query execution component 210D may be configured to execute one or more queries generated by the query generation component 210C. For example, a query may be an SQL query. The query execution component 210D may be configured to execute the SQL query on a datastore (e.g., storing data entity instances 206) of the data processing system 200 to obtain query results. In some embodiments, the query execution component 210D may be configured to execute a query on the data entity instances 206 of the data processing system 200 or a subset thereof. For example, the query may be configured (e.g., by the query generation component 210C) to execute on instances of a particular data entity (e.g., that can be assigned as a value to the attribute being assigned). In another example, the query may be configured to execute on all the data entity instances 206.

The assignment validation module 210 may be configured to provide the query results as the valid attribute values 212. In some embodiments, the assignment validation module 210 may be configured to present the valid attribute values 212 to a user through a GUI. For example, the assignment validation module 210 may present the valid attribute values 212 in an attribute value assignment menu of the GUI that allows a user to select one or more of the valid attribute values 212 to assign to the attribute. In some embodiments, the assignment validation module 210 may be configured to transmit the valid attribute values 212 to a process. For example, the assignment validation module 210 may transmit the valid attribute values 212 to a software application (e.g., through an API) that can use the valid attribute values to programmatically assign a valid value to the attribute.

Figures 3A, 3B:
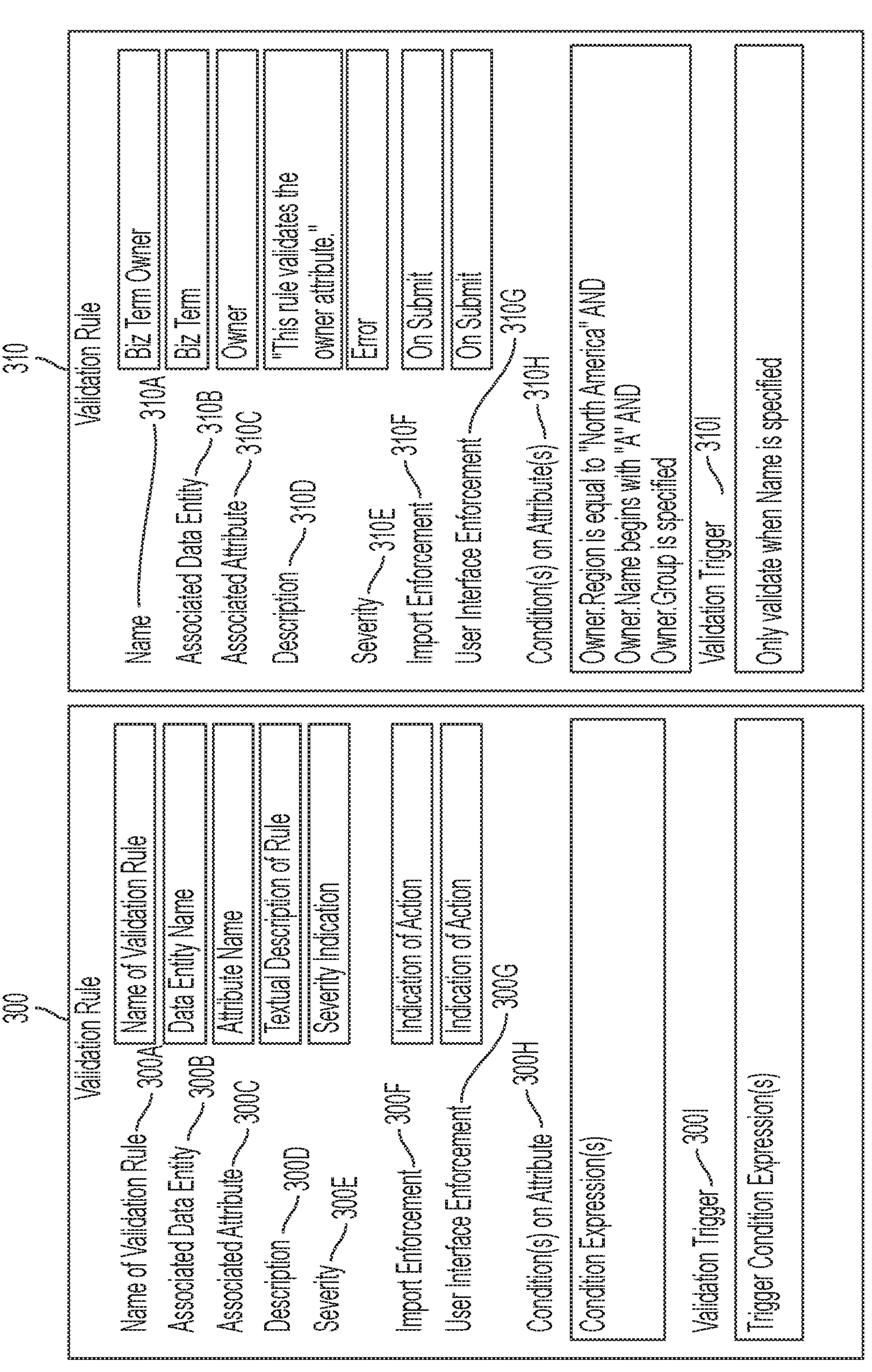
FIG. 3A is a diagram of a validation rule, according to some embodiments of the technology described herein.
FIG. 3B is a diagram of an example of the validation rule shown in FIG. 3A, according to some embodiments of the technology described herein.

FIG. 3A is a diagram of a validation rule 300, according to some embodiments of the technology described herein. As shown in FIG. 3A, the validation rule 300 includes various information. The validation rule 300 includes a name 300A identifying the validation rule 300. For example, the name 300A may be an alphanumeric identifier identifying the rule. The validation rule 300 includes an indication 300B of a data entity that the validation rule 300 is associated with. For example, the indication 300B of the associated data entity may be a name of the data entity, or other identifier of the data entity. The validation rule 300 also includes an indication 300C of an attribute to which the rule 300 applies. For example, the indication 300C of the attribute may be a name of the attribute in the data entity indicated by 300B. The validation rule 300 includes a description 300D of the validation rule 300. For example, the description 300 may be a textual description. The validation rule 300 includes a severity 300E specifying a type of alert displayed to a user (e.g., in a GUI) when an assigned attribute value violates rule 300. The validation rule 300 includes an import enforcement 300F specifying a type of action to be taken when an attribute value violates the rule 300. For example, the import enforcement 300F may block assignment of the attribute value. The validation rule 300 includes a user interface enforcement 300G specifying a user interface action in which to enforce the rule 300. For example, the user interface enforcement 300G may indicate that the rule 300 is to be enforced upon submission of an attribute value for assignment.

As shown in FIG. 3A, the validation rule 300 includes condition(s) 300H on the attribute that the validation rule 300 is associated with. The condition(s) may be specified by or more logical expressions. The validation rule 300 includes a validation trigger 3001 that specifies condition(s) that are required for the validation rule 300 to be used for validation. The condition(s) may be specified by one or more logical expressions.

FIG. 3B is a diagram of an example 310 of validation rule 300 shown in FIG. 3A, according to some embodiments of the technology described herein. As shown in FIG. 3B, the name 310A of the validation rule 310 is "Biz Term Owner". The associated data entity 310B is listed as "Biz Term" and the associated attribute 310C is listed as "Owner". The validation rule 310 has a description 310D "this rule validates the owner attribute". The validation rule 310 indicates a severity 310E of "Error", indicating that the data processing system 200 will reject an assignment of a value to the owner attribute in an instance of the Biz Term data entity if it violates the validation rule 310.

The validation rule 310 indicates an import enforcement 310F of being "On Submit". This may indicate that the data processing system 200 validates a value when data is imported into the data processing system 200. The validation rule 310 further indicates a user interface enforcement 310G of "On Submit" indicating that the data processing system 200 validates a selected value for the attribute when a user submits an updated data entity instance (e.g., for assignment of selected value(s) to attribute(s) of the data entity instance).

The validation rule 310 includes the following conditions 310H on the Owner attribute: (1) Owner.Region must be equal to "North America"; (2) Owner.Name begins with "A"; and (3) the Owner.group is specified. An AND operation is applied to the conditions indicating that all of them must be met in order for a value of the Owner attribute to be valid in an instance of the Biz Term data entity. In the example of FIG. 3B, the value assigned to the Owner attribute must be an instance of another data entity. The first condition indicates that a Region attribute of the assigned instance must be equal to "North America". The second condition indicates that the Name attribute of the assigned instance must begin with the letter "A". The third condition indicates that the Group attribute of the assigned instance must have a value specified in the instance.

The conditions 310H may be used by the data processing system 200 to identify valid values for assignment to the Owner attribute, and/or to validate a value previously assigned to the Owner attribute. The validation rule 310 includes a validation trigger 3101 indicating that validation is only to be performed when a name of the instance of the Biz Term data entity being validated has a Name attribute value specified.

Figure 3C:
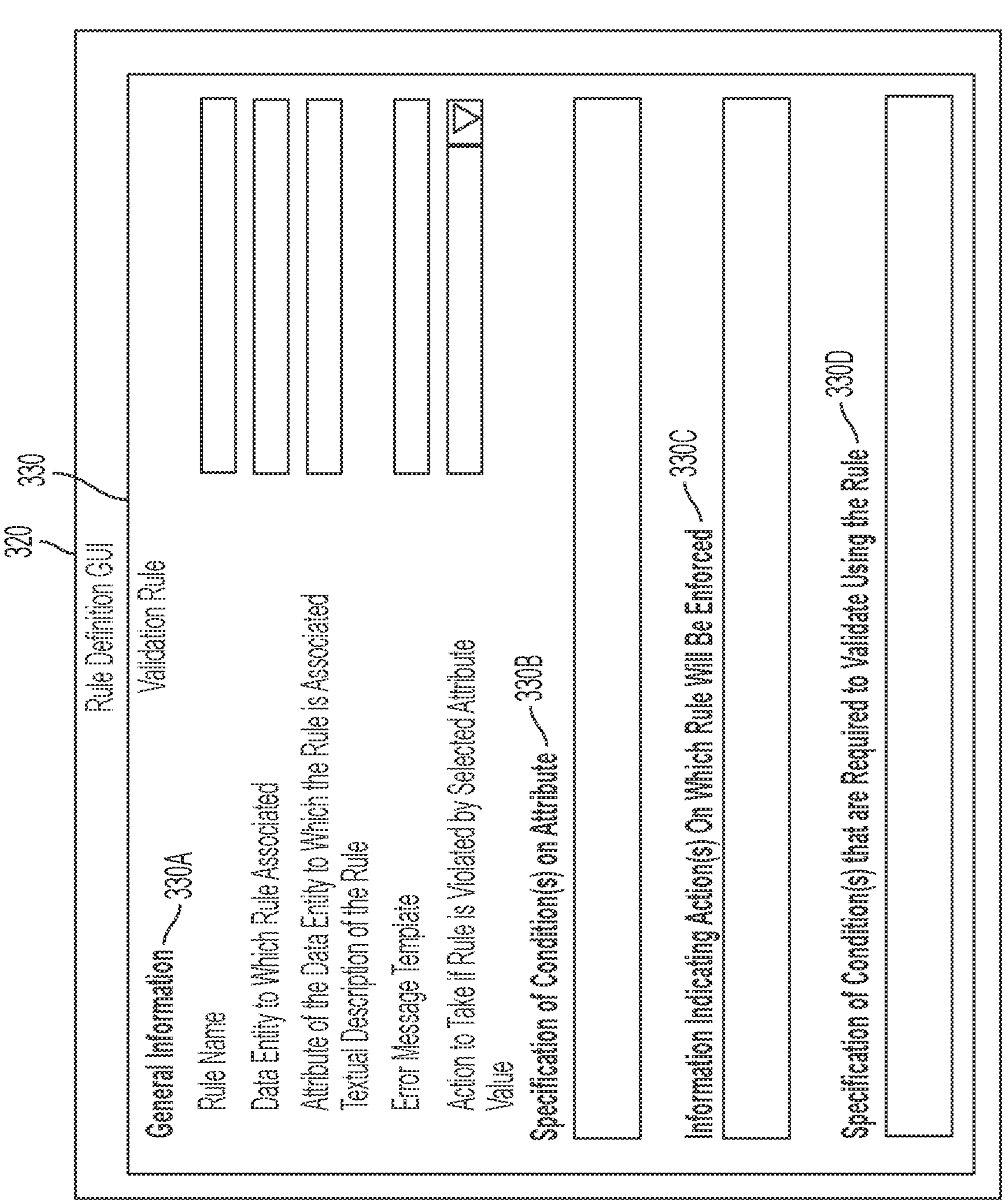
FIG. 3C is an example GUI for defining one or more validation rules, according to some embodiments of the technology described herein.

FIG. 3C shows an example rule definition GUI 320 for defining a validation rule 330, according to some embodiments of the technology described herein. As shown in FIG. 3A, the rule definition GUI 320 includes a generation information section 330A, a section 330B for specifying condition(s) on an attribute, a section 330C for indicating one or more conditions on which the rule 330 is to be enforced, and a section 330D for specifying of one or more conditions that are required to validate using the validation rule 330.

As shown in FIG. 3C, the general information section 330A includes elements for specifying a rule name, an indication of a data entity to which the rule is associated, a textual description of the rule, and an indication of an action to take if the rule is violated by a selected attribute value.

In some embodiments, the rule name may identify the validation rule 330 among other validation rules. In some embodiments, the validation rule 330 may include an identifier in addition to or instead of the rule name. For example, the validation rule 330 may include an alphanumeric identifier.

As shown in the example of FIG. 3C, in some embodiments, an indication of a data entity to which the rule is associated is stored in the validation rule 330. The indication may be a name of the data entity to which the validation rule 330 is associated. For example, the validation rule 330 may store a string consisting of the name of the data entity. In some embodiments, the validation rule 330 may include a reference (e.g., a pointer, a URL, or other reference) to the data entity to which the rule is associated.

In some embodiments, the textual description of the validation rule 330 may be a string with a description of the validation rule 330. For example, the textual description of the rule 330 may provide a general description of the condition(s) on an attribute that are specified in the validation rule 330.

In some embodiments, actions that can be taken when the validation rule 330 is violated by a selected attribute value may include providing a visual indication to a user or process that the selected attribute value is invalid, preventing assignment of an invalid value, preventing a user interface action (e.g., submission for assignment), and/or other action. In some embodiments, the action to be taken if a selected value for assignment is invalid may be indicated by a severity level. For example, a first severity level (e.g., "warning") may cause the data processing system 100 to present an indication (e.g., through a GUI) that a selected value is invalid, and a second severity level (e.g., "error") may prevent the data processing system 200 from assigning an invalid value to an attribute.

In some embodiments, the information in section 330B indicating the action(s) on which the validation rule 330 will be enforced may include an indication of a user interface action at which the validation rule 330 will be enforced. For example, the user interface action may be selection of a save option, selection of an option to submit a value for assignment, advancing in a workflow, and/or other user interface action. In some embodiments, the information 330B indicating the action(s) on which the validation rule 330 is enforced may indicate an import action. For example, the import action may be a submission of a value for assignment to an attribute. In another example, the information 330B may indicate an action to reject assignment of an attribute value that fails to meet the validation rule 330, while allowing other assignments (e.g., that are valid values).

In some embodiments, the specification 330C of condition(s) on an attribute may comprise one or more expressions of the condition(s). In some embodiments, each of the expression(s) may be a logical expression indicating a respective condition on the attribute. In some embodiments, each of the expression(s) may be in a particular software coding language (e.g., C++, PYTHON, or another coding language). In some embodiments, each of the expression(s) may be specified through a GUI that allows definition of a logical expression specifying condition(s) on the attribute. The data processing system 200 may be configured to translate the input received through the GUI into instructions in a coding language. Example condition(s) on an attribute and expression(s) thereof are described herein.

The specification 330D of condition(s) that are required for validation using the validation rule 330 may comprise one or more expressions of the condition(s). In some embodiments, each of the expression(s) may be a logical expression indicating a respective condition required to validate a data entity instance using the validation rule 330. In some embodiments, each of the expression(s) may be in a particular software coding language (e.g., C++, PYTHON, or another coding language). In some embodiments, each of the expression(s) may be specified through a GUI that allows definition of a logical expression that can be used to specify the condition(s). The data processing system 200 may be configured to translate the input received through the GUI into instructions in a coding language. Example condition(s) that trigger validation are described herein.

The data processing system 200 may be configured to store the validation rule 330 in any suitable way. For example, data processing system 200 may store the validation rule 330 as information in an instance of a validation rule data entity. In another example, the data processing system 200 may store the validation rule 330 as a file (e.g., a text file, CSV file, XML file, or any other suitable type of file).

FIG. 4A is a schematic diagram of the Biz Term data entity 400A, according to some embodiments of the technology described herein. As shown in FIG. 4A, the Biz Term data entity 400A includes the following attributes: Identifier attribute 400A-1, Definition attribute 400A-2, Owner attribute 400A-3, and Institution attribute 400A-4. The Identifier attribute 400A-1 may be assigned an integer value in instances of the Biz Term data entity 400A. The Definition attribute 400A-2 may be assigned a string value in instances of the Biz Term data entity 400A.

The Owner attribute 400A-3 refers to a Business Owner data entity 400B indicating that, in instances of the Biz Term data entity 400A, the Owner attribute 400A-3 may be assigned an instance of the Business Owner data entity 400B as a value. The business owner data entity 400B includes the following attributes: Name 400B-1, Region 400B-1, and Group 400B-3. The Institution attribute 400A-4 refers to the Institution data entity 400C indicating that, in instances of the Biz Term data entity 400A, the Institution attribute 400A-4 may be assigned an instance of the Institution data entity 400C as a value. The Institution data entity 400C includes the following attributes: Name 400C-1, Region 400C-2, and Type 400C-3.

Figure 4B:
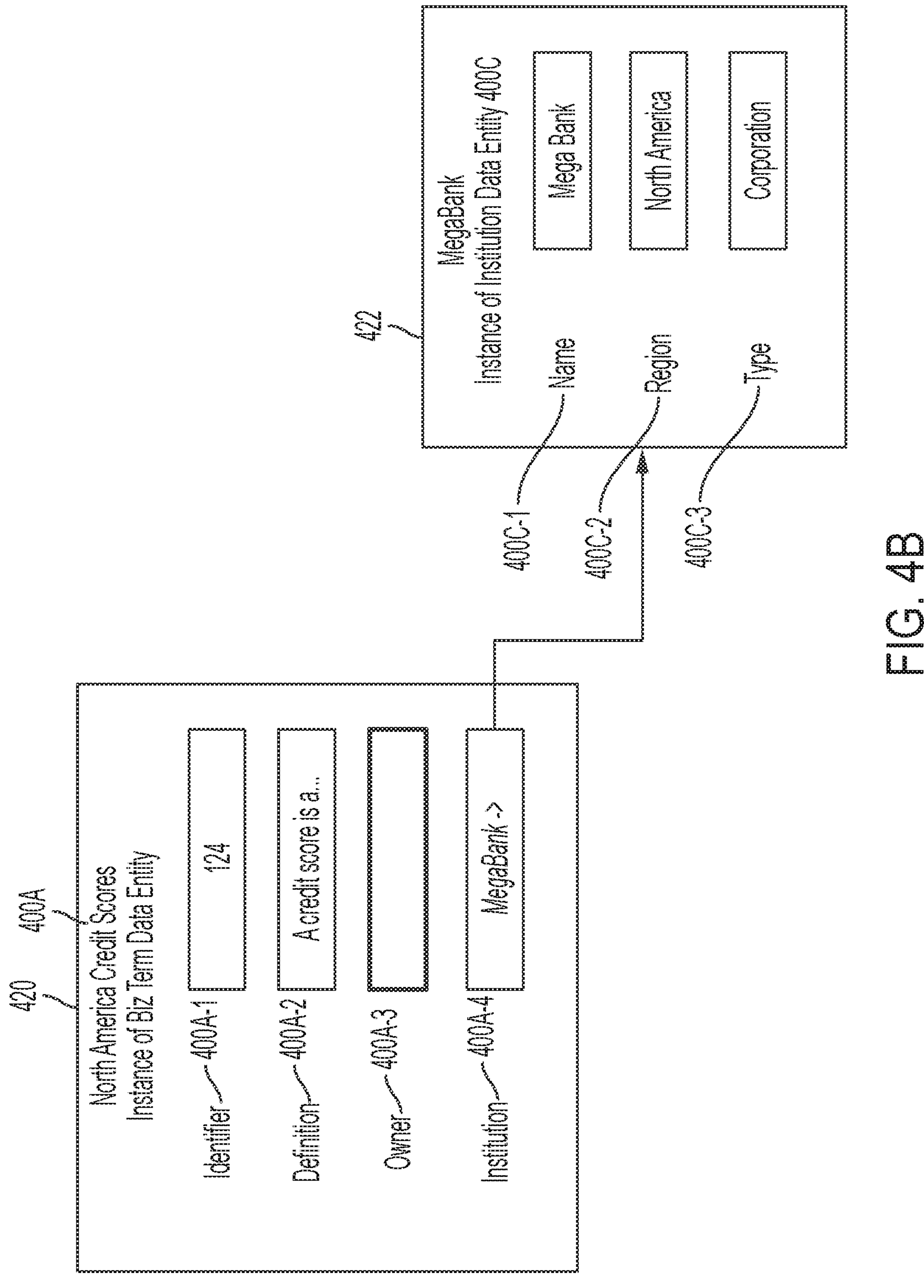
FIG. 4B is a schematic diagram of an example instance of the data entity of FIG. 4A, according to some embodiments of the technology described herein.

FIG. 4B is a schematic diagram of an example North America Credit Scores instance 420 of the Biz Term data entity 400A of FIG. 4A, according to some embodiments of the technology described herein. As shown in FIG. 4B, the North America Credit Scores instance 420 has a value of "123" for the Identifier attribute 400A-1 and a textual definition of a credit score as a value of the Definition attribute 400A-2. The MegaBank instance 422 of the Institution data entity 400C is assigned as the value to the Institution attribute 400A-4 of the North America Credit Scores instance 420.

The MegaBank instance 422 has a value of "Mega Bank" for the Name attribute 400C-1, a value of "North America" for the Region attribute 400C-2, and a value of "Corporation" for the Type attribute 400C-3.

A value is to be assigned to the Owner attribute 400A-3 of the North America Credit Scores instance 420 as indicated by the bolded box in FIG. 4B. For example, a user may submit a request through a GUI to assign a value to the Owner attribute 400A-3. In another example, a software application may transmit a request to the data processing system 200 to assign a value to the Owner attribute 400A-3.

Figure 4C:
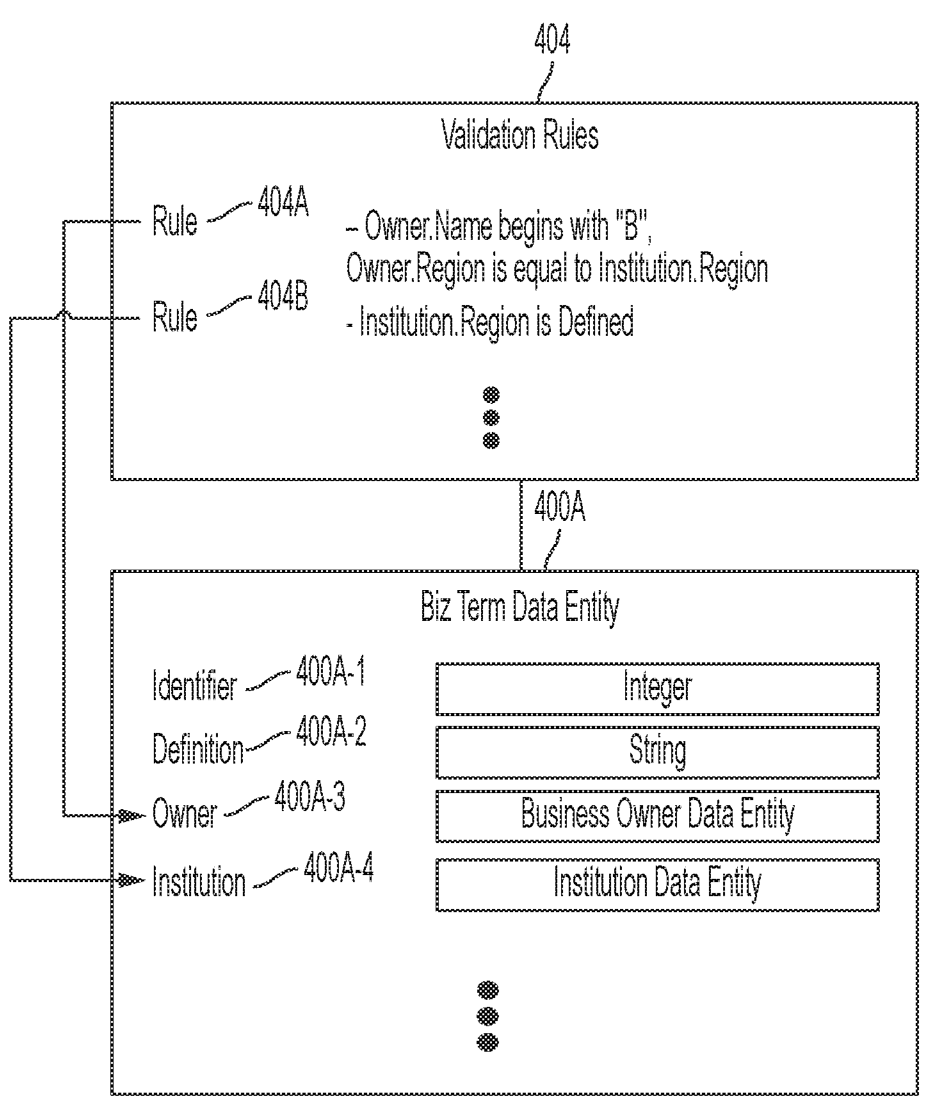
FIG. 4C is a set of validation rules associated with the data entity of FIG. 4A, according to some embodiments of the technology described herein.

FIG. 4C is a set of validation rules 404 associated with the Biz Term data entity 400A, according to some embodiments of the technology described herein. As shown in FIG. 4C, the set of validation rules 404 includes a first rule 404A and a second rule 404B. The rule 404A comprises the following conditions on the Owner attribute 400A-3: (1) Owner.Name begins with "B"; and (2) Owner.Region is equal to Institution.Region. The rule 404A requires that: (1) the Name attribute of an instance assigned to the Owner attribute 400A-3 must begin with the letter "B"; and (2) the Region attribute of an instance assigned to the Owner attribute 400A-3 must be equal to the Region attribute of an instance assigned to the Institution attribute 400A-4. The rule 404B of the validation rules 504 has the following condition: Institution.Region is Defined. The rule 404B requires that a region attribute of an instance assigned to the Institution attribute 400A-4 is "North America".

As shown in FIG. 4C, each of the rules 404A, 404B is associated with a respective attribute. The rule 404A is associated with the Owner attribute 400A-3 and the rule 404B is associated with the Institution attribute 400A-4. In some embodiments, each of the rules 404A, 404B may be associated with an attribute by storing a reference to the attribute in the rule. For example, the rule 404A may store a reference to the Owner attribute 400A-3 of the Biz Term data entity 400A and the rule 404B may store a reference to the Institution attribute 400A-4 of the Biz Term data entity 400A. Although in the example of FIG. 4C there is only one rule associated with each of the Owner attribute and the 400A-3 and the Institution attribute 400A-4, in some embodiments, multiple rules may be associated with a particular attribute.

Figure 4D:
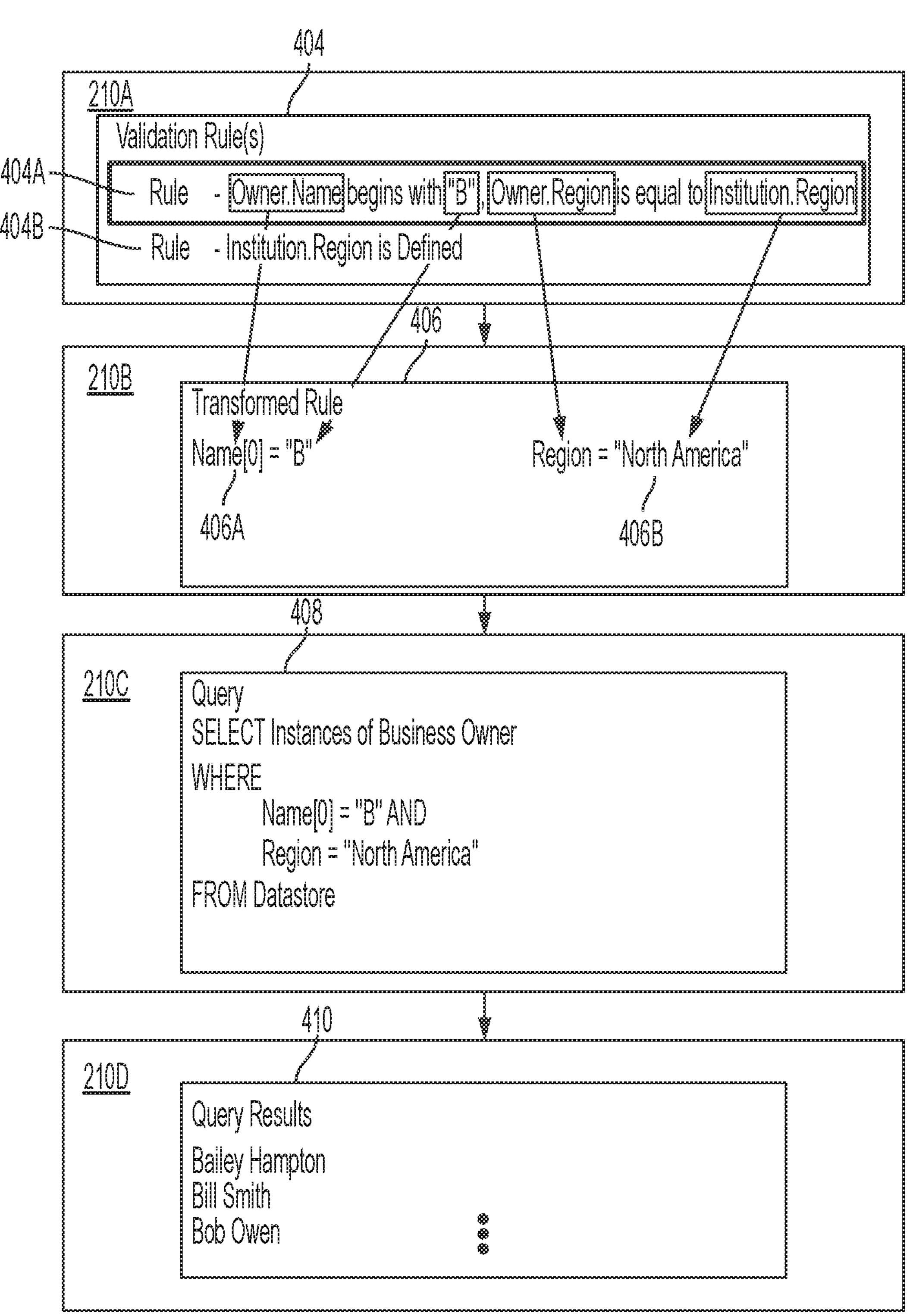
FIG. 4D is an example data flow in a process of identifying valid value(s) for an attribute in the data entity instance of FIG. 4B, according to some embodiments of the technology described herein.

FIG. 4D is an example data flow in a process of identifying valid value(s) for an attribute in the North America Credit Scores instance 420 of the Biz Term data entity, according to some embodiments of the technology described herein. The data flow of FIG. 4D may be generated by the components 210A, 210B, 210C, 210D of the assignment validation module 210 described herein with reference to FIG. 2D.

Given that a value is to be assigned to the Owner attribute 400A-3 of the North America Credit Scores instance 420 with values as shown in FIG. 4C, the rule selection component 210A has selected the rule 404A, which is associated with the Owner attribute 400A-3 of the Biz Term data entity 400A. For example, the rule selection component 210A may: (1) determine that the rule 404A is associated with the Owner attribute 400A-3 using information from the rule 404A; and (2) select the rule 404A based on determining that the rule 404A is associated with the Owner attribute 400A-3.

Next, the rule transformation component 210B transforms the selected rule 404A to generate transformed rule 406. The transformed rule 406 includes two expressions 406A, 406B generated from the two conditions of the rule 404A. The rule transformation component 210B has transformed the condition (Owner.Name begins with "B") into the expression (Name[0]="B"), which requires that, in an instance of the Owner data entity, the first character of the Name attribute value must be "B". The rule transformation component 110B has transformed the condition (Owner.Region is equal to Institution.Region) into the expression (Region="North America"). The rule transformation component 210B identified a current value of "North America" for the Region attribute 400C-2 in the MegaBank instance 422 assigned to the Institution attribute 400A-4, and generated the expression to require that the Region attribute of an instance assigned to the Owner attribute 400A-3 is "North America". The rule transformation component 210B may access the MegaBank instance 422 to determine the current value of the Region attribute 400C-2 in the MegaBank instance 422.

As illustrated in the example embodiment of FIG. 4D, the transformed rule does not include the prefix "Owner." for attributes of the Business Owner data entity 400B. In the example embodiment of FIG. 4D, the rule transformation component 210B may be configured to remove a prefix identifying the data entity of which an instance is to be assigned to the Owner attribute 400A-3. The rule transformation component 210B may remove the prefix identifying the data entity because a query generated from the transformed rule may be executed solely on instances of the data entity. Thus, it is unnecessary to specify the data entity in the transformed rule. In the example of FIG. 4D, the Owner attribute 400A-3 is to be assigned an instance of the Business Owner data entity 400B as a value. A query generated from the transformed rule 406 may be executed on instances of the Business Owner data entity, and thus the expression may use a name of an attribute from the Business Owner data entity 400B without a prefix specifying the data entity.

The transformed rule 406 is then used to generate a query 408 by the query generation component 210C. As illustrated in the example of FIG. 4D, the query generation component 210C has generated an SQL query that selects instances of the Business Owner data entity 400B that meet the criteria indicated by the transformed rule expressions 406A, 406B. The query 408 includes a logical "AND" operation between the two criteria to indicate that both criteria must be met for an instance to be returned by the query such that the results meet both conditions of the rule 404A.

The generated query 408 is then executed by the query execution component 210D to generate the query results 410. The query execution component 210D may be configured to use at least one processor to execute the query on a datastore. For example, the query execution component 210D may execute the query 408 on a datastore storing the data entity instances 206 of the data processing system 200. In the example of FIG. 4D, the query 408 indicates that the results are to be selected from instances of the Business Owner data entity 400B. The query execution component 210D may search for instances of the Business Owner entity data entity 400B that meet the criteria indicated in the "WHERE" portion of the query 408.

The query results 410 consist of all instances of the Business Owner data entity 400B which have a Name attribute 400B-1 value that begins with the letter "B", and a Region attribute 400B-2 value of "North America". The assignment validation module 210 may be configured to determine the query results 410 as the valid values for the Owner attribute 400A-3 of the North America Credit Scores instance 420. For example, the assignment validation module 210 may present the query results 410 to a user through a graphical user interface (e.g., for selection of a value to assign to the Owner attribute 400A-3 in the instance 420). In another example, the assignment validation module 210 may transmit the query results 410 to a software application (e.g., for selection of a value to assign to the Owner attribute 400A-3 in the instance 420).

Figure 5A:
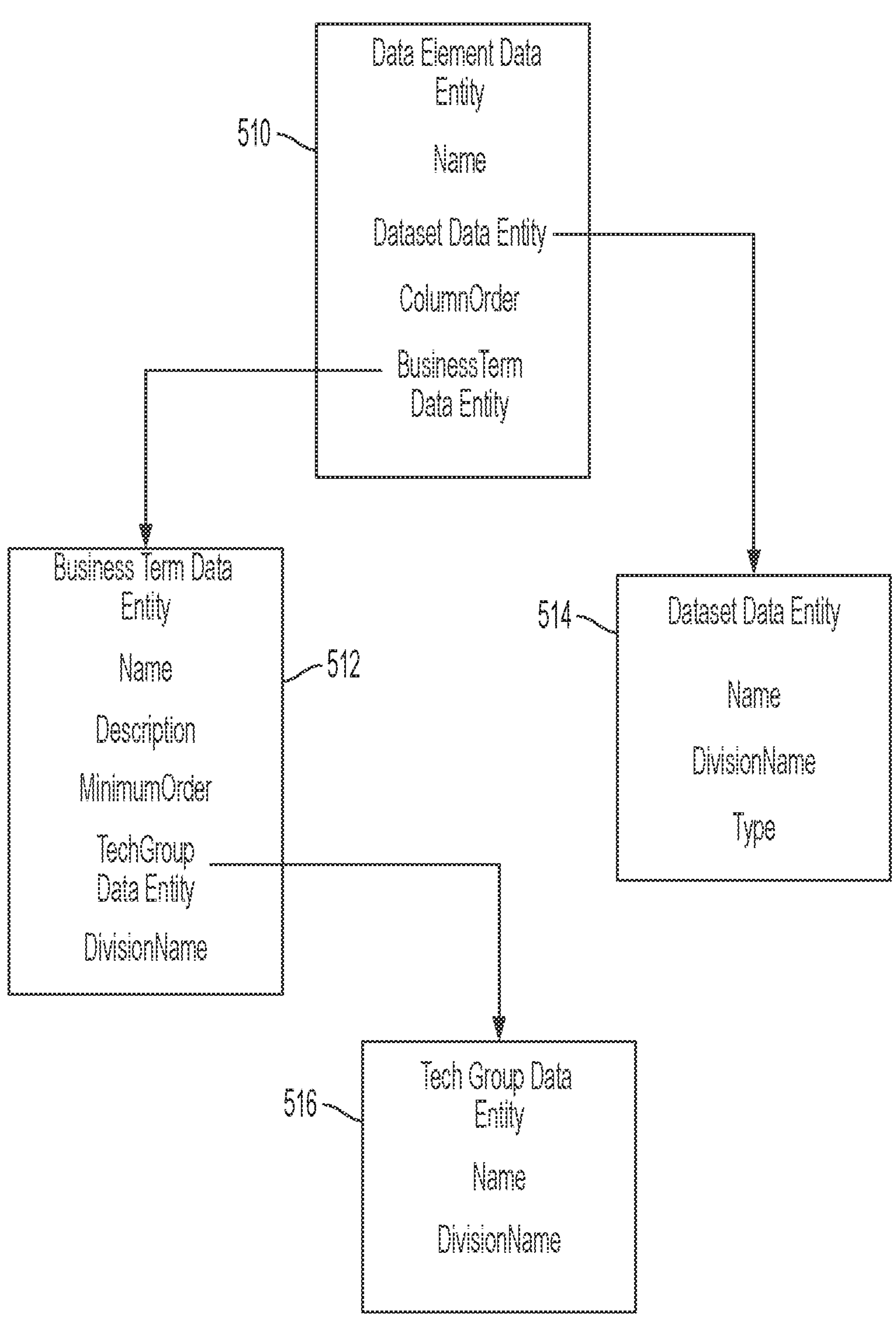
FIG. 5A is a schematic diagram of an example relationship of a data entity with other data entities, according to some embodiments of the technology described herein.
Figure 5B:
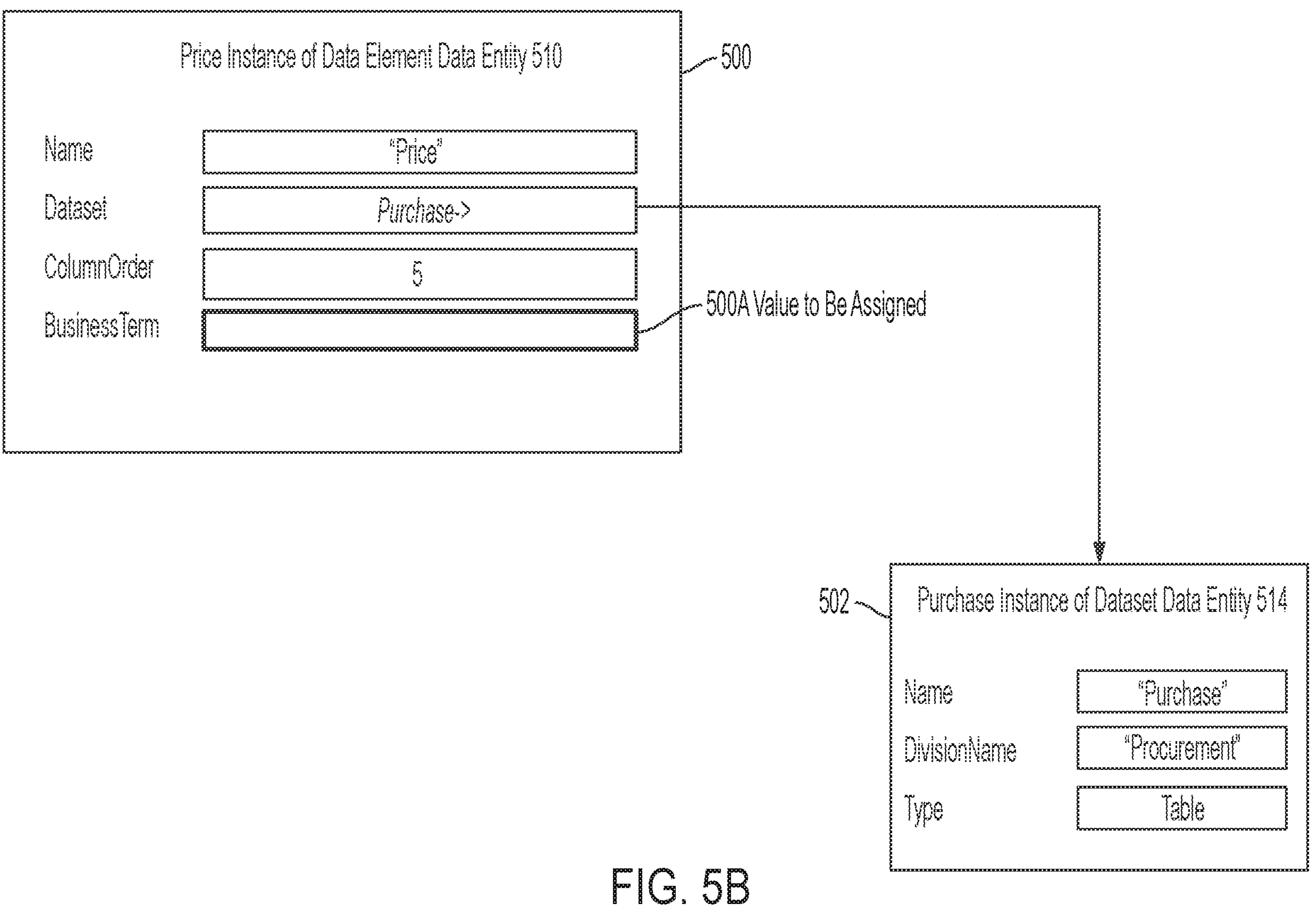
FIG. 5B is a schematic diagram of an example instance of the data entity of FIG. 5A, according to some embodiments of the technology described herein.

FIG. 5A is a schematic diagram of an example relationship of the Data Element data entity 510 with other data entities, according to some embodiments of the technology described herein. As shown in FIG. 5B, the Data Element data entity 510 includes the following attributes: Name, Dataset, ColumnOrder, and BusinessTerm. The Dataset attribute references the Dataset data entity 514, indicating that an instance of the Data Element data entity 510 is to have an instance of the Dataset data entity 514 assigned as the value of its Dataset attribute. The BusinessTerm attribute references the Business Term data entity 512 indicating that an instance of the Data Element data entity 510 is to have an instance of the Business Term data entity 512 assigned as the value to its BusinessTerm attribute. The Dataset data entity 514 includes the following attributes: Name, DivisionName, and Type.

The Business Term data entity 512 includes the following attributes: Name, Description, MinimumOrder, TechGroup, and DivisionName. The TechGroup attribute references the Tech Group data entity 516 indicating that an instance of the Business Term data entity 512 is to be assigned an instance of the Tech Group data entity 516 as the value of its TechGroup attribute. The Tech Group data entity 516 includes the following attributes: Name, and DivisionName.

FIG. 5B is a schematic diagram of an example Price instance 500 of a Data Element data entity 510, according to some embodiments of the technology described herein. As shown in FIG. 5A, the Price instance 500 has the following attribute values: (1) the Name attribute value is "Price"; (2) the Dataset attribute value is the Purchase instance 502 of the Dataset data entity 514; and (3) the ColumnOrder attribute value is 7. These attribute values may have previously been assigned to in the Price instance 500. A value 500A needs to be assigned to the BusinessTerm attribute of the Price instance 500.

Figure 5C:
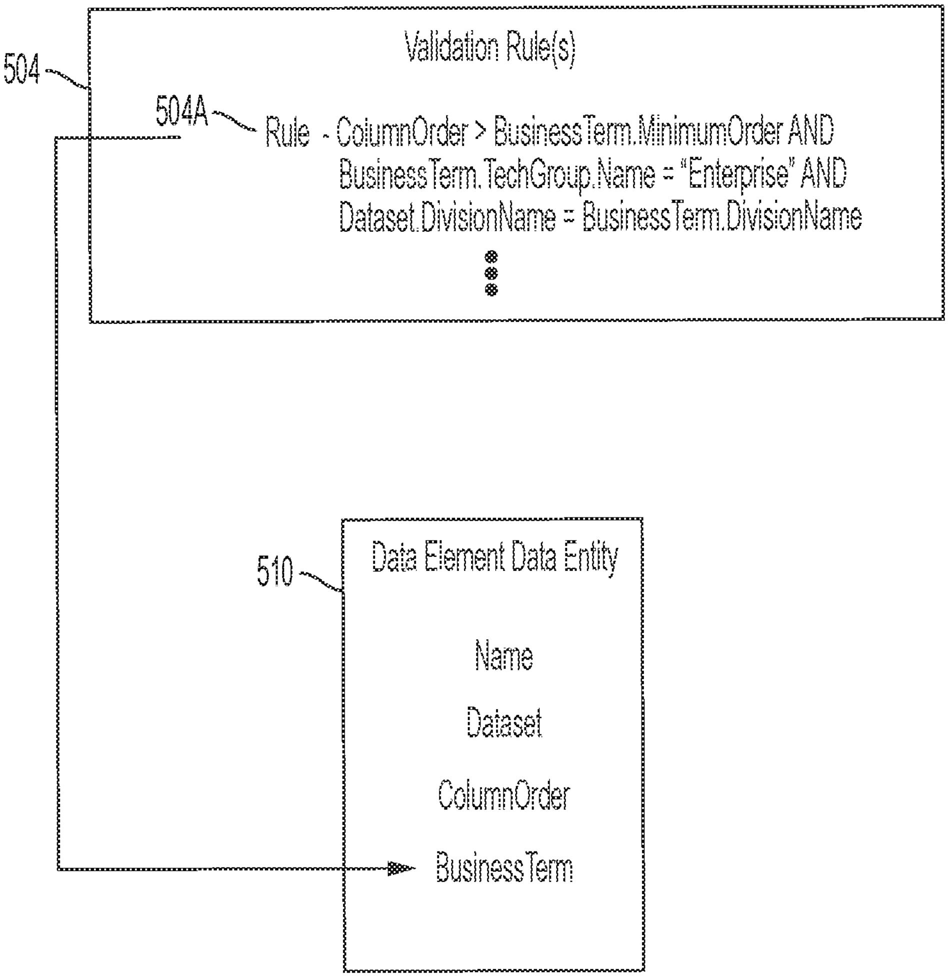
FIG. 5C shows a set of validation rule(s) associated with the data entity of FIG. 5A, according to some embodiments of the technology described herein.

FIG. 5C shows a set of validation rule(s) 504 associated with the Data Element data entity 510, according to some embodiments of the technology described herein. As shown in FIG. 5C, the rule 504A is associated with the BusinessTerm attribute of the Data Element data entity 510. The rule 504A includes the following three conditions on the BusinessTerm attribute: (1) ColumnOrder>BusinessTerm.MinimumOrder; (2) BusinessTerm.TechGroup.Name="Enterprise"; and (3) Dataset.DivisionName=BusinessTerm.DivisionName. The first condition indicates that the value of the ColumnOrder attribute in an instance of the Data Element data entity 510 must be greater than a value of the MinimumOrder attribute of an instance of the Business Term data entity 512 assigned as a value to the BusinessTerm attribute in the instance of the Data Element data entity 510. The second condition indicates that "Enterprise" is the value of the Name attribute of an instance of the Tech Group data entity 516, assigned as a value to the TechGroup attribute in an instance of the Business Term data entity 512 that is assigned as the value to the BusinessTerm attribute in the instance of the Data Element data entity 510. The third condition indicates that the value of the DivisionName attribute in an instance of the Dataset data entity 514 assigned as the value to the Dataset attribute in the instance of the Data Element data entity 510 must be equal to: the value of the DivisionName attribute in an instance of the Business Term data entity 512 assigned as the value to the BusinessTerm attribute in the instance of the Data Element data entity 510. As all of the conditions in the rule 504A are joined by a logical AND operation, all three of the conditions must be met by an instance of the Business Term data entity 512 in order to be valid for assignment to the BusinessTerm attribute of an instance of the Data Element data entity 510.

Figure 5D:
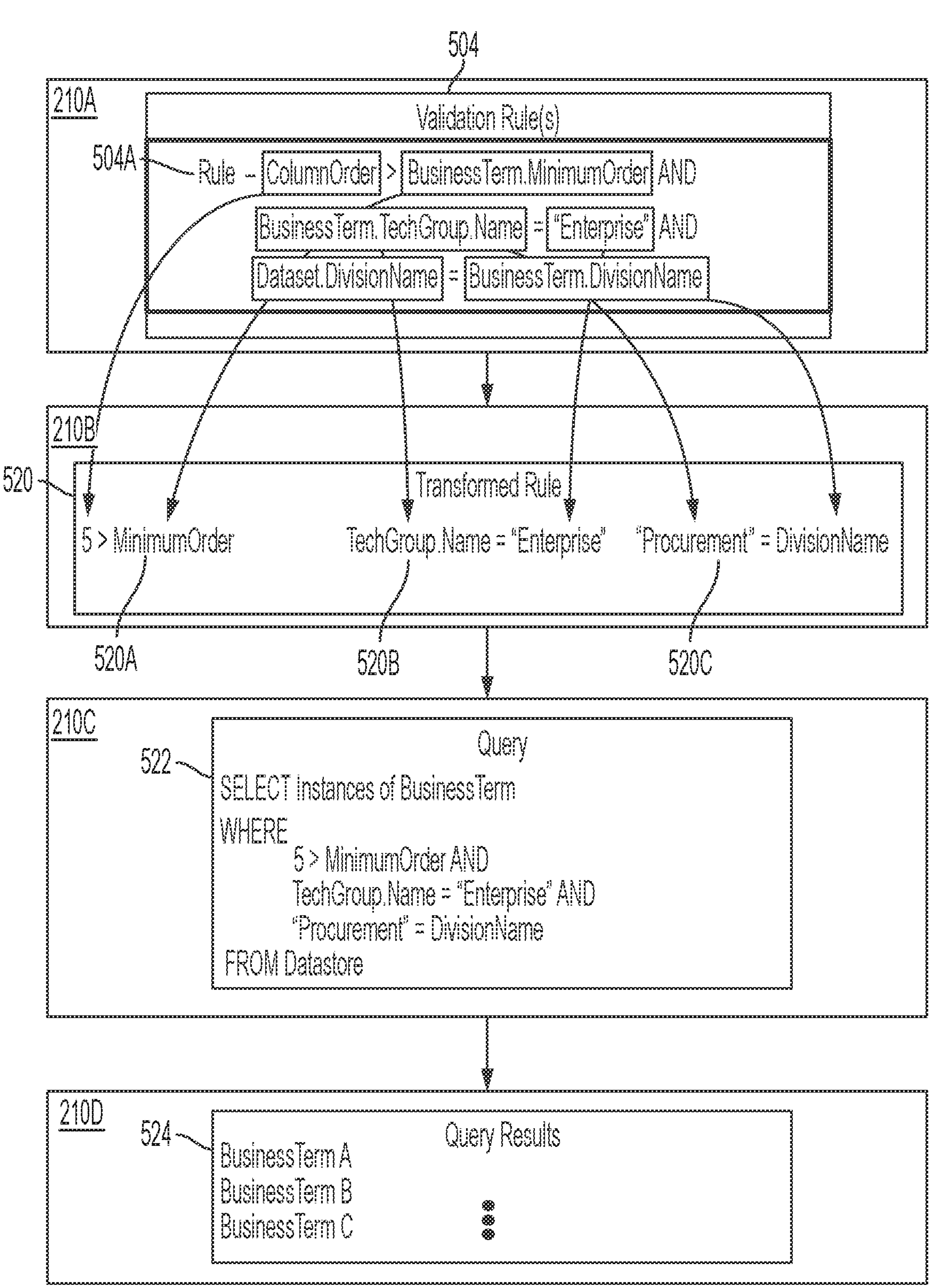
FIG. 5D is a data flow in a process of identifying valid value(s) for an attribute in the data entity instance of FIG. 5B, according to some embodiments of the technology described herein.

FIG. 5D is a data flow in a process of identifying valid value(s) for assignment to the BusinessTerm attribute in the Price instance 500 of the Data Element data entity 510, according to some embodiments of the technology described herein. The data flow may be generated by components of the assignment validation module 210, described herein with reference to FIG. 4A, as part of assigning a value to the BusinessTerm attribute in the Price instance 500.

As illustrated in FIG. 5D, the rule 504A of the validation rule(s) 504 is selected by the rule selection component 210A. The rule selection component 210A may be configured to select the rule 504A by determining that the rule 504A is associated with the BusinessTerm attribute of the Data Element data entity 510 (e.g., based on information stored in the rule 504A). Example techniques of determining rule(s) associated with an attribute are described herein.

The rule 504A is then transformed by the rule transformation component 210B into the transformed rule 520 shown in FIG. 5D. Each of the conditions of the rule 504A is transformed into a respective expression in the transformed rule 520.

The first condition (ColumnOrder>BusinessTerm.MinimumOrder) is transformed into the expression 520A. The rule transformation component 210B may be configured to determine a current value of the ColumnOrder attribute in the Price instance 500, and replace "ColumnOrder" in the condition with the current value of 7. The rule transformation component 210B may be configured to replace the prefix "BusinessTerm" from the "BusinessTerm.MinimumOrder" data entity path in the first condition because a query generated using the expression 520A will be executed on only instances of the Business Term data entity 512. Thus, the expression 520A may directly refer to attributes of the Business Term data entity 512 without specifying the data entity.

The second condition (BusinessTerm.TechGroup.Name="Enterprise") is transformed into the expression 520B. The rule transformation component 210B may be configured to remove the prefix "BusinessTerm" from the data entity path in the condition to obtain the expression 520B.

The third condition (Dataset.DivisionName=BusinessTerm.DivisionName) is transformed into the expression 520C. The rule transformation component 110B may be configured to determine that "Procurement" is the current value of the DivisionName attribute in the instance of the Dataset data entity 514 assigned as the value to the Dataset attribute in the Price instance 500. Thus, the rule transformation component 210B replaced "Dataset.DivisionName" in the condition with the value of "Procurement" in the expression 520C. The rule transformation component 210B may be configured to remove the prefix "BusinessTerm" from the "BusinessTerm.DivisionName" data entity path in the condition to obtain the expression 520C.

The transformed rule 520 is used to generate a query 522 by the query generation component 210C. As shown in the example of FIG. 5D, the query 522 is a SELECT statement that identifies instances of the Business Term data entity 512 that meet all of the criteria indicated by the transformed rule 520 in a datastore (e.g., a datastore storing the data entity instances of the data processing system 200). The expressions 520A, 520B, 520C are assembled in the query 522 by logical AND operators to query for instance that meet all the conditions of the rule 504A.

The query 522 is executed by the query execution component 210D to generate the query results 524. The query results 524 may consist of instances of the Business Term data entity 512 that meet the rule 504A. The instances may be presented to a user (e.g., through a GUI) and/or a process (e.g., through an API) for selection of one or more values to assign to the BusinessTerm attribute of the Price instance 500.

Figure 6A:
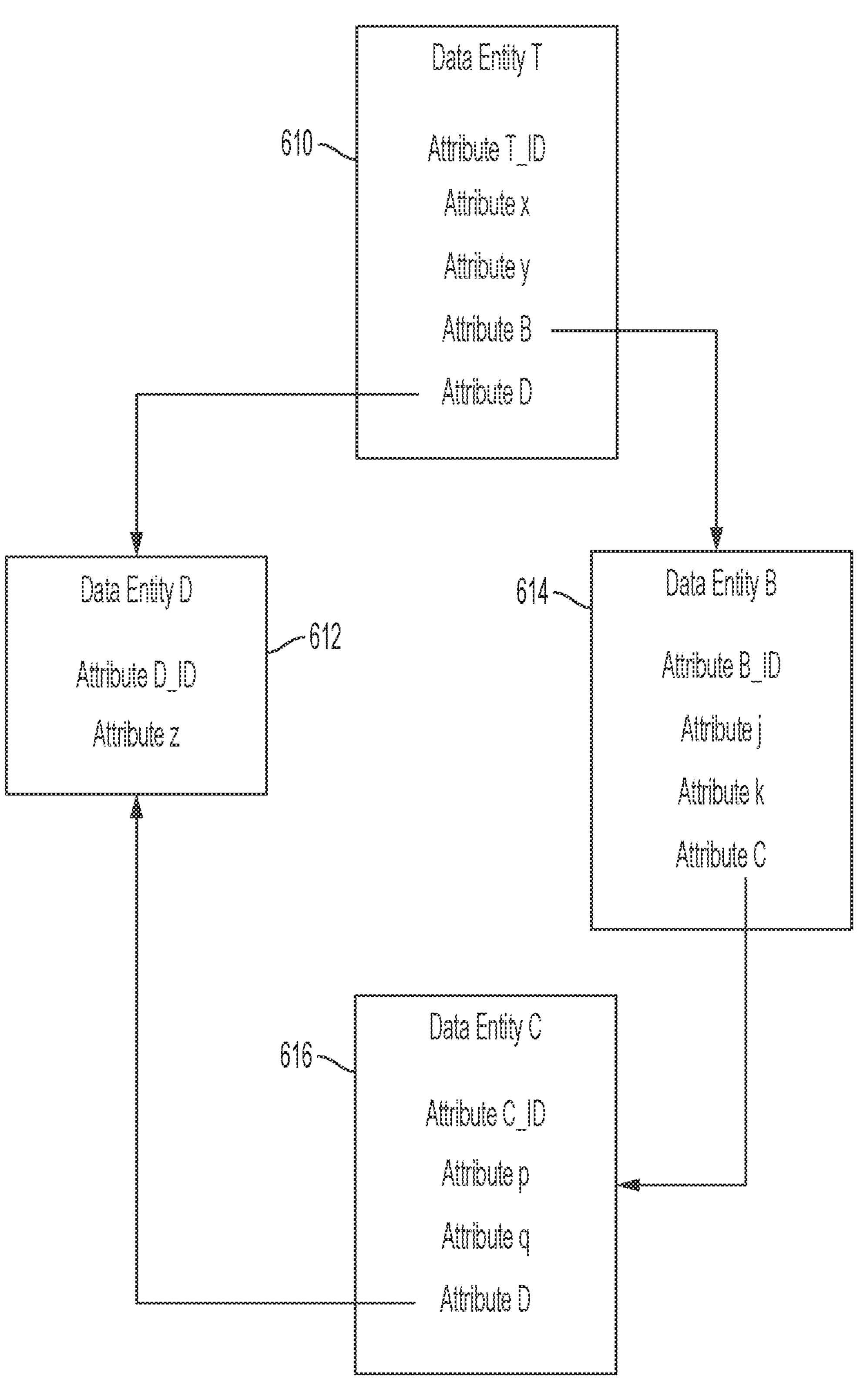
FIG. 6A is a schematic diagram of an example relationship of a data entity with other data entities, according to some embodiments of the technology described herein.

FIG. 6A is a schematic diagram of an example relationship of data entity "T" 610 with other data entities, according to some embodiments of the technology described herein. As shown in FIG. 6A, data entity "T" 610 includes attributes "T_ID", "x", "y", "B", and "D". Attribute "B" references the data entity "B" 614 indicating that an instance of data entity "B" 614 may be assigned as the value to attribute "B" in an instance of data entity "T" 610. Attribute "D" references data entity "D" indicating that an instance of data entity "D" 612 may assigned as the value to the attribute "D" in an instance of data entity "T" 610.

Data entity B 614 referenced by attribute "B" of data entity "T" 610 includes attributes "B_ID", "j", "k", and "C". Attribute "C" references data entity "C" 616, indicating that an instance of data entity "C" 616 may be assigned as a value to attribute "C" in an instance of data entity "B" 614. Data entity "C" 616 includes attributes "C_ID", "p", "q", and "D". Attribute "D" references data entity "D" 612 indicating that an instance of data entity "D" 612 may be assigned as a value to attribute "D" in an instance of data entity "C" 616. Data entity "D" 612 includes attributes "D_ID" and "z".

Figure 6B:
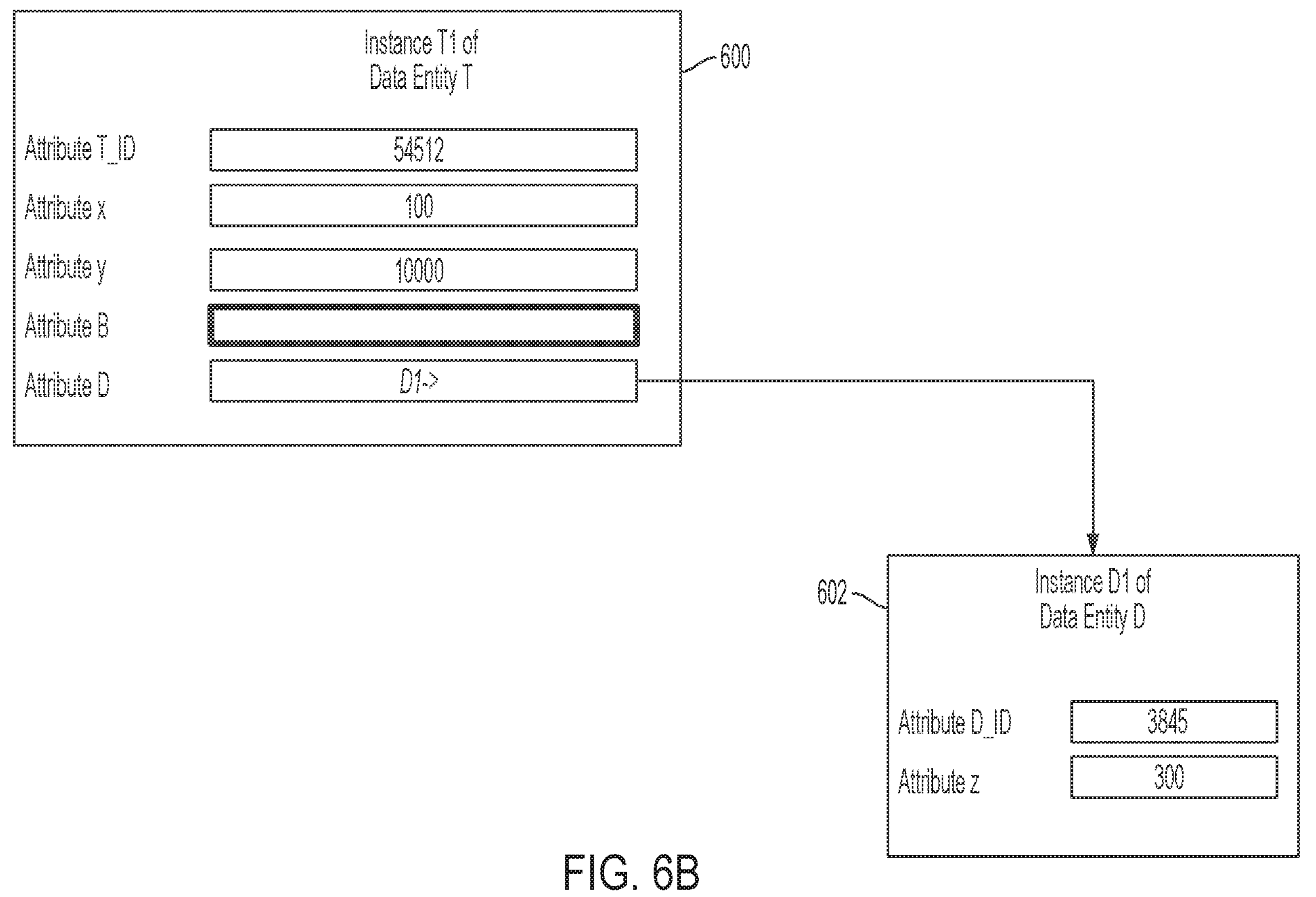
FIG. 6B is a schematic diagram of an example instance of the data entity of FIG. 6A, according to some embodiments of the technology described herein.

FIG. 6B is a schematic diagram of an example instance "T1" 600 of data entity "T" 610, according to some embodiments of the technology described herein. As shown in FIG. 6B, the instance "T1" 600 has a value of 54512 assigned to attribute "T_ID", a value of 100 assigned to attribute "x", a value of 10000 assigned to attribute "y", and an instance "D1" 602 of data entity "D" 612 assigned to the attribute "D". The attribute "B" in the instance "T1" 600 does not currently have a value assigned to it.

Figure 6C:
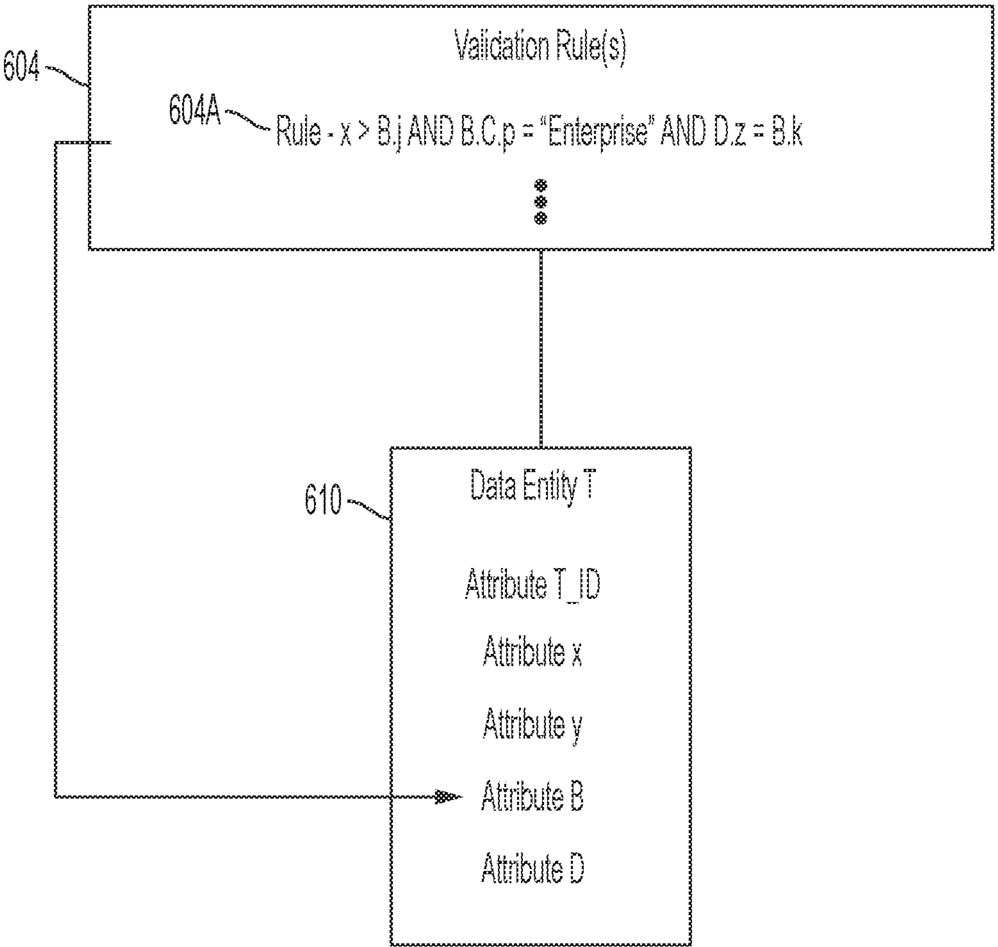
FIG. 6C shows a set of validation rule(s) associated with the data entity of FIG. 6A, according to some embodiments of the technology described herein.

FIG. 6C shows a set of validation rule(s) 604 associated with data entity "T" 610, according to some embodiments of the technology described herein. As shown in FIG. 6C, the rule 604A is associated with attribute "B" of data entity "T" 610. The rule 604A includes the following three conditions on attribute "B": (1) x>B.j; (2) B.C.p="Enterprise"; and (3) D.z=B.k. The first condition (x>B.j) indicates that the value of attribute "x" in an instance of data entity "T" 610 must be greater than a value of attribute "j" in an instance of data entity "B" 614 assigned as the value to attribute "B" in the instance of data entity "T" 610. The second condition (B.C.p="Enterprise") indicates that attribute "p", in an instance of data entity "C" 616 assigned to attribute "C", must be equal to "Enterprise". The third condition (D.z=B.k) indicates that the value of attribute "z", in an instance of data entity "D" 612 assigned to attribute "D", must equal the value of attribute "k" in an instance of data entity "B" 614 assigned to attribute "B". As all of the conditions in the rule 604A are joined by a logical AND operation, all three of the conditions must be met in order for an instance of data entity "B" 614 to be valid for assignment to the attribute "B" in an instance of the data entity "T" 610.

Figure 6D:
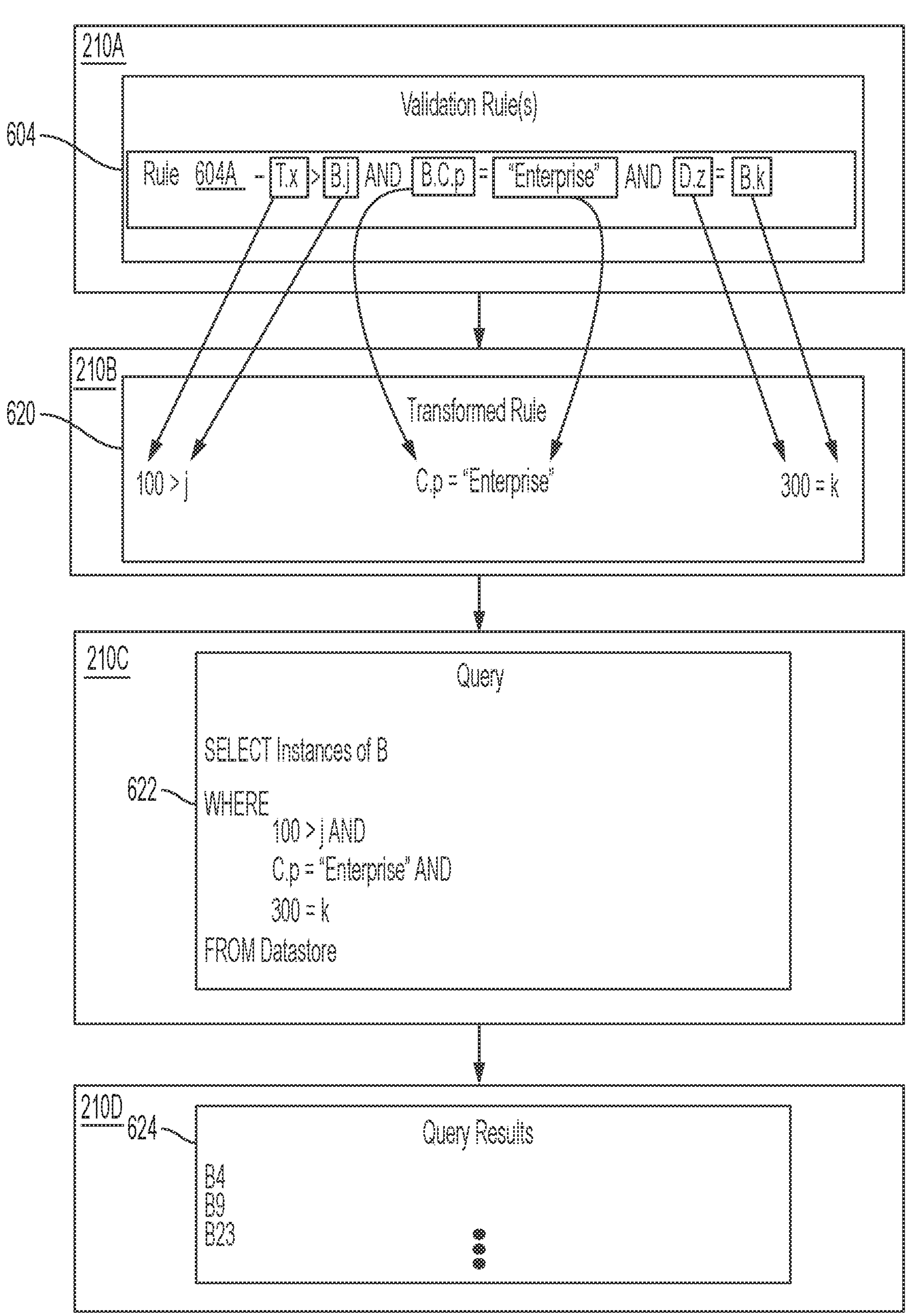
FIG. 6D is an example data flow in a process of identifying valid value(s) for an attribute in the data entity instance of FIG. 6B, according to some embodiments of the technology described herein.

FIG. 6D is an example data flow in a process of identifying valid value(s) for assignment to the attribute "B" in the instance "T1" 600 of data entity "T" 610, according to some embodiments of the technology described herein. The data flow may be generated by components of the assignment validation module 210, described herein with reference to FIG. 4A, as part of assigning a value to attribute "B" of the instance T1 600 of data entity T 610.

As illustrated in FIG. 6D, the rule 604A of the validation rule(s) 604 is selected by the rule selection component 210A. The rule selection component 210A may be configured to select the rule 604A by determining that the rule 604A is associated with attribute "B" of data entity T 610 (e.g., based on information stored in the rule 604A). Example techniques of determining rule(s) associated with an attribute are described herein.

The rule 604A is then transformed by the rule transformation component 210B into the transformed rule 620. Each of the conditions of the rule 604A is transformed into a respective expression.

The first condition (T.x>B.j) is transformed into the expression (100>j). The rule transformation component 210B may be configured to determine a current value of the attribute "x" in the instance "T1" 600, and replace the "T.x" in the first condition with the current value of 100. The rule transformation component 210B may be configured to remove the prefix "B." from the "B.j" in the first condition because a query generated from the transformed rule 620 will be executed on only instances of B. Thus, the expression may directly refer to attributes of data entity "B" 614 without specifying the data entity.

The second condition (B.C.p="Enterprise") is transformed into the expression (C.p="Enterprise"). The condition requires that the instance assigned to attribute "C" has a value of "Enterprise" for its attribute "p". The rule transformation component 210B may be configured to remove the prefix "B." from the data entity path "B.C.p" in the condition.

The third condition (D.z=B.k) is transformed into the expression (300=k). The rule transformation component 210B may be configured to determine that a current value of attribute "z" in an instance of data entity D 612 that is assigned to attribute D is 300. The rule transformation component 210B has thus replaced D.z with the value 300. The rule transformation component 210B may be configured to remove the "B." prefix from "B.k".

The transformed rule 620 is used to generate a query 622 by the query generation component 210C. As shown in the example of FIG. 6D, the query 622 is a SELECT statement that identifies instances of the data entity B 614 that meet all of the criteria indicated by the transformed rule 620 in a datastore (e.g., a datastore storing the data entity instances 206 of the data processing system 200). The expressions are assembled in the query 622 by logical AND operators to query for instances that meet the conditions of rule 604A.

The query 622 is executed by the query execution component 210D to generate the query results 624. The query results 624 may consist of instances of data entity B 614 that meet rule 604A. The instances may be presented to a user (e.g., through a GUI) and/or a process (e.g., through an API) for selection of one or more values to assign to attribute B of instance T1 600.

Figure 7:
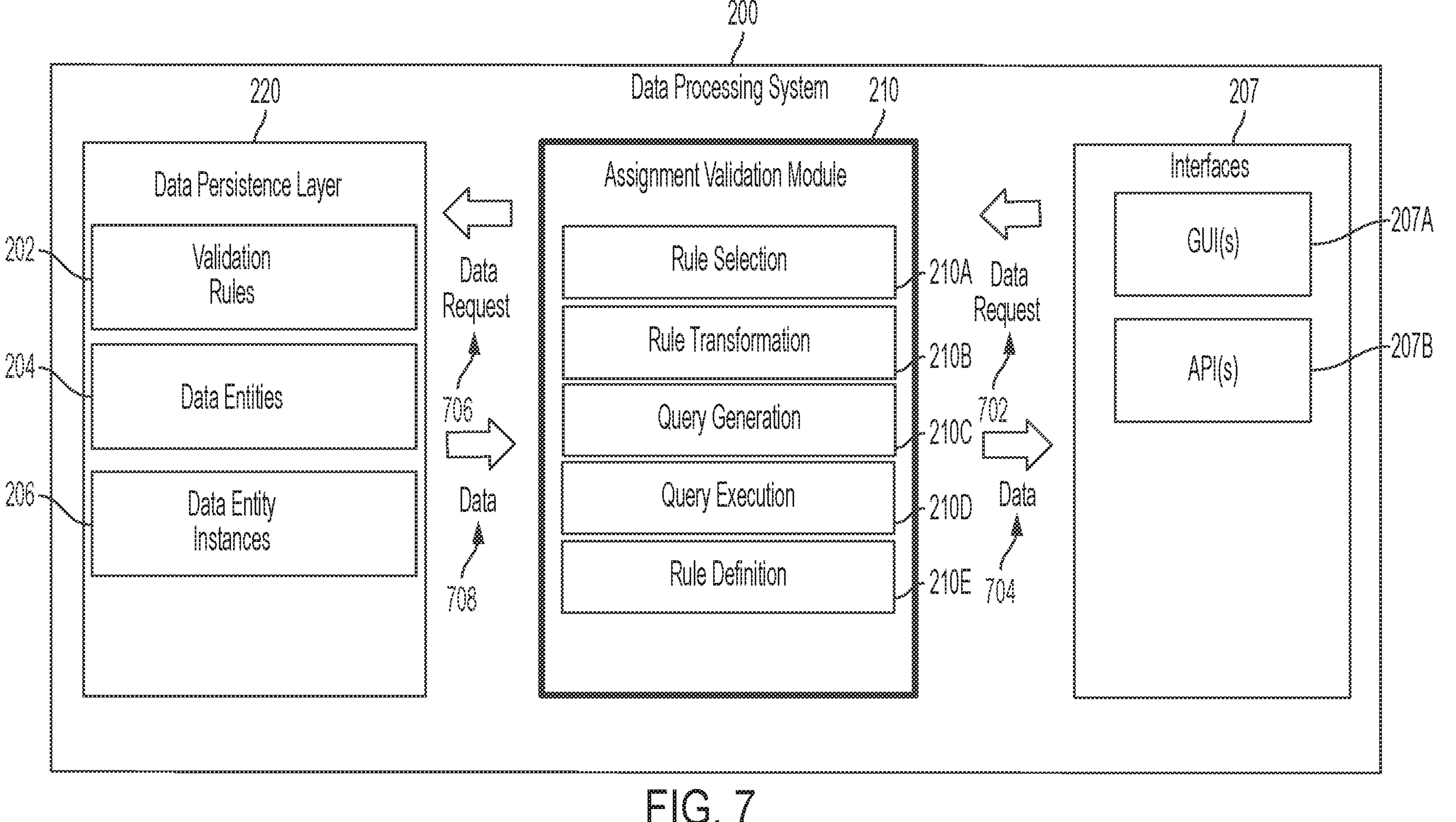
FIG. 7 is a block diagram showing components of a data processing system, according to some embodiments of the technology described herein.

FIG. 7 is a block diagram showing components of the data processing system 200, according to some embodiments of the technology described herein. As shown in FIG. 7, the data processing system 200 includes interfaces 207, the assignment validation module 210, and a data persistence layer 220.

The interfaces 207 include GUI(s) 207A and API(s) 207B as described herein with reference to FIGS. 2A-2D.

In some embodiments, the GUI(s) 207A may include a validation rule definition GUI through which a validation rule can be defined in the data processing system 200. In some embodiments, the validation rule definition GUI may allow a user to define a validation rule. The GUI may allow the user to generate a validation rule that includes information as described herein with reference to FIG. 3C. For example, the validation rule definition GUI may allow a user to select a graphical element indicating a command to create a new validation rule. The user may then enter information defining the new validation rule and associating the new validation rule with a data entity and attribute thereof. In some embodiments, the validation rule definition GUI may allow a user to specify condition(s) of a rule. For example, the GUI may allow a user to enter logical expression(s) indicating the condition(s).

In some embodiments, the GUI(s) 207A may include an attribute value assignment GUI through which a user can assign a value to an attribute. The attribute value assignment GUI may be configured to present, in the GUI, an indication of valid values that can be assigned to an attribute. The attribute value assignment GUI may be configured to receive, through the GUI, a selection of one or more of the valid values to assign to the attribute. In some embodiments, the attribute value assignment GUI may be configured to allow a user to view invalid values in addition to valid values. For example, the attribute value assignment GUI may provide an option (e.g., a graphical switch, checkbox, or other GUI option) that allows a user to request invalid values for an attribute as well as valid values.

In some embodiments, the attribute value assignment GUI may be configured to indicate validity of a value selected for assignment to an attribute. For example, the attribute value assignment interface GUI may display a graphical element (e.g., an exclamation point) proximate a selected attribute value indicating that the selected value is invalid. In another example, the attribute value assignment GUI may display a graphical element proximate a selected attribute value indicating that the selected value is valid.

In some embodiments, the attribute value assignment GUI may be configured to trigger validation using one or more validation rule(s) in response to detection of one or more user actions in the GUI. For example, a user input changing a stage of a workflow, a user input submitting an attribute value assignment, and/or a user input to save a selected value for an attribute may be detected in the GUI. Validation of a data entity instance may be triggered in response to detection of the user action(s).

In some embodiments, the API(s) 207B may include a validation rule definition API through which a validation rule can programmatically be generated in the data processing system 200. For example, the validation rule definition API may provide an API through which a software application can transmit instructions that cause the data processing system 200 to generate a new validation rule.

In some embodiments, the API(s) 207B may include attribute value assignment API through which attribute values can programmatically be assigned in the data processing system 200. For example, the attribute value assignment API may provide an API through which a software application can transmit instructions that cause the data processing system 200 to assign a value to an attribute.

As shown in FIG. 7, the interfaces 207 transmit data request 702 to the assignment validation module 210, and receive data 704 in response to the data request 702. The interfaces 707 may be configured to provide the data through various different interfaces (e.g., GUI, API, and/or other interfaces). A data request 702 may include information for use by the assignment validation module 210 (e.g., validation rule definition information) and/or a request to obtain information from the assignment validation module 210. In some embodiments, the data 704 may include information about a validation rule, a data entity, and/or a data entity instance. For example, the data 704 may include valid value(s) for an attribute. In another example, the data 704 may include an indication of whether a value is valid for assignment to an attribute.

The assignment validation module 210 includes a rule selection component 210A, a rule transformation component 210B, a query generation component 210C, a query execution component 210D, and a rule definition component 210E. The rule section component 210A, rule transformation component 210B, query generation component 210C, and query execution component 110D are described herein.

The rule definition component 210E may be configured to generate validation rules in the data processing system 200. In some embodiments, the rule definition component 210E may be configured to generate a validation rule using information obtained from the interfaces 207. Example information that may be obtained by the rule definition component 210E is described herein with reference to FIGS. 3A-3C. The rule definition component 210E may be configured to store validation rules and information about their associations with data entities and attributes thereof (e.g., in the data persistence layer 220).

As shown in FIG. 7, the assignment validation module 210 may be configured to submit data request 706 to the data persistence layer 220. In some embodiments, a data request 706 may comprise submission of information of a new validation rule to store in the data persistence layer 220, and/or an information for updating a validation rule. In some embodiments, a data request 706 may be a query for one or more data entity instances (e.g., identified valid values for an attribute). In some embodiments, the data request 706 may comprise a request for information about a validation rule, a data entity, and/or a data entity instance (e.g., to provide in one or more of the interfaces 207). In some embodiments, the data request 706 may be a selection of a value to assign to an attribute.

The assignment validation module 210 is configured to receive data 708 from the data persistence layer. In some embodiments, the data 708 may include query results. For example, the data 708 may include one or more valid values (e.g., valid instances) that can be assigned to an attribute. In some embodiments, the data 708 may include information about a validation rule, a data entity, and/or a data entity instance. In some embodiments, the data 708 may include a confirmation (e.g., indicating whether an attribute value assignment was successful).

As shown in FIG. 7, the data persistence layer 220 stores the validation rules 202, data entities 204, and data entity instances 206 of the data processing system 200. The data persistence layer 220 may comprise one or more datastores to store the data. In some embodiments, a datastore may include a relational database system so that data may be stored in tables of the relational database system. However, a datastore is not limited to being a relational database system, as a datastore may be configured to store data in any suitable way. For example, a datastore comprises an object-oriented database, a distributed database, a NoSQL database, an SQL database, and/or any other suitable database.

In some embodiments, the data persistence layer 220 may include one or more storage devices storing data in one or more formats of any suitable type. For example, the storage device(s) may store data using one or more database tables, spreadsheet files, text files, and/or files in any other suitable format. The storage device(s) may be of any suitable type and may include one or more servers, one or more database systems, one or more portable storage devices, one or more non-volatile storage devices, one or more volatile storage devices, and/or any other device(s) configured to store data. In embodiments where a datastore includes multiple storage devices, the storage devices may be co-located in one physical location (e.g., a building) or distributed across multiple locations (e.g., multiple buildings, in different cities, states, or countries). The storage devices may be configured to communicate with one another using a communication network (e.g., Internet).

Figure 8:
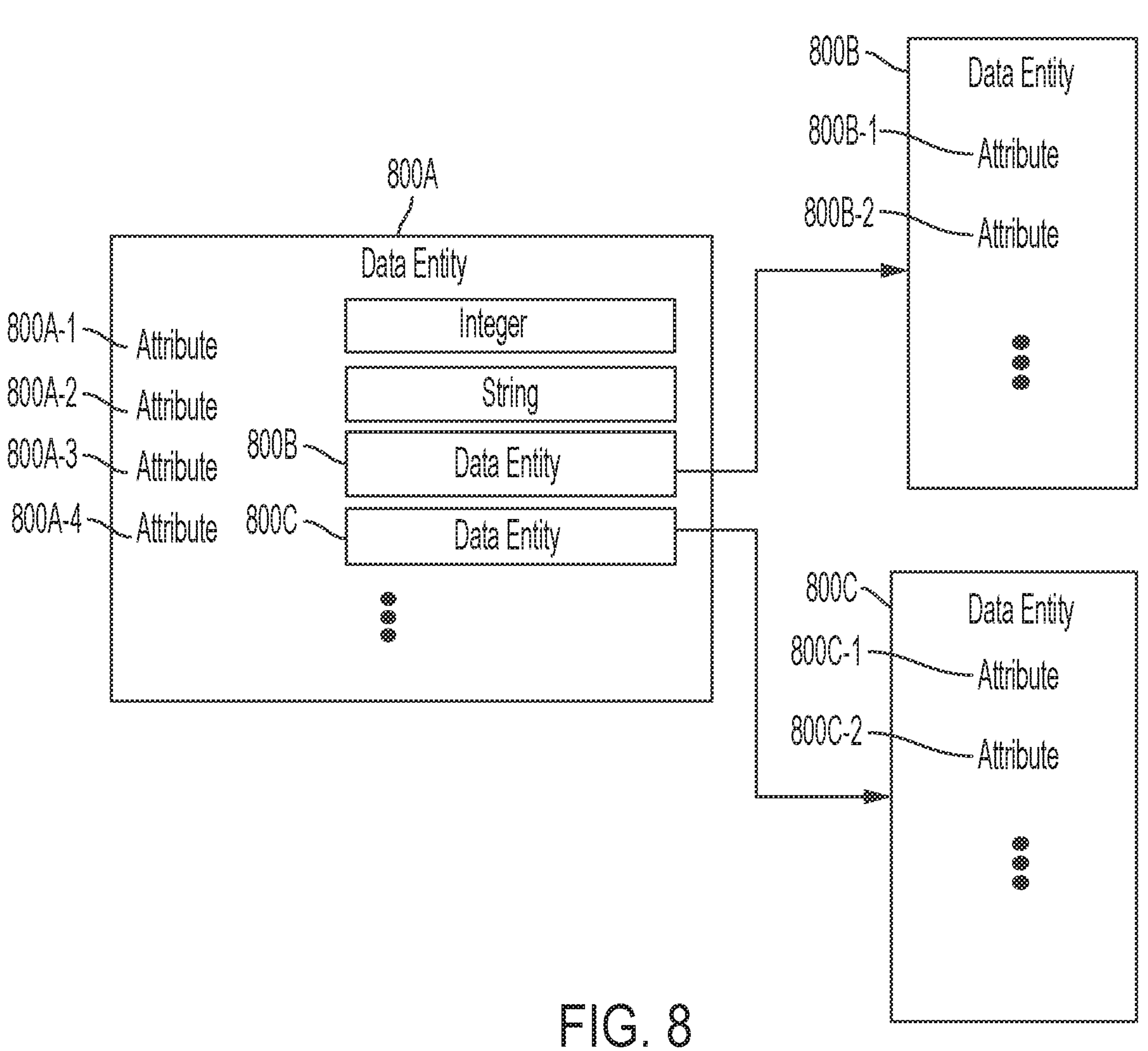
FIG. 8 is a schematic diagram of a data entity that may be defined by a data processing system, according to some embodiments of the technology described herein.

FIG. 8 is a schematic diagram of a data entity 800A that may be defined in the data processing system 200. As shown in FIG. 8, the data entity 800A includes attributes 800A-1, 800A-2, 800A-3, 800A-4. Attribute 800A-1 may be assigned an integer value in instances of the data entity 800A, and attribute 800A-2 may be assigned a string value in instances of the data entity 800A. Attribute 800A-3 may be assigned an instance of data entity 800B as a value in instances of data entity 800A. As shown in FIG. 8, data entity 800B has its own set of attributes including attributes 800B-1, 800B-2. Attribute 800A-4 may be assigned an instance of data entity 800C as a value. As shown in FIG. 8, data entity 800C has its own set of attributes including attributes 800C-1, 800C-2.

The data processing system 200 may be configured to assign a data entity instance as a value to an attribute in various ways. In some embodiments, the data processing system 200 may be configured to assign a data entity instance as a value to an attribute by storing a reference to the data entity instance as an attribute value. For example, the data processing system 200 may store a URL, identifier, pointer, or other reference to the data entity instance assigned as a value.

The data processing system 200 may be configured to refer to an attribute of one data entity to another data entity in various ways. In some embodiments, the data processing system 200 may be configured to store a reference (e.g., a pointer, link, URL, name, or other reference) to the other data entity. For example, the data processing system 200 may store a link to data entity 800B as the attribute 800A-3 of data entity 800A. In some embodiments, the data processing system 200 may be configured to store a referenced data entity within a data entity that refers to the referenced data entity. For example, the data processing system 200 may be configured to store data entity 800B within data entity 800A in association with attribute 800A-3.

Figure 9:
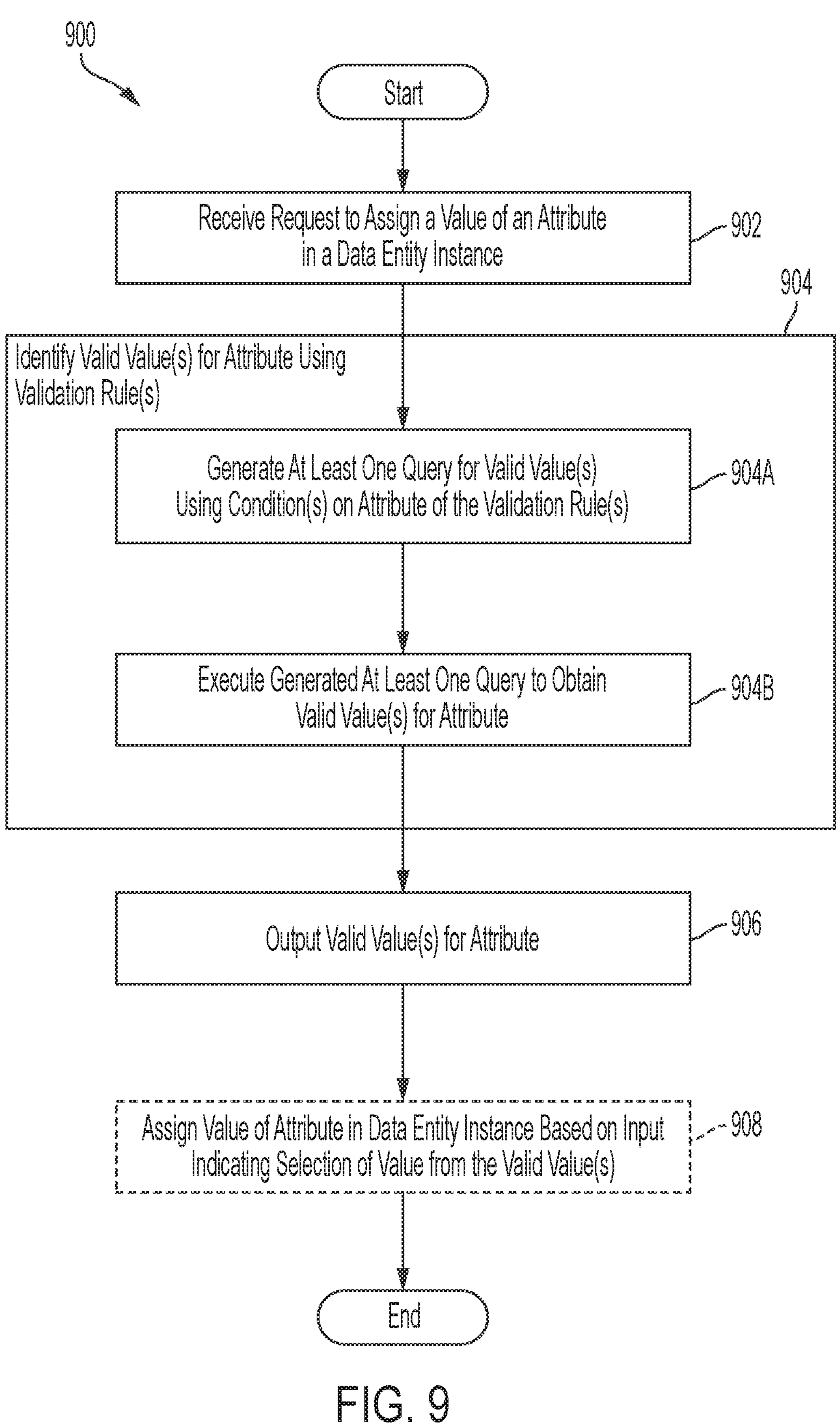
FIG. 9 is a flowchart of an example process of enforcing a valid data assignment, according to some embodiments of the technology described herein.

FIG. 9 is a flowchart of an example process 900 of enforcing a valid data assignment, according to some embodiments of the technology described herein. In some embodiments, process 900 may be performed by data processing system 100. For example, the data processing system 100 may perform process 900 using assignment validation module 210.

Process 900 begins at block 902, where the system receives a request to assign a value to an attribute in a data entity instance. In some embodiments, the system may be configured to receive a request through a GUI displayed on a client device of a user. For example, the system may receive a request submitted through a GUI that allows a user to assign values to attributes of the data entity instance. In some embodiments, the system may be configured to receive a request from a process (e.g., a software application). For example, the system may receive a request through an API request to assign a value to an attribute in the data entity instance.

Next, process 900 proceeds to block 904, where the system identifies one or more valid values for the attribute using one or more validation values. The validation rule(s) may be associated with a data entity that the data entity instance is instantiated from. Examples of data entities and instances thereof are described herein with reference to FIGS. 4B-4C, FIGS. 5A-5B, and FIGS. 6A-6B. Example of validation rule(s) are described herein with reference to FIGS. 3A-3C, FIG. 4D, FIG. 5C, and FIG. 6C.

At sub-block 904A of block 904, the system generates at least one query for valid value(s) of the attribute using condition(s) on the attribute in the validation rule(s). The system may be configured to generate a query for valid value(s) of the attribute by: (1) transforming an application validation rule to obtain a transformed rule; and (2) generating a query using the transformed rule. In some embodiments, the transformed rule may include various components associated with respective conditions in a rule. For example, the transformed rule may include multiple logical expressions of conditions in the rule. The system may be configured to generate portions of the query using respective components of the transformed rule. For example, the system may generate statements of an SQL query using respective components of the transformed rules. Example techniques for generating a query using validation rule(s) are described herein with reference to FIG. 4E, FIG. 5D, and FIG. 6D.

At sub-block 904B of block 904, the system executes the generated at least one query to obtain the valid value(s) for the attribute. The system may be configured to execute the at least one query on a datastore storing data entity instances. For example, the system may execute the at least one query on a database (e.g., an SQL database) storing the data entity instances. In some embodiments, the system may be configured to transmit the query to another system for execution. For example, a processor of a database may execute the query and transmit the results to the system performing process 900.

In some embodiments, the system may be configured to execute the query on a portion of the datastore. For example, the system may execute the generated query on a subset of data entity instances in the datastore. The subset of data entity instances may be data entity instances that are assignable to the attribute for which a value is to be assigned (e.g., as indicated by the data entity that the data entity instance is instantiated from). The system may be configured to execute the query on the portion of the datastore by: (1) identifying data entity instances that are assignable as values to the attribute; and (2) executing the query on the identified data entity instances to obtain valid value(s) for the attribute.

Next, process 900 proceeds to block 906, where the system outputs the valid value(s) for the attribute. In some embodiments, the system may be configured to present the valid value(s) in a GUI through which a user may select one or more of the valid value(s) to assign to the attribute. For example, the system may present the valid value(s) as a list in an assignment GUI from which a user can select a value and submit it for assignment to the attribute. In some embodiments, the system may be configured to transmit the valid value(s) to a process that can select one or more of the valid value(s) to assign to the attribute. For example, the system may transmit the valid value(s) to a software application (e.g., through an API) for programmatic selection of one or more of the valid value(s) for assignment to the attribute.

Next, process 900 proceeds to block 908, where the system assigns a value to the attribute in the data entity instance based on input indicating selection of the value from the valid value(s). For example, the system may be configured to receive the input through a GUI and/or an API. The system may be configured to save the selected value as the value assigned to the attribute of the data entity instance (e.g., in data persistence layer 220). As indicated by the dotted lines of block 908, the step of block 908 may not be performed as part of process 900. For example, the system may not perform the step at block 908 because a selection of a value is not received. In some embodiments, the system may be configured to perform the step at block 908 separately from the steps of blocks 902-906. For example, the system may assign the value at a later time with other attribute value assignments.

Figure 10:
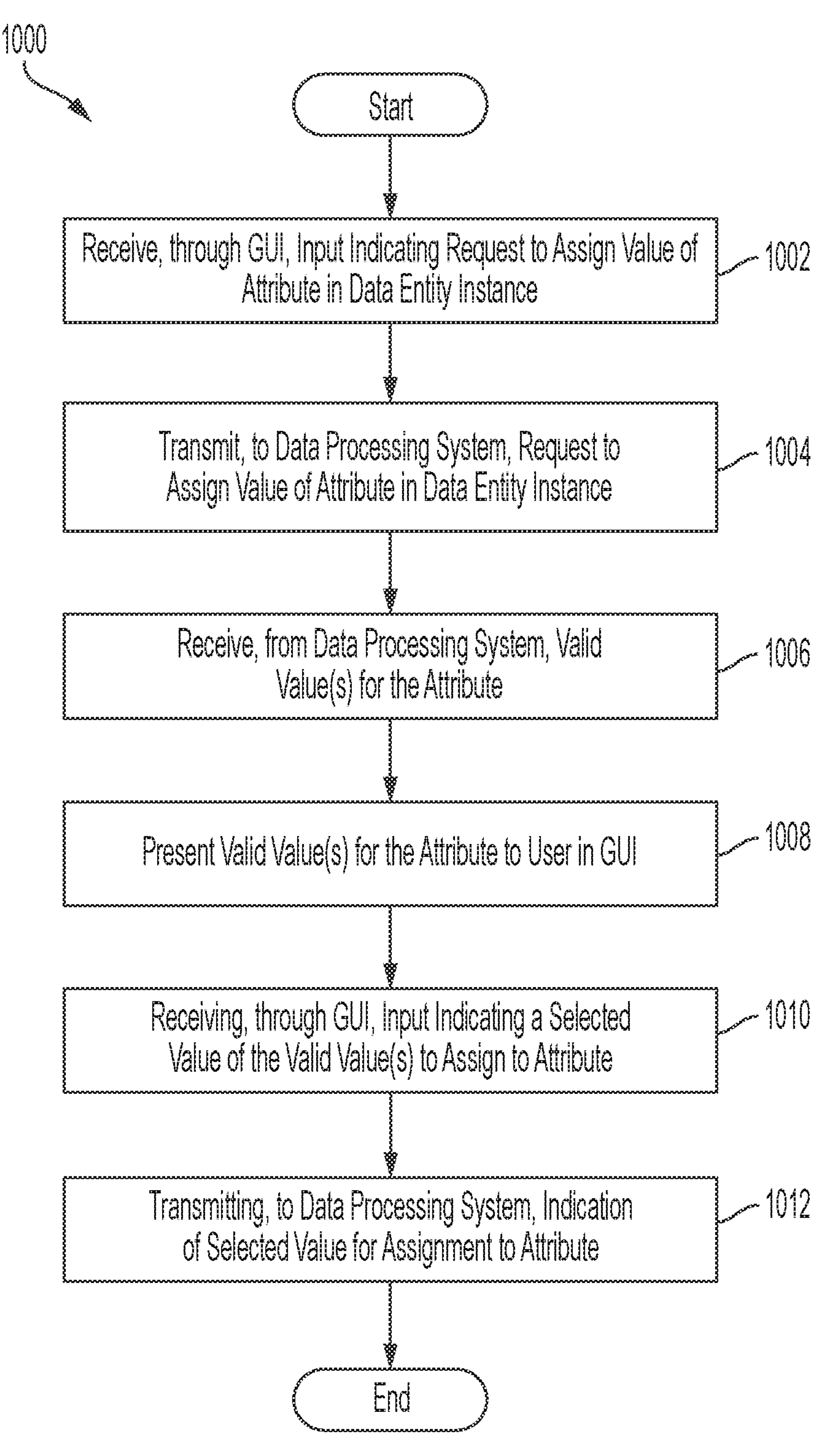
FIG. 10 is a flowchart of an example process for a client device to assign a value to an attribute in a data entity instance, according to some embodiments of the technology described herein.

FIG. 10 is a flowchart of an example process 1000 for a client device to assign a value to an attribute in a data entity instance, according to some embodiments of the technology described herein. Process 1000 may be performed by any suitable computing device in communication with a data processing system. For example, process 1000 may be performed by one of the devices of the users 208 in communication with data processing system 200 as described herein with reference to FIGS. 2A-2C.

Process 1000 begins at block 1002, where the device receives, through a GUI, input indicating a request to assign a value to an attribute in a data entity instance. In some embodiments, the GUI may be a data entity instance edit GUI through which attributes can be assigned values. For example, the device may receive, through the GUI, a selection of an option to assign a value to the attribute.

Next, process 1000 proceeds to block 1004, where the device transmits, to the data processing system, the request to assign the value to the attribute in the data entity instance. For example, the device may transmit the request through a communication network (e.g., the Internet). In some embodiments, the request may comprise a network communication indicating the attribute and the data entity instance. For example, the request may specify an identifier of the data entity instance and an attribute in the data entity instance for which a value is to be as signed.

Next, process 1000 proceeds to block 1006, where the device receives, from the data processing system, one or more valid values for the attribute. For example, the request transmitted by the device may have caused the data processing system to perform process 900 described herein with reference to FIG. 9 to obtain the valid value(s). In some embodiments, the device may be configured to receive the valid value(s) through a communication network (e.g., the Internet). For example, the device may receive a network communication indicating the valid value(s). In some cases, the valid value(s) may be instance(s) of another data entity. In some cases, the valid value(s) may be integers, strings, floating point values, or another type of data. In some embodiments, the network communication may include only valid value(s). In some embodiments, the network communication may include all values assignable to the attribute with information indicating which of the values are valid and/or invalid.

Next, process 1000 proceeds to block 1008, where the device presents the valid value(s) for the attribute in a GUI. In some embodiments, the device may be configured to present the valid value(s) in an assignment GUI that lists the valid value(s). For example, the device may present the valid value(s) in a scrollable list of valid value(s) in which a user can select a value for assignment to the attribute. In some embodiments, the GUI may allow the user to select an option that also causes the GUI to display one or more invalid values for the attribute in addition to the valid value(s). For example, in response to selection of the option in the GUI, the device may request invalid values of the attribute for display. As another example, the device may display invalid values that were obtained with the valid values at block 1006.

Next, process 1000 proceeds to block 1010, where the device receives, through the GUI, input indicating a selected value of the valid value(s) to assign to the attribute. For example, the device may receive the input in response to a user selecting the value in the GUI and selecting a submit option. As another example, the device may receive the input in response to another user action (e.g., a tap, voice command, or other user action).

Next, process 1000 proceeds to block 1012, where the system transmits, to the data processing system, an indication of the selected value for assignment to the attribute. For example, the device may transmit an identifier of the selected value for assignment to the attribute. The transmission may cause the data processing system to assign the selected value to the attribute as described at block 908 of process 900 described herein with reference to FIG. 9.

Figure 11:
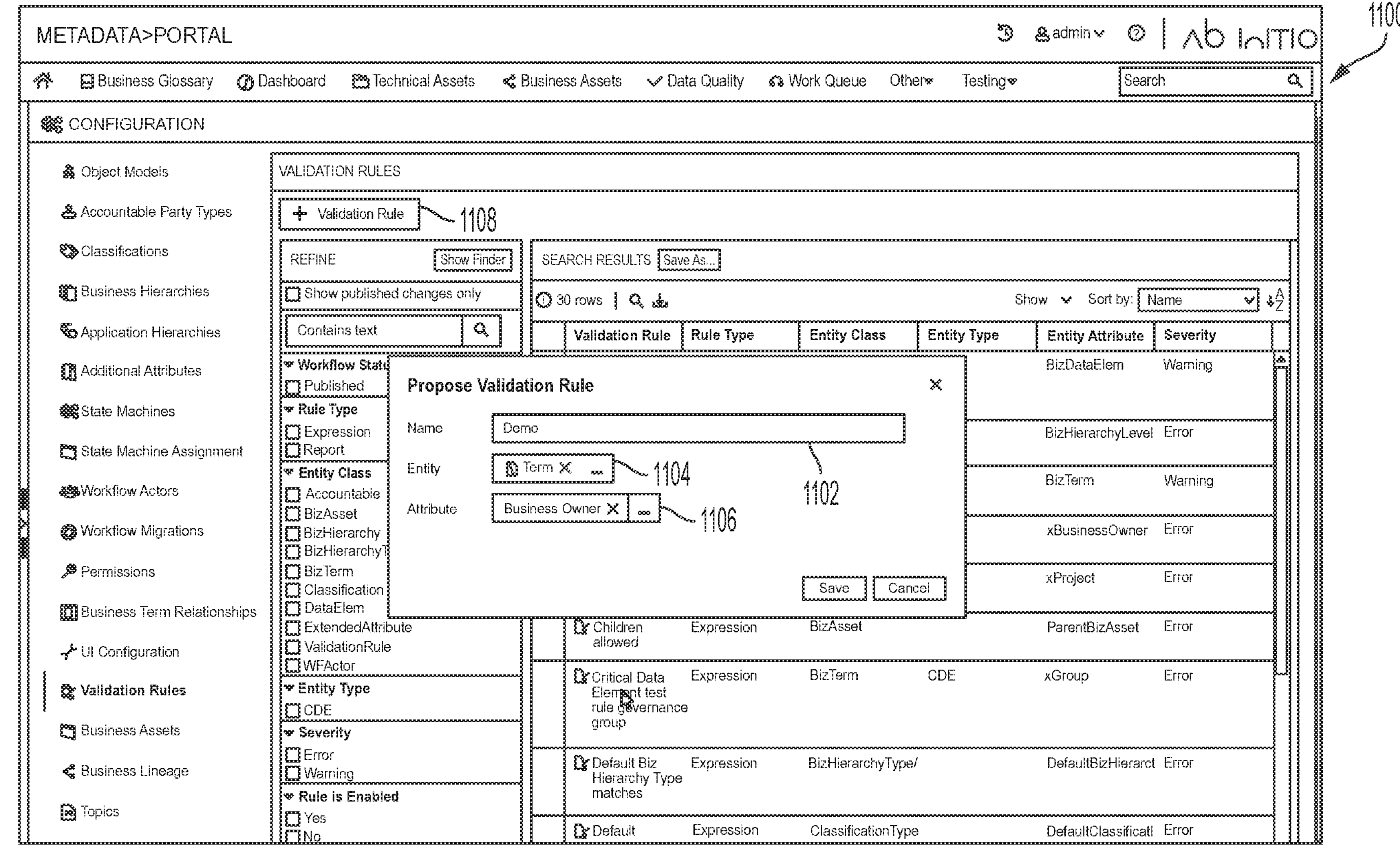
FIG. 11 is an example GUI for creation of a new validation rule, according to some embodiments of the technology described herein.

FIG. 11 is a GUI 1100 for creation of a new validation rule, according to some embodiments of the technology described herein. As shown in FIG. 11, the GUI 1100 allows a user to provide input specifying a name 1102 of the validation rule, a data entity 1104 associated with the validation rule, and an attribute 1106 of the data entity that the validation rule is associated with. The user may navigate to the GUI 1100 in any number of ways. For example, the user may select a graphical element 1108 that initiates creation of a new validation rule.

Figure 12A:
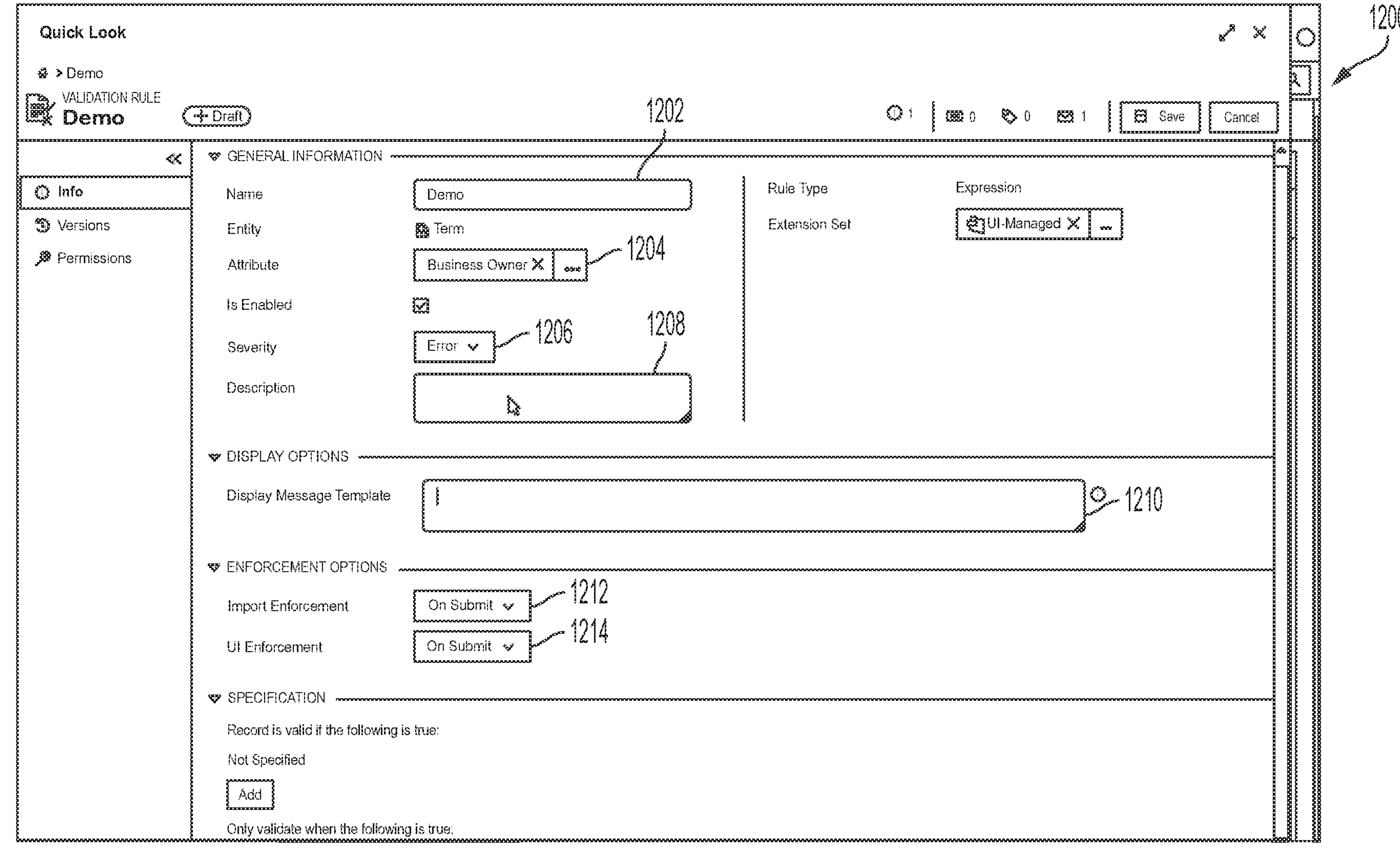
FIG. 12A is an example GUI for defining a new validation rule, according to some embodiments of the technology described herein.

FIG. 12A is a GUI 1200 for defining a new validation rule, according to some embodiments of the technology described herein. As shown in FIG. 12A, the GUI 1200 allows a user to provide input specifying information about the validation rule (e.g., information described with reference to FIGS. 3A-3C). The GUI 1200 allows a user to provide input specifying a name 1202 of the validation rule, an attribute 1204 of a data entity that the validation rule is associated with, a severity 1206, a textual description 1208 of the validation rule, and a message 1210 to display for the validation rule. The GUI 1200 allows a user to provide input specifying an import enforcement action 1212 for the validation rule, and a user interface enforcement action 1214 for the validation rule.

Figure 12B:
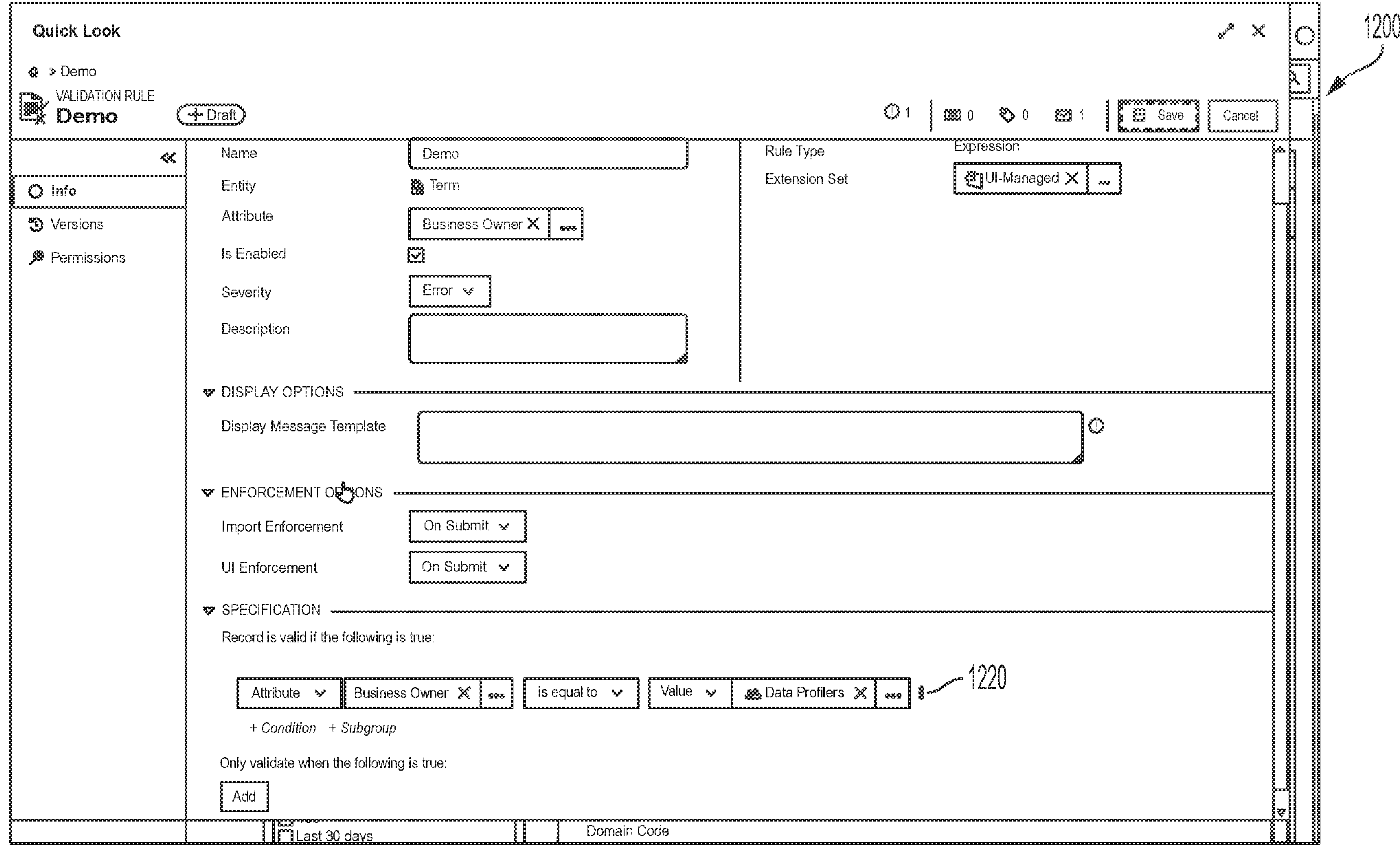
FIG. 12B illustrates specification of a condition on an attribute in the GUI of FIG. 12A, according to some embodiments of the technology described herein.

FIG. 12B illustrates specification of a condition for an attribute in the GUI 1200 of FIG. 12A, according to some embodiments of the technology described herein. As shown in FIG. 12B, the GUI 1200 provides an interface through which a user can specify one or more expressions defining condition(s) of the validation rule. In the example of FIG. 12B, the expression 1220 indicates the condition that the Business Owner attribute of the Term data entity is equal to a value of "Data Profilers".

Figure 12C:
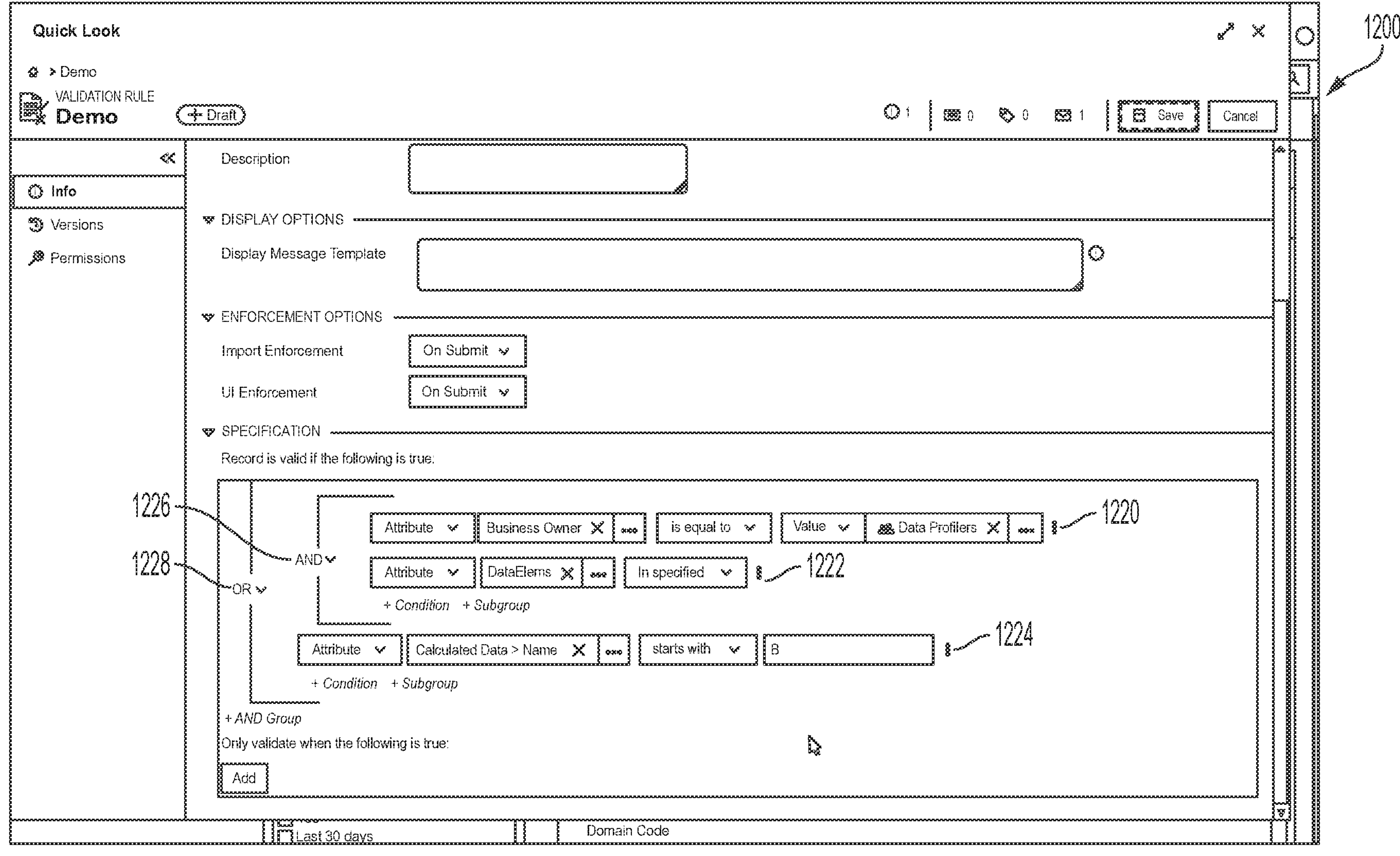
FIG. 12C illustrates specification of conditions on other attributes in the GUI of FIG. 12A, according to some embodiments of the technology described herein.

FIG. 12C illustrates specification of additional expressions 1222, 1224 in the GUI 1200 of FIG. 12A, according to some embodiments of the technology described herein. In addition to expression 1220, in the example of FIG. 12C, the expressions 1222, 1224 have also been specified for the validation rule. The expression 1222 indicates that the DataElems attribute of the Term data entity has a value specified. The expression 1224 indicates that the Name attribute of the Calculated Data attribute begins with the letter "B". An AND operation 1226 is applied between the expressions 1220, 1222, and an OR operation 1228 is applied between a result of the AND operation and expression 1224.

Figure 12D:
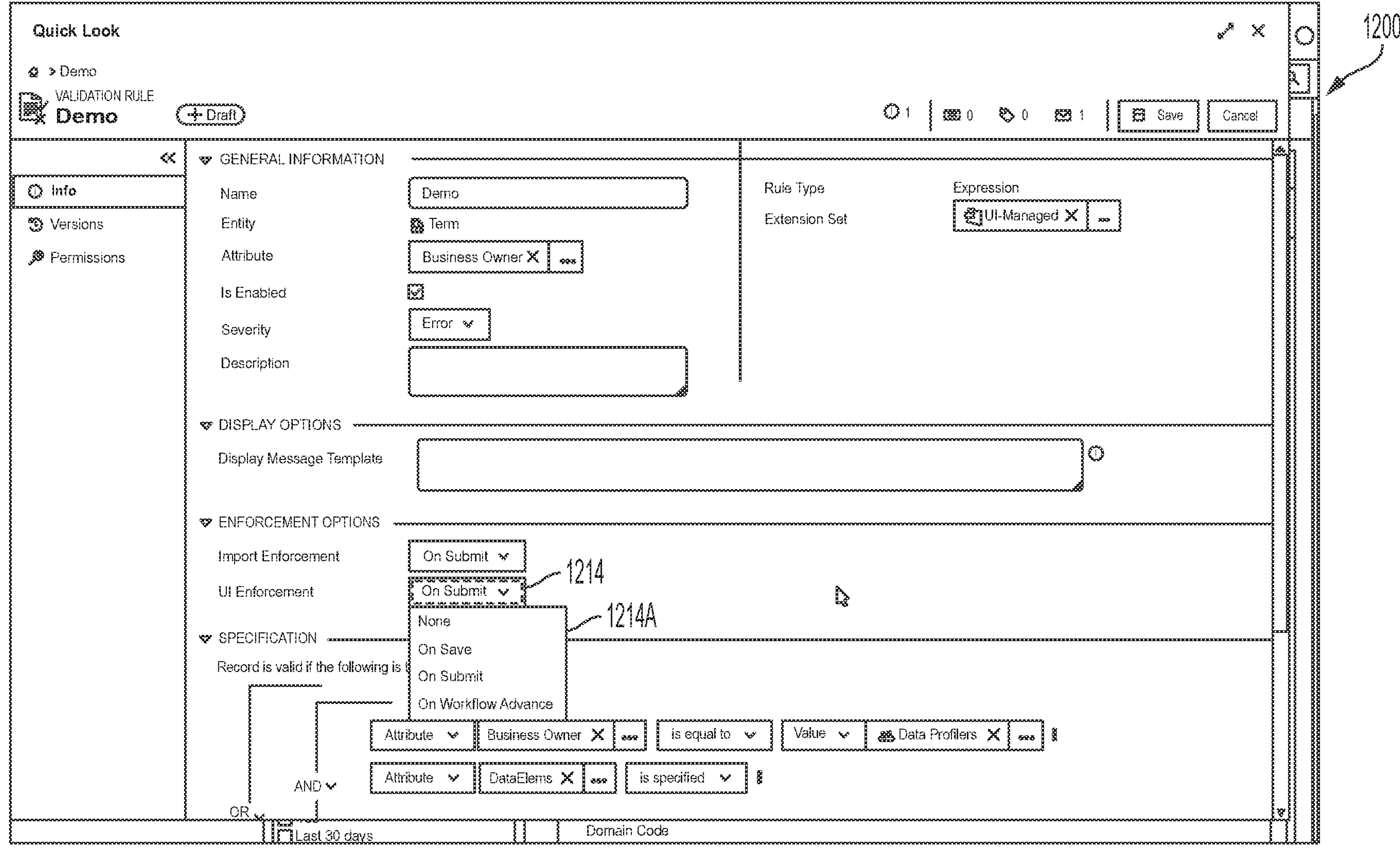
FIG. 12D illustrates specification of a validation rule user interface enforcement action in the GUI of FIG. 12A, according to some embodiments of the technology described herein.

FIG. 12D illustrates specification of a validation rule user interface enforcement action 1214 in the GUI 1200 of FIG. 12A, according to some embodiments of the technology described herein. As shown in FIG. 12D, the GUI 1200 allows selection from a set of user interface actions 1214A which include "None", "On Save", "On Submit", and "On Workflow Advance". Each of these indicates a particular user interface action on which the validation rule will be enforced. For example, the data processing system may determine whether a data entity instance meets the validation rule in response to the specified user interface action. In some embodiments, the data processing system may restrict completion of the user interface action until a data entity instance meets the validation rule. "None" may indicate that enforcement is not to be performed on any user interface action.

Figure 12E:
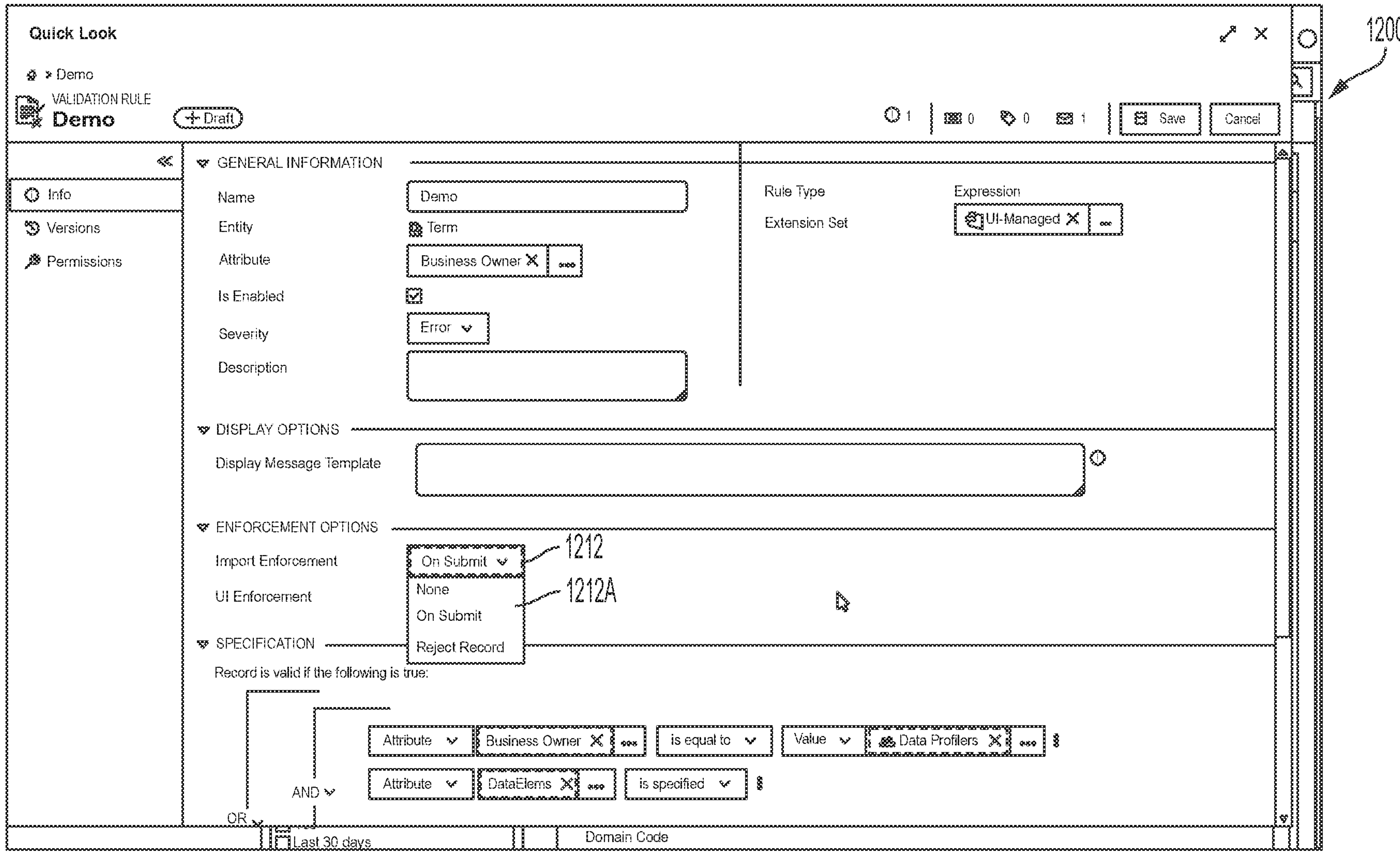
FIG. 12E illustrates specification of a validation rule import enforcement action in the GUI of FIG. 12A, according to some embodiments of the technology described herein.

FIG. 12E illustrates specification of a validation rule import enforcement action 1212 in the GUI 1200 of FIG. 12A, according to some embodiments of the technology described herein. As shown in FIG. 12E, the GUI 1200 allows selection from a set of import enforcement actions 1212A which include "None", "On Submit", and "Reject Record". The "Reject Record" may indicate that a data entity instance is to be rejected if the data entity instance does not meet the validation rule. The "On Submit" action may cause the data processing system to determine whether the validation rule is met when a data import is submitted. "None" may indicate that the validation rule is not to be enforced on an import action.

Figure 12F:
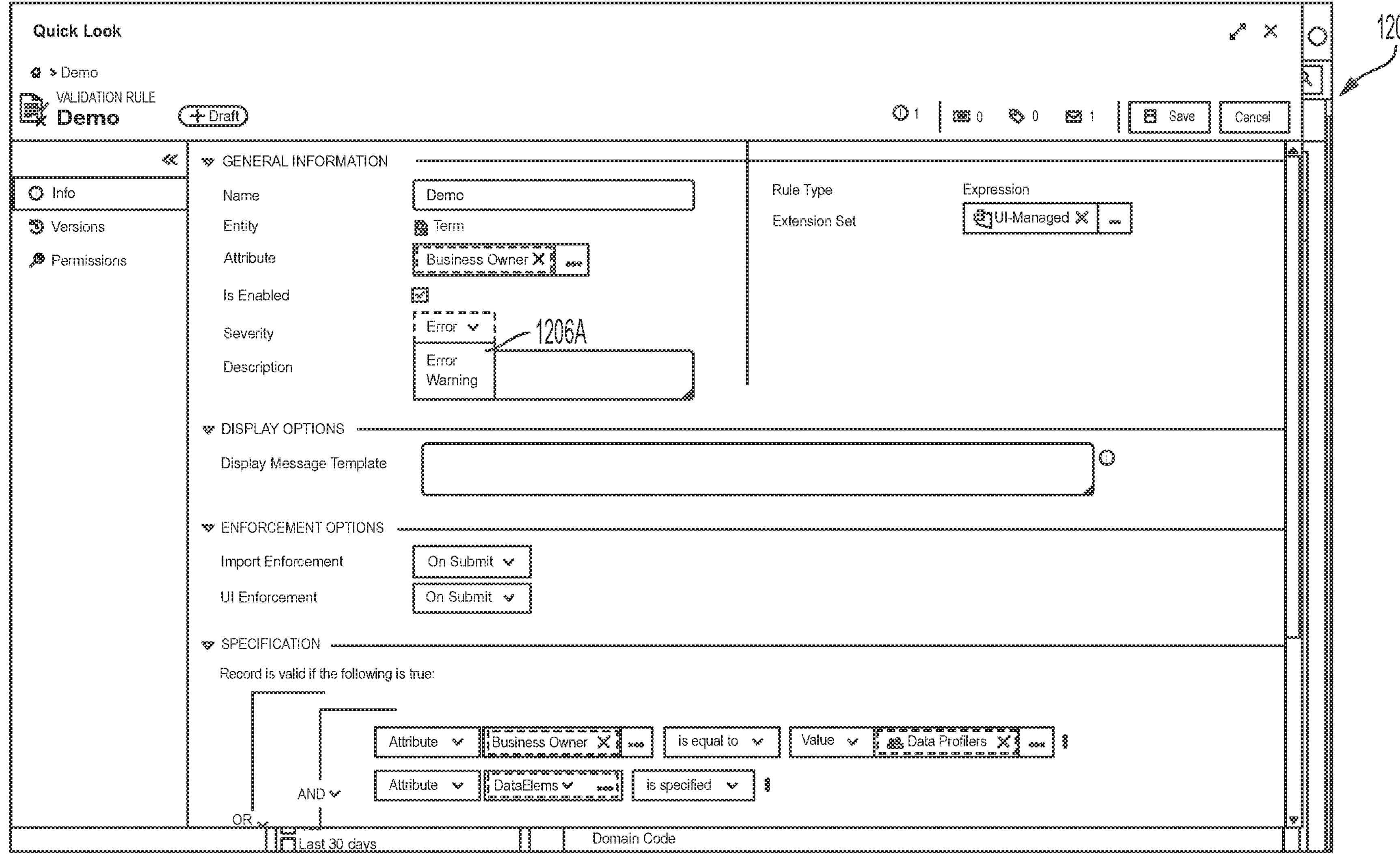
FIG. 12F illustrates specification of severity of violation of the validation rule in the GUI of FIG. 12A, according to some embodiments of the technology described herein.

FIG. 12F illustrates specification of a severity 1206 of failing to meet the validation rule in the GUI 1200 of FIG. 12A, according to some embodiments of the technology described herein. The GUI 1200 allows selecting from the following severity levels 1206A: "Error" and "Submit". The "Error" may cause the data processing system to prevent assignment of an invalid value to an attribute and provide an error. The "Warning" may cause the data processing system to allow assignment of an invalid value but indicate a warning in a GUI informing that a selected value is invalid.

Figure 13:
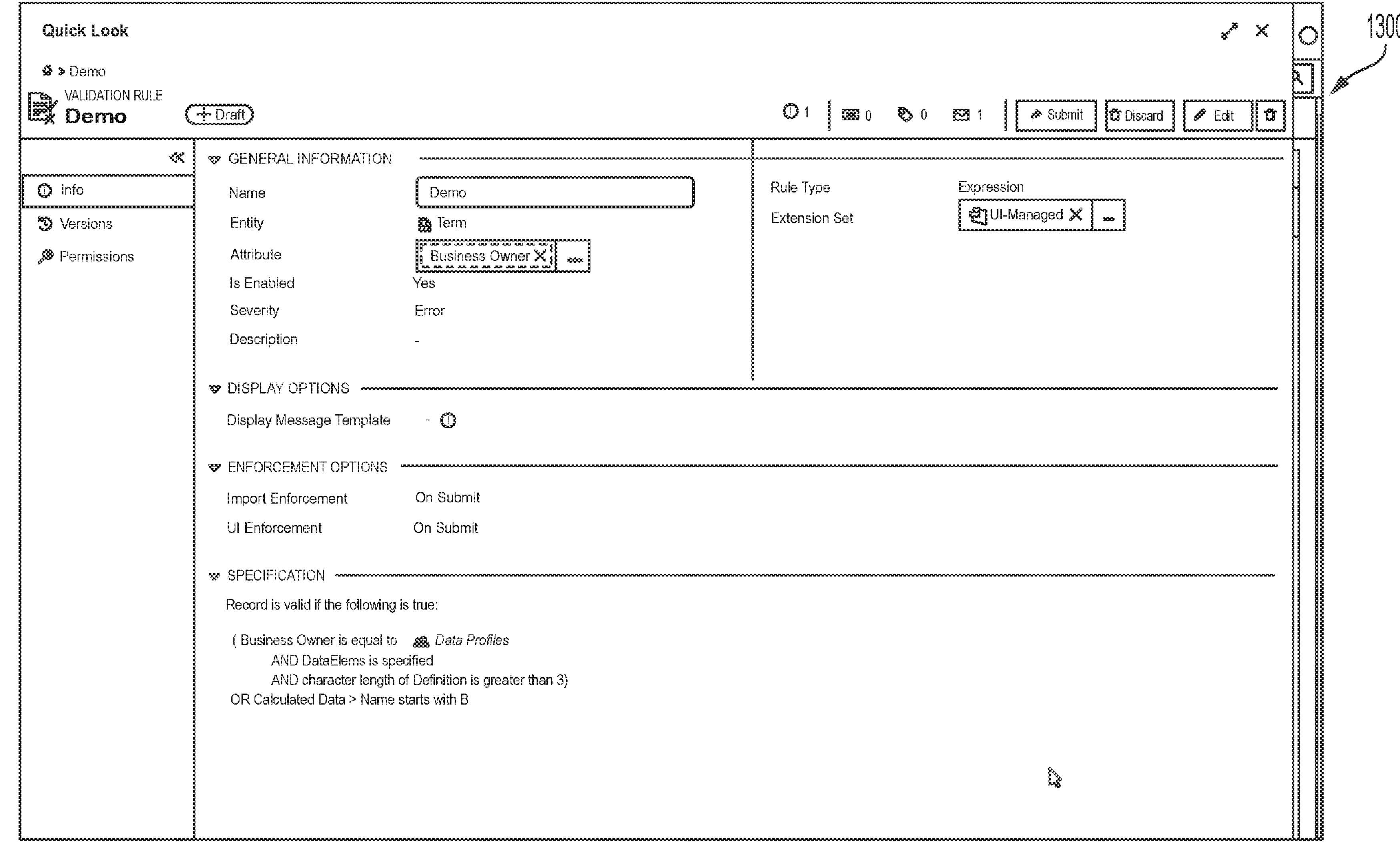
FIG. 13 is an example GUI displaying information about a validation rule created in FIGS. 12A-12F, according to some embodiments of the technology described herein.

FIG. 13 is a GUI 1300 displaying information about a validation rule created using GUI 1100 of FIGS. 11A-11F, according to some embodiments of the technology described herein. As shown in FIG. 13, the validation rule is called "Demo" and associated with the attribute "Business Owner" of the "Term" data entity. The validation rule is enabled and has a severity of "Error". The validation rule is to be enforced when an import is submitted and/or when a submit is selected in a user interface. The validation rule specifies the condition that the data entity instance is valid if: the Name attribute of the Calculated Data attribute being with the character "B"; or Business Owner attribute is equal to "Data Profilers", the DataElems attribute is specified with a value, and that the character length of a definition attribute is greater than 3.

Figure 14A:
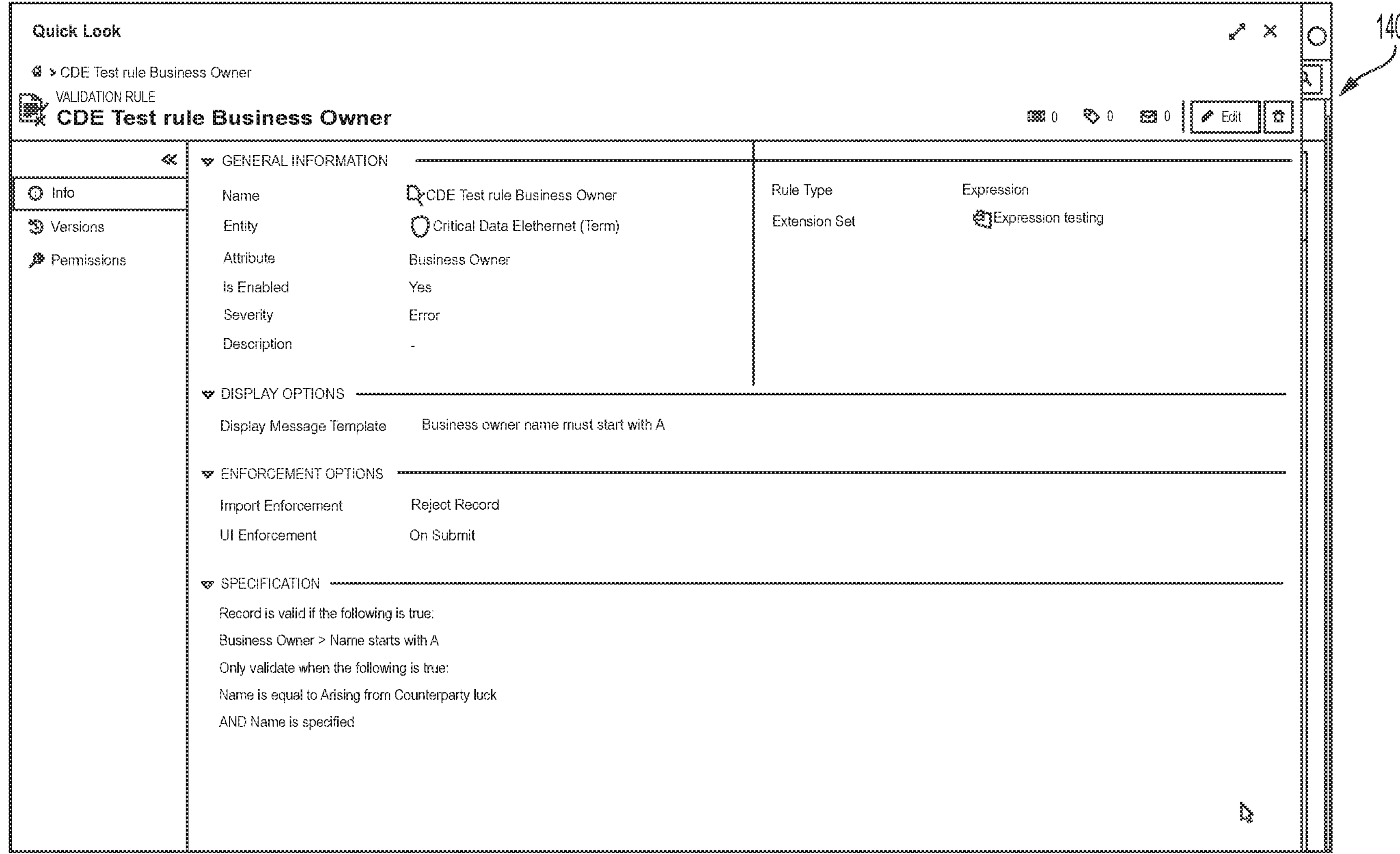
FIG. 14A is an example GUI displaying information about a validation rule, according to some embodiments of the technology described herein.

FIG. 14A is a GUI 1400 displaying information about a validation rule, according to some embodiments of the technology described herein. As shown in FIG. 14A, the name of the validation rule is "CDE Test rule Business Owner" and it is associated with the Critical Data Element data entity. The validation rule is further associated with the Business Owner attribute of the Critical Data Element data entity. The validation rule has a severity of "Error". The validation rule is further configured with the display message "Business owner name must start with A". The validation rule is to be enforced on import by rejecting the record if the validation rule is not met (i.e., if the Business Owner attribute value is invalid). The validation rule is also to be enforced when a submit action is performed in the user interface. The validation rule has a condition that the Business Owner attribute value must begin with the letter "A". The validation rule further indicates that a data entity instance is only to be validated using the validation rule when the Name attribute of the data entity instance is specified and equal to "Arising from Counterparty Risk".

Figure 14B:
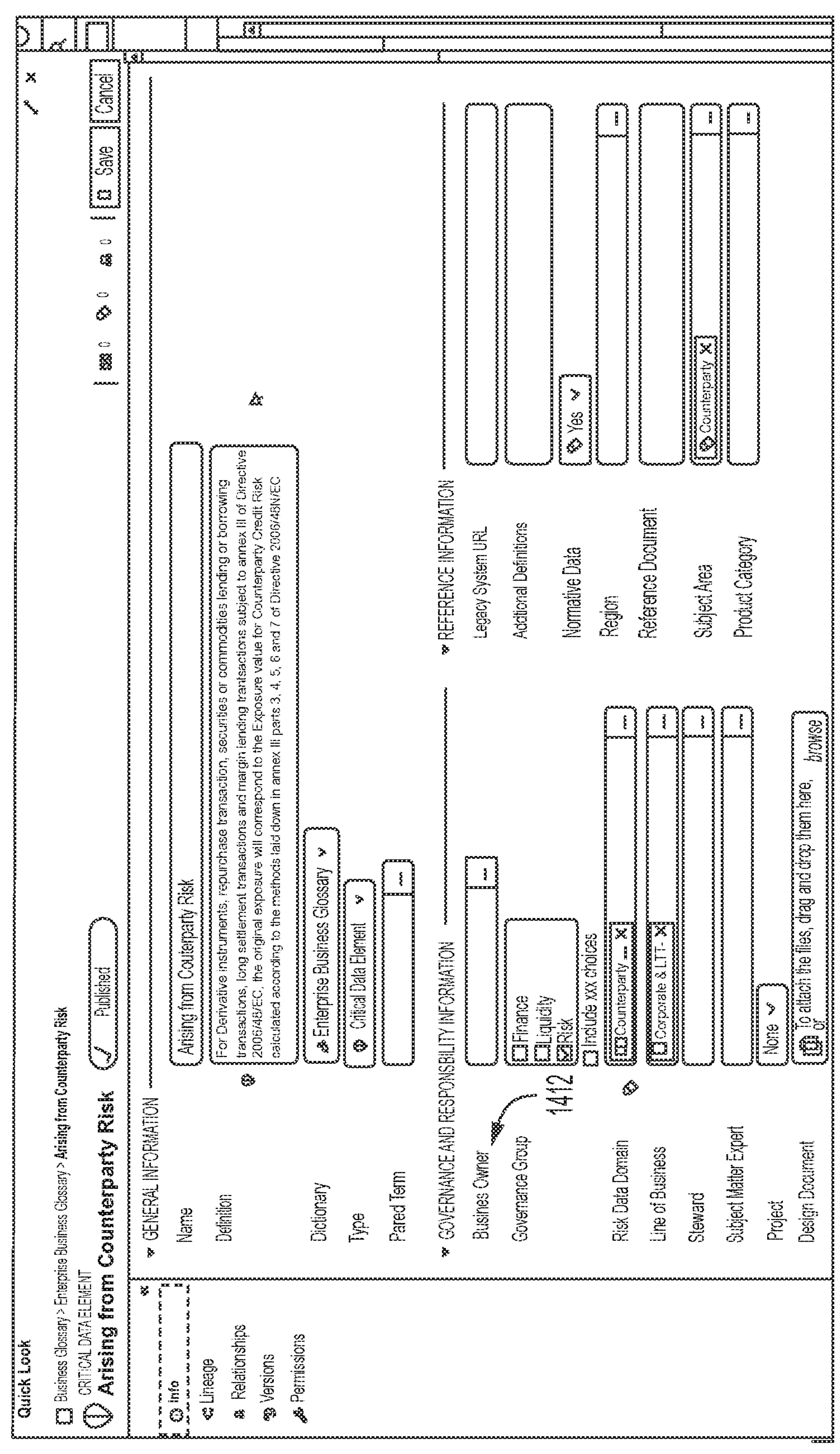
FIG. 14B is an example GUI displaying information about a data entity instance, according to some embodiments of the technology described herein.

FIG. 14B is a GUI 1410 displaying information about a data entity instance, according to some embodiments of the technology described herein. As shown in FIG. 14B, the data entity instance includes a Business Owner attribute 1412 which is not yet assigned a value. The GUI 1410 may allow a user to assign a value to the attribute 1412. The name of the data entity instance is "Arising from Counterparty Risk". Because the data entity instance is an instance of the Critical Data Element data entity, the validation rule of FIG. 14A will apply to the data entity instance.

Figure 14C:
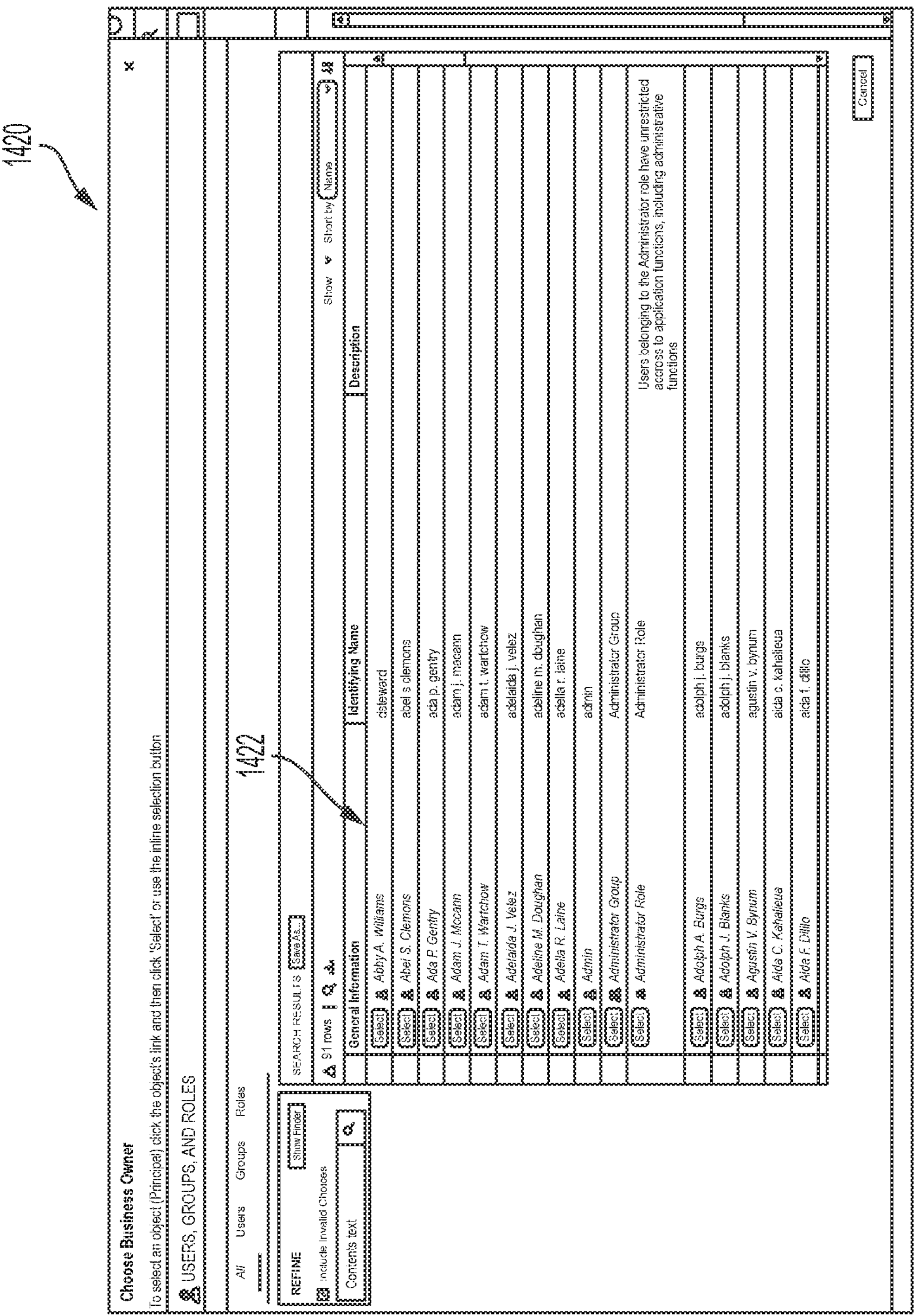
FIG. 14C is an example GUI displaying valid values identified for an attribute in the data entity instance of FIG. 14B, according to some embodiments of the technology described herein.

FIG. 14C is a GUI 1420 displaying valid values identified for the attribute 1412 in the data entity instance of FIG. 14B, according to some embodiments of the technology described herein. The GUI 1420 displays a list 1422 of valid values. The valid values may be obtained by the data processing system using an assignment validation module (e.g., by performing process 1000 described herein with reference to FIG. 10). As shown in FIG. 14C, all the listed values for the Business Owner attribute begin with the letter "A" as required by the validation rule of FIG. 14A.

Figure 14D:
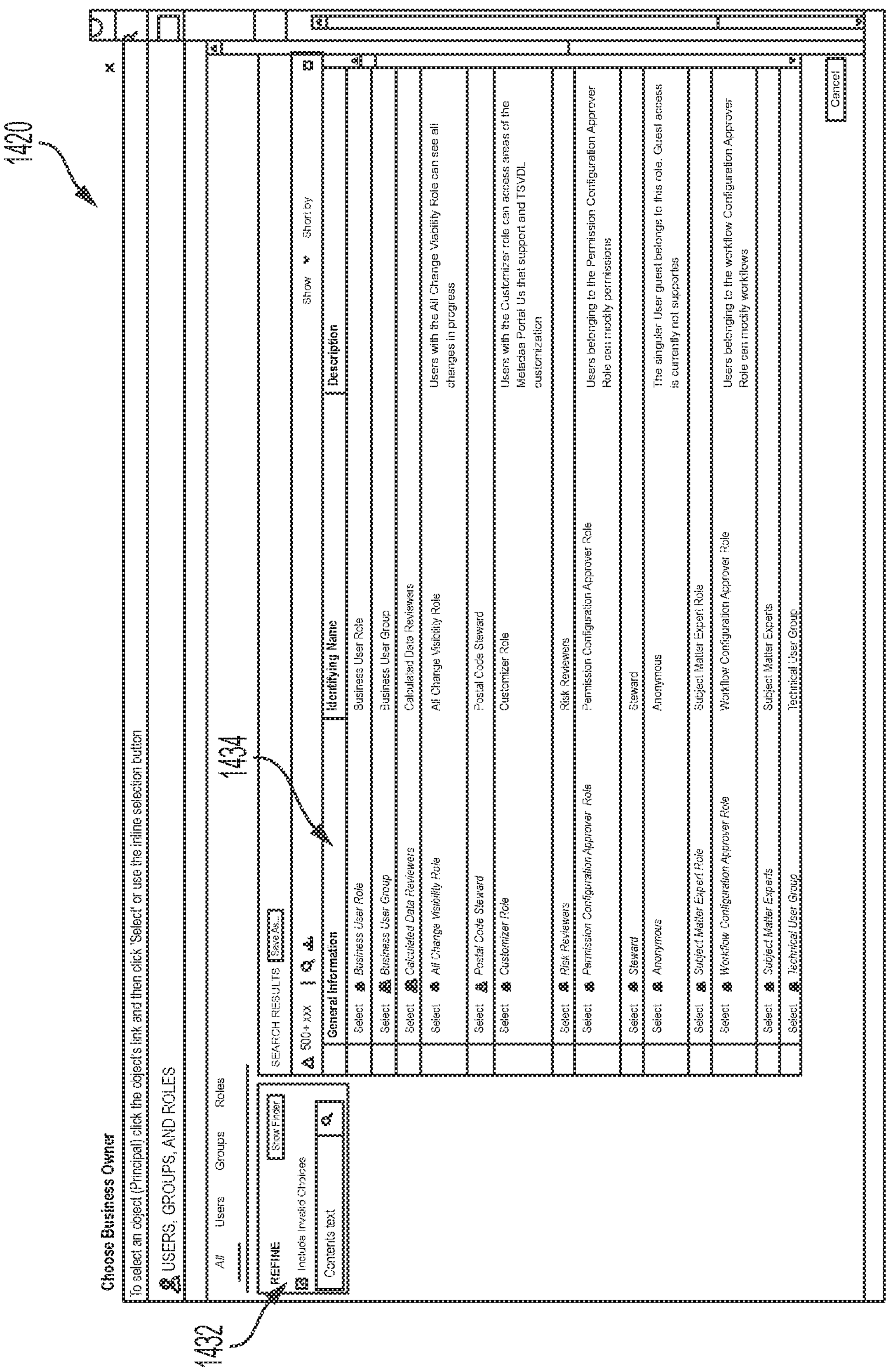
FIG. 14D is the GUI of FIG. 14C displaying valid and invalid values for the attribute in the data entity instance of FIG. 14B, according to some embodiments of the technology described herein.

FIG. 14D is the GUI 1420 of FIG. 14C displaying valid and invalid values for the attribute in the data entity instance of FIG. 14B, according to some embodiments of the technology described herein. The GUI 1420 includes an option 1432 that, when selected, causes the GUI 1420 to display a list 1434 of valid and invalid values for the Business Owner attribute 1412. As shown in FIG. 14D, the list 1434 includes valid values (i.e., beginning with the letter "A") and invalid values (i.e., not beginning with the letter "A").

Figure 14E:
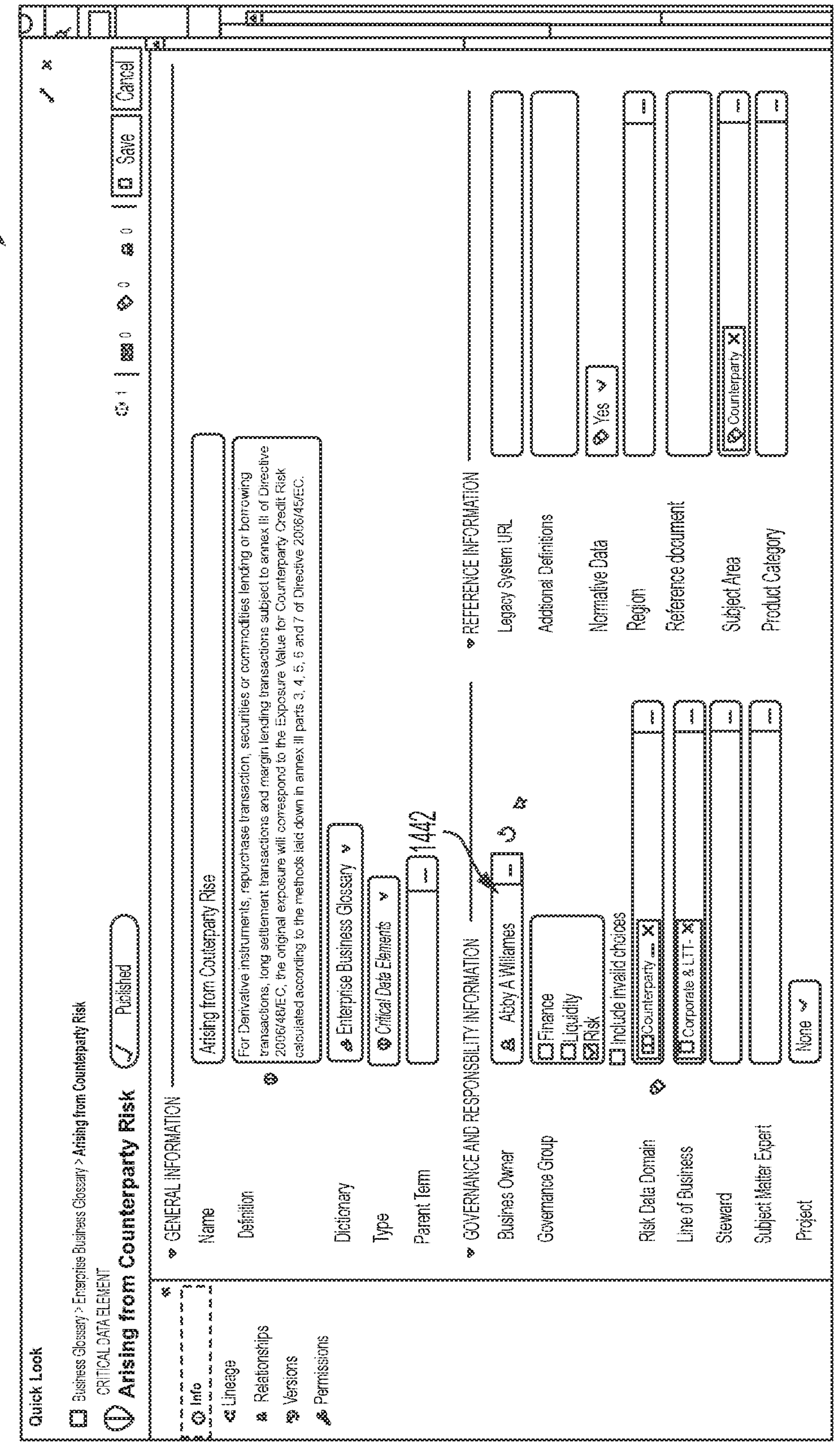
FIG. 14E is the GUI of FIG. 14B after a valid value is selected for assignment to the business owner attribute, according to some embodiments of the technology described herein.

FIG. 14E is the GUI 1410 FIG. 14B after a valid value 1442 is selected for assignment to the Business Owner attribute 1412, according to some embodiments of the technology described herein. As shown in FIG. 14E, a value of "Abby A. Williams" is selected for assignment to the Business Owner attribute 1412.

Figure 14F:
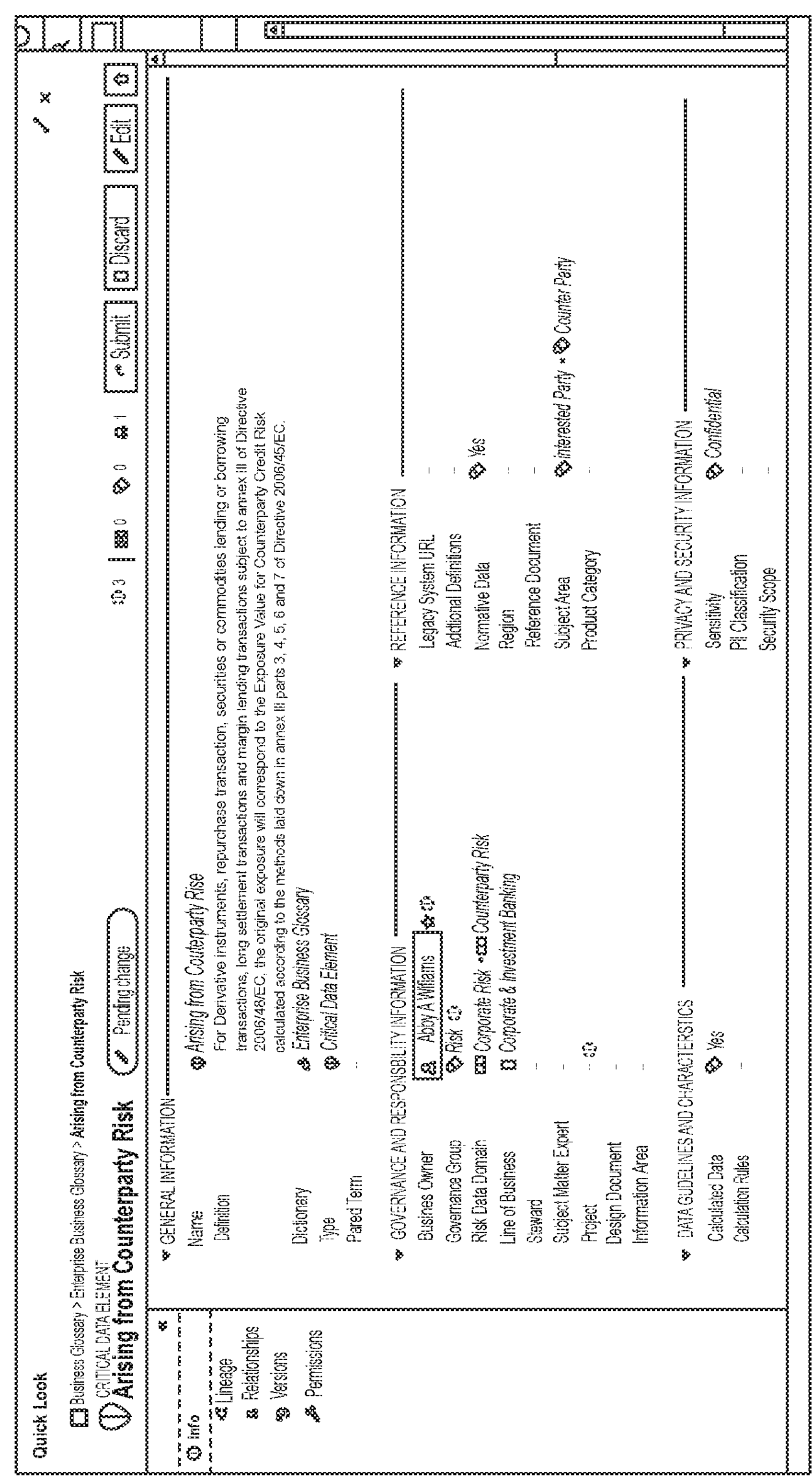
FIG. 14F is the GUI of FIG. 14B displaying the data entity instance after the valid value is assigned to the business owner attribute, according to some embodiments of the technology described herein.

FIG. 14F is the GUI 1410 of FIG. 14B displaying the data entity instance after the valid value 1442 is assigned to the business owner attribute, according to some embodiments of the technology described herein. As shown in FIG. 14F, the GUI 1410 does not display any indication of an error or invalid value because the valid value was successfully assigned to the Business Owner attribute 1412.

Figure 14G:
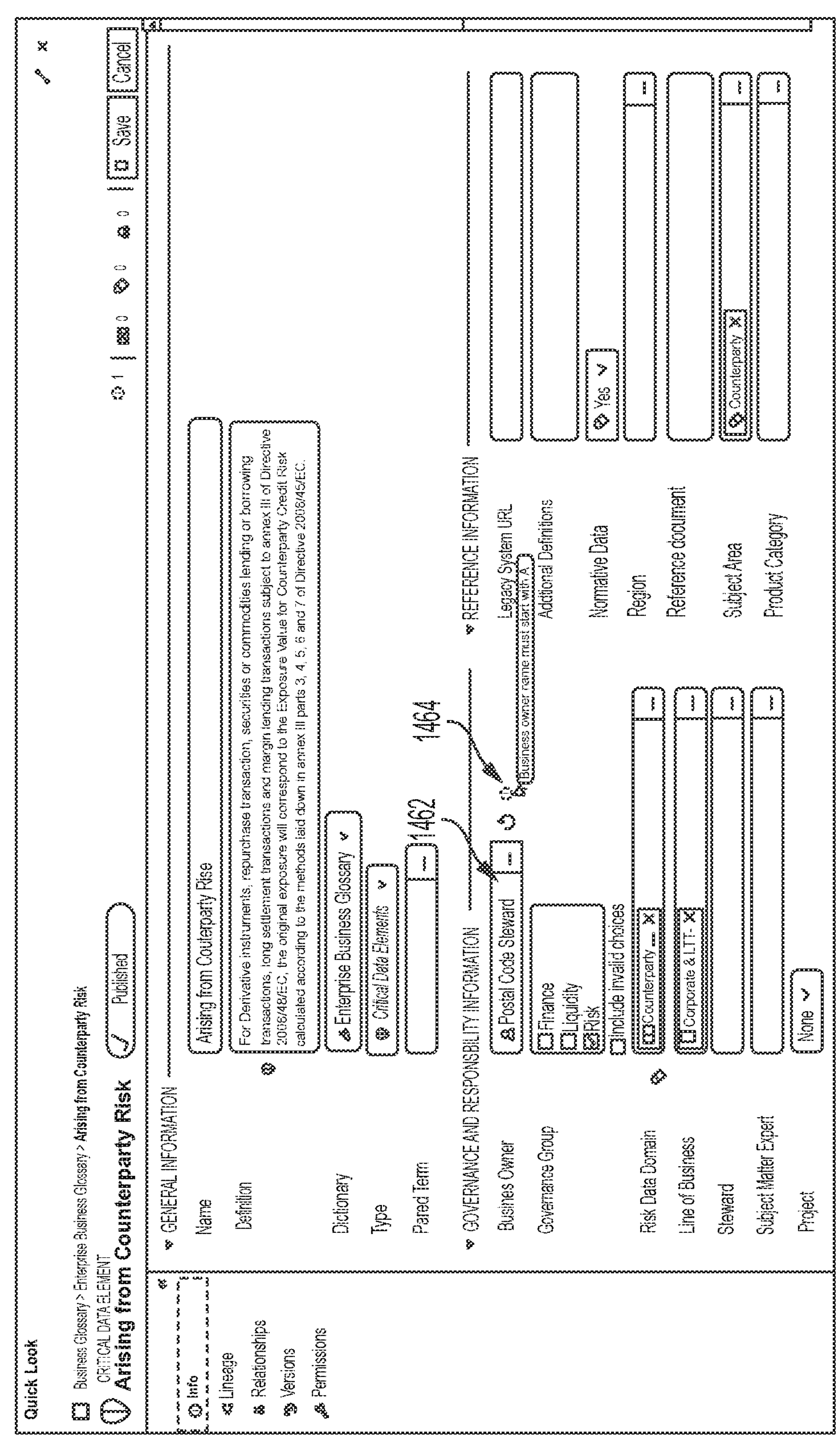
FIG. 14G is the GUI of FIG. 14B after an invalid value is selected for assignment to the business owner attribute, according to some embodiments of the technology described herein.

FIG. 14G is the GUI 1410 of FIG. 14B after an invalid value 1462 is selected for assignment to the Business Owner attribute 1412, according to some embodiments of the technology described herein. As shown in FIG. 14G, a value of "Postal Code Steward" is selected for assignment to the Business Owner attribute 1412. As this value does not begin with the letter "A", it fails to meet the validation rule of FIG. 14A and is invalid. The GUI 1410 includes a graphical element 1464 indicating that the selected value is invalid. When the user moves a cursor over the graphical element 1464, the GUI 1410 further displays a message indicating the display message configured in the validation rule of FIG. 14A: "Business owner name must start with A".

Figure 14H:
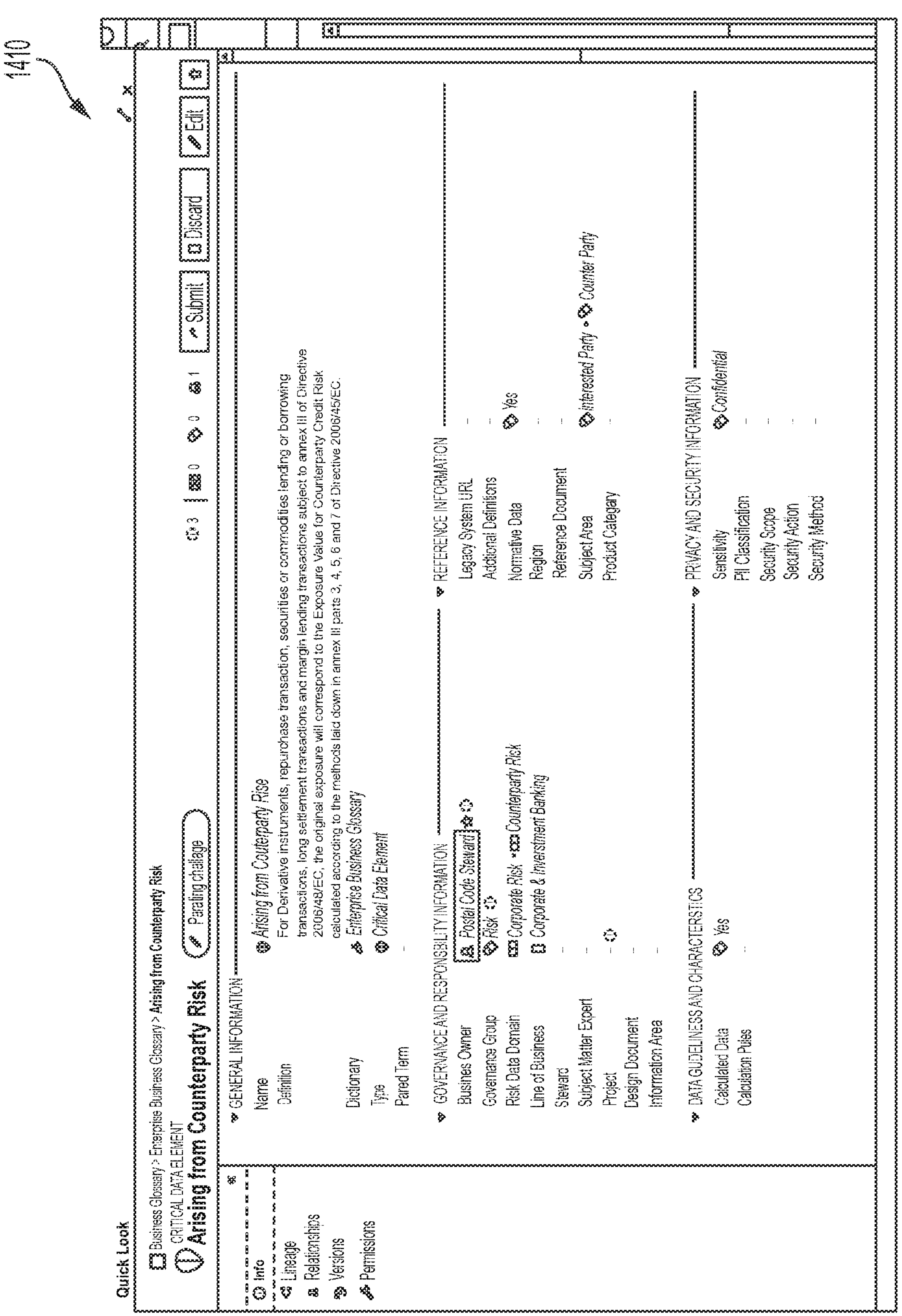
FIG. 14H is the GUI of FIG. 14B after the invalid value is submitted for assignment to the business owner attribute, according to some embodiments of the technology described herein.

FIG. 14H is the GUI of FIG. 14B after the invalid value is submitted for assignment to the business owner attribute, according to some embodiments of the technology described herein. In the example of FIG. 14H, the data processing system may reject the assignment of "Postal Code Steward" to the Business Owner attribute 1412 because the validation rule of FIG. 14A is configured with a severity of "Error". Thus, the value "Postal Code Steward" was not assigned to the Business Owner attribute 1412. In some embodiments, the value may be saved without being assigned as the value to the attribute.

Example Computer System

Figure 15:
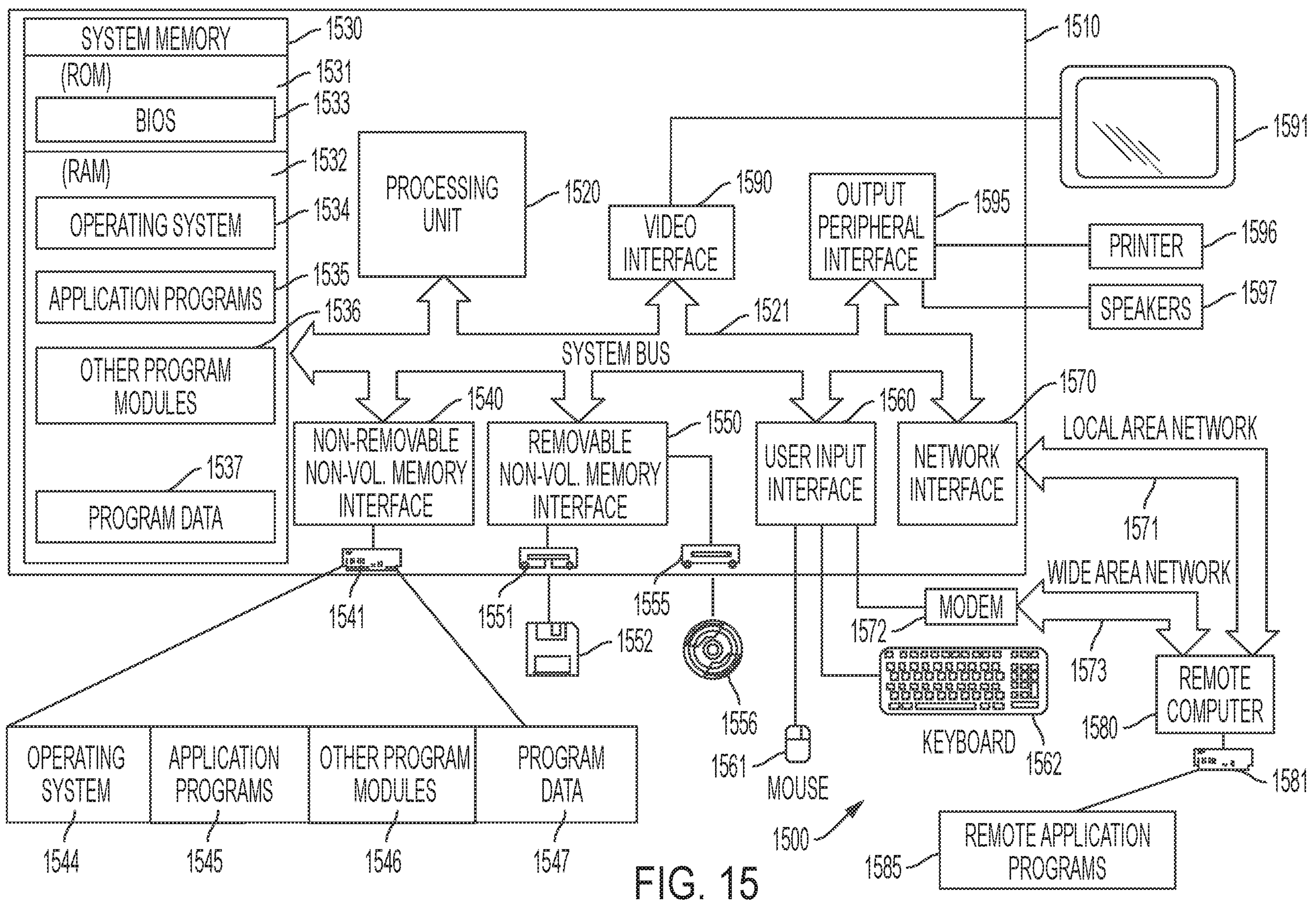
FIG. 15 is a block diagram of an illustrative computing system that may be used in implementing some embodiments of the technology described herein.

FIG. 15 illustrates an example of a suitable computing system environment 1500 on which the technology described herein may be implemented. The computing system environment 1500 is only one example of a suitable computing environment and is not intended to suggest any limitation as to the scope of use or functionality of the technology described herein. Neither should the computing environment 1500 be interpreted as having any dependency or requirement relating to any one or combination of components illustrated in the exemplary operating environment 1500.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 15, an exemplary system for implementing the technology described herein includes a general purpose computing device in the form of a computer 1500. Components of computer 1510 may include, but are not limited to, a processing unit 1520, a system memory 1530, and a system bus 1521 that couples various system components including the system memory to the processing unit 1520. The system bus 1521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (ELISA) bus, Video Electronics Standards Association (VESA) local bus, and Peripheral Component Interconnect (PCI) bus also known as Mezzanine bus.

Computer 1510 typically includes a variety of computer readable media. Computer readable media can be any available media that can be accessed by computer 1510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 1510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1530 includes computer storage media in the form of volatile and/or nonvolatile memory such as read only memory (ROM) 1531 and random access memory (RAM) 1532. A basic input/output system 1533 (BIOS), containing the basic routines that help to transfer information between elements within computer 1510, such as during start-up, is typically stored in ROM 1531. RAM 1532 typically contains data and/or program modules that are immediately accessible to and/or presently being operated on by processing unit 1520. By way of example, and not limitation, FIG. 15 illustrates operating system 1534, application programs 1535, other program modules 1536, and program data 1537.

The computer 1510 may also include other removable/non-removable, volatile/nonvolatile computer storage media. By way of example only, FIG. 15 illustrates a hard disk drive 1541 that reads from or writes to non-removable, nonvolatile magnetic media, a flash drive 1551 that reads from or writes to a removable, nonvolatile memory 1552 such as flash memory, and an optical disk drive 1555 that reads from or writes to a removable, nonvolatile optical disk 1556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1541 is typically connected to the system bus 1521 through a non-removable memory interface such as interface 1540, and magnetic disk drive 1551 and optical disk drive 1555 are typically connected to the system bus 1521 by a removable memory interface, such as interface 1550.

The drives and their associated computer storage media described above and illustrated in FIG. 15, provide storage of computer readable instructions, data structures, program modules and other data for the computer 1510. In FIG. 15, for example, hard disk drive 1541 is illustrated as storing operating system 1544, application programs 1545, other program modules 1546, and program data 1547. Note that these components can either be the same as or different from operating system 1534, application programs 1535, other program modules 1536, and program data 1537. Operating system 1544, application programs 1545, other program modules 1546, and program data 1547 are given different numbers here to illustrate that, at a minimum, they are different copies. An actor may enter commands and information into the computer 1510 through input devices such as a keyboard 1562 and pointing device 1561, commonly referred to as a mouse, trackball or touch pad. Other input devices (not shown) may include a microphone, joystick, game pad, satellite dish, scanner, or the like. These and other input devices are often connected to the processing unit 1520 through a user input interface 1560 that is coupled to the system bus, but may be connected by other interface and bus structures, such as a parallel port, game port or a universal serial bus (USB). A monitor 1591 or other type of display device is also connected to the system bus 1521 via an interface, such as a video interface 1590. In addition to the monitor, computers may also include other peripheral output devices such as speakers 1597 and printer 1596, which may be connected through an output peripheral interface 1595.

The computer 1510 may operate in a networked environment using logical connections to one or more remote computers, such as a remote computer 1580. The remote computer 1580 may be a personal computer, a server, a router, a network PC, a peer device or other common network node, and typically includes many or all of the elements described above relative to the computer 1510, although only a memory storage device 1581 has been illustrated in FIG. 15. The logical connections depicted in FIG. 15 include a local area network (LAN) 1581 and a wide area network (WAN) 1583, but may also include other networks. Such networking environments are commonplace in offices, enterprise-wide computer networks, intranets and the Internet.

When used in a LAN networking environment, the computer 1510 is connected to the LAN 1581 through a network interface or adapter 1580. When used in a WAN networking environment, the computer 1510 typically includes a modem 1582 or other means for establishing communications over the WAN 1583, such as the Internet. The modem 1582, which may be internal or external, may be connected to the system bus 1521 via the actor input interface 1560, or other appropriate mechanism. In a networked environment, program modules depicted relative to the computer 1510, or portions thereof, may be stored in the remote memory storage device. By way of example, and not limitation, FIG. 15 illustrates remote application programs 1585 as residing on memory device 1581. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 3 and 7. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user". It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of enforcing valid data assignments in a data processing system configured to process data that is updated by user devices and/or computerized processes, the data processing system storing the data using data entities and instances thereof, the data entities including a first data entity and the instances including a first data entity instance of the first data entity, the method comprising:

using at least one computer hardware processor to perform:

receiving, by the data processing system, a request to assign a value to a first attribute in the first data entity instance, wherein:

the first data entity comprises a plurality of attributes including the first attribute and a second attribute that stores a reference to a second data entity instance;

the first data entity is associated with a first validation rule for the first attribute; and the first validation rule determines validity of a value of the first attribute based on both the first attribute value and a second attribute value stored in the second data entity instance referenced by the second attribute;

generating, from the first validation rule, a structured query language (SQL) query that, when executed against a datastore of the data processing system, returns values that meet the first validation rule, the generating comprising:

obtaining, from the second data entity instance and via the reference stored by the second attribute, the second attribute value; and generating the SQL query using the first validation rule and the second attribute value obtained from the second data entity instance;

executing the generated SQL query against the datastore of the data processing system to obtain, as a result of executing the generated SQL query, one or more valid values for the first attribute that would each meet the first validation rule if assigned to the first attribute; and assigning a value to the first attribute in the first data entity instance at least in part by:

providing, through an interface, output indicating the one or more valid values for the first attribute obtained as a result of executing the generated SQL query;

receiving, through the interface, input indicating a selection of at least one of the one or more valid values for the first attribute; and persisting, in the datastore of the data processing system, the selected at least one valid value as the value of the first attribute.

2. The method of claim 1, wherein generating the SQL query using the first validation rule and the second attribute value obtained from the second data entity instance comprises:

generating one or more statements of the SQL query that specify one or more conditions to filter data in the datastore using the first validation rule and the second attribute value.

3. The method of claim 1, wherein obtaining, from the second data entity instance and via the reference stored by the second attribute, the second attribute value comprises:

following the reference stored by the second attribute to the second data entity instance in the datastore of the data processing system; and reading the second attribute value from the second data entity instance.

4. The method of claim 1, wherein a plurality of validation rules are associated with respective attributes of the first data entity, and the method further comprises:

identifying the first validation rule from among the plurality of validation rules based on an association of the first validation rule with the first attribute.

5. The method of claim 1, wherein the first validation rule comprises multiple conditions on the first attribute, and generating the SQL query comprises:

generating a first portion of the query based on a first one of the multiple conditions on the first attribute; and generating a second portion of the query based on a second one of the multiple conditions on the first attribute.

6. The method of claim 1, wherein generating the SQL query comprises:

transforming the first validation rule into a logical expression; and integrating the logical expression into the SQL query.

7. The method of claim 1, wherein assigning the value to the first attribute in the first data entity instance comprises assigning an instance of an other data entity to the first attribute in the first data entity instance.

8. The method of claim 7, wherein generating the SQL query comprises generating an SQL query on instances of the other data entity.

9. The method of claim 8, wherein executing the generated SQL query to obtain the one or more valid values for the first attribute comprises executing the generated SQL query on a subset of data in the datastore of the data processing system, the subset of data consisting of instances of the other data entity.

10. The method of claim 1, wherein the first attribute indicates an owner, an access security level, a data source, or a data format associated with the first data entity instance.

11. The method of claim 1, wherein the first data entity instance stores information about a software application or a dataset as attribute values in the first data entity instance.

12. The method of claim 11, wherein the first attribute indicates a data source or a data format to be used by the software application when attempting to invoke a function of the software application.

13. The method of claim 12, wherein the one or more valid values are suitable for invoking the function of the software application.

14. The method of claim 11, wherein the first attribute indicates an access security level associated with the dataset to be used when attempting to provide access to the dataset.

15. The method of claim 14, wherein the one or more valid values are one or more access security levels providing access to the dataset.

16. The method of claim 1, wherein:

providing, through the interface, the output indicating the one or more valid values for the first attribute comprises transmitting, to a client device, an indication of the one or more valid values for the first attribute for display in a graphical user interface (GUI); and receiving, through the interface, the input indicating the selection of the at least one valid value for the first attribute comprises receiving, from the client device, input indicating the selection of the at least one valid value for the first attribute through the GUI.

17. The method of claim 1, wherein:

the one or more valid values for the first attribute comprise one or more instances of another data entity.

18. The method of claim 1, wherein:

the first validation rule comprises multiple conditions on the first attribute; and generating, from the first validation rule, the SQL query comprises:

generating a first query criterion using a first condition on the first attribute;

generating a second query criterion using a second condition on the first attribute; and including the first query criterion and the second query criterion in the SQL query.

19. The method of claim 1, further comprising:

identifying, using the first validation rule, one or more invalid values for the first attribute; and preventing transmission of the one or more invalid values through the interface.

20. The method of claim 1, wherein:

the reference stored by the second attribute is an unassigned value entered for the second attribute that has not been persisted in the datastore of the data processing system; and generating the SQL query comprises generating the SQL query using the unassigned value entered for the second attribute.

21. A system for enforcing valid data assignments in a data processing system configured to process data that is updated by user devices and/or computerized processes, the data processing system storing the data using data entities and instances thereof, the data entities including a first data entity and the instances include a first data entity instance of the first data entity the system comprising:

at least one computer hardware processor; and at least one non-transitory computer-readable storage medium storing an assignment validation module, the assignment validation module comprising a rule selection component, a query generation component, and a query execution component;

wherein the at least one computer hardware processor is programmed to execute the assignment validation module to perform:

receiving, by the assignment validation module, a request to assign a value to a first attribute in the first data entity instance, wherein:

the first data entity comprises a plurality of attributes including the first attribute and a second attribute that stores a reference to a second data entity instance;

the first data entity is associated with a first validation rule for the first attribute;

the first validation rule determines validity of a value of the first attribute based on both the first attribute value and a second attribute value stored in the second data entity instance referenced by the second attribute;

generating, from the first validation rule using the query generation component, a SQL query that, when executed against a datastore of the data processing system, returns values that meet the first validation rule, the generating comprising:

obtaining, from the second data entity instance and via the reference stored by the second attribute, the second attribute value; and generating the SQL query using the first validation rule and the second attribute value obtained from the second data entity instance;

executing, using the query execution component, the generated SQL query against the datastore of the data processing system to obtain, as a result of executing the generated SQL query, one or more valid values for the first attribute that would each meet the first validation rule if assigned to the first attribute; and assigning a value to the first attribute in the first data entity instance at least in part by:

providing, through an interface, output indicating the one or more valid values for the first attribute obtained as a result of executing the generated SQL query;

receiving, through the interface, input indicating a selection of at least one of the one or more valid values for the first attribute; and persisting, in the datastore of the data processing system, the selected at least one valid value as the value of the first attribute.

22. At least one non-transitory computer-readable storage medium storing instructions that, when executed by at least one computer hardware processor, cause the at least one computer hardware processor to perform a method of enforcing valid data assignments in a data processing system configured to process data that is updated by user devices and/or computerized processes, the data processing system storing the data using data entities and instances thereof, the data entities including a first data entity and the instances including a first data entity instance of the first data entity, the method comprising:

receiving, by the data processing system, a request to assign a value to a first attribute in the first data entity instance, wherein:

the first data entity comprises a plurality of attributes including the first attribute and a second attribute that stores a reference to a second data entity instance;

the first data entity is associated with a first validation rule for the first attribute; and the first validation rule determines validity of a value of the first attribute based on both the first attribute value and a second attribute value stored in the second data entity instance referenced by the second attribute;

generating, from the first validation rule, a SQL query that, when executed against a datastore of the data processing system, returns values that meet the first validation rule, the generating comprising:

obtaining, from the second data entity instance and via the reference stored by the second attribute, the second attribute value; and generating the SQL query using the first validation rule and the second attribute value obtained from the second data entity instance;

executing the generated SQL query against the datastore of the data processing system to obtain, as a result of executing the generated SQL query, one or more valid values for the first attribute that would each meet the first validation rule if assigned to the first attribute; and assigning a value to the first attribute in the first data entity instance at least in part by:

providing, through an interface, output indicating the one or more valid values for the first attribute obtained as a result of executing the generated SQL query;

receiving, through the interface, input indicating a selection of at least one of the one or more valid values for the first attribute; and persisting, in the datastore of the data processing system, the selected at least one valid value as the value of the first attribute.

* * * * *